(12) United States Patent
Kamata et al.

(10) Patent No.: US 12,134,030 B2
(45) Date of Patent: Nov. 5, 2024

(54) ACCESSORY DEVICE

(71) Applicant: NINTENDO CO., LTD., Kyoto (JP)

(72) Inventors: Hideaki Kamata, Kyoto (JP); Yuriko Sakai, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 0 days.

(21) Appl. No.: 17/943,243

(22) Filed: Sep. 13, 2022

(65) Prior Publication Data

US 2023/0001291 A1    Jan. 5, 2023

Related U.S. Application Data

(63) Continuation of application No. 17/109,288, filed on Dec. 2, 2020, now Pat. No. 11,771,980, which is a continuation of application No. 16/254,277, filed on Jan. 22, 2019, now Pat. No. 10,881,952, which is a continuation of application No. 15/626,488, filed on Jun. 19, 2017, now Pat. No. 10,220,309.

(30) Foreign Application Priority Data

Jan. 11, 2017    (JP) .................................. 2017-002536

(51) Int. Cl.
  *A63F 13/24*    (2014.01)
  *A63F 13/211*    (2014.01)
  (Continued)

(52) U.S. Cl.
  CPC ............ *A63F 13/24* (2014.09); *A63F 13/211* (2014.09); *A63F 13/2145* (2014.09);
  (Continued)

(58) Field of Classification Search
  None
  See application file for complete search history.

(56) References Cited

U.S. PATENT DOCUMENTS

D309,331 S    7/1990 Leung
5,627,974 A   5/1997 Watts, Jr. et al.
(Continued)

FOREIGN PATENT DOCUMENTS

CN    200730201970.9    9/2009
CN    200930291064.1    11/2010
(Continued)

OTHER PUBLICATIONS

IGN's Mario Kart 7 3DS Wheel Hands On, IGN, YouTube, https://www.youtube.com/watch?v=1F9Skn0z8zQ, Jan. 5, 2012 (Year: 2012), 1 page.

(Continued)

*Primary Examiner* — Damon J Pierce
(74) *Attorney, Agent, or Firm* — Nixon & Vanderhye P.C.

(57) ABSTRACT

The first operation portion is configured to be pressed by one hand of a user holding a grip portion. The first button depression portion is configured to move toward a first button of a game controller secured in a compartment, thereby pressing the first button of the game controller secured in the compartment, in response to the pressing operation on the first operation portion. The second operation portion is configured to be pressed by the other hand of the user holding the grip portion. The second button depression portion is configured to move toward a second button of the game controller secured in the compartment, thereby pressing the second button of the game controller secured in the compartment, in response to the pressing operation on the second operation portion.

8 Claims, 18 Drawing Sheets

(51) Int. Cl.
*A63F 13/2145* (2014.01)
*A63F 13/235* (2014.01)
*A63F 13/245* (2014.01)
*A63F 13/26* (2014.01)
*A63F 13/285* (2014.01)
*A63F 13/428* (2014.01)
*A63F 13/803* (2014.01)
*A63F 13/98* (2014.01)
*A63F 13/92* (2014.01)

(52) U.S. Cl.
CPC .......... *A63F 13/235* (2014.09); *A63F 13/245* (2014.09); *A63F 13/26* (2014.09); *A63F 13/285* (2014.09); *A63F 13/428* (2014.09); *A63F 13/803* (2014.09); *A63F 13/98* (2014.09); *A63F 13/92* (2014.09)

(56) References Cited

U.S. PATENT DOCUMENTS

| | | | |
|---|---|---|---|
| 5,657,459 | A | 8/1997 | Yanagisawa et al. |
| 5,667,220 | A | 9/1997 | Cheng |
| 5,702,305 | A | 12/1997 | Norman et al. |
| D395,464 | S | 6/1998 | Shiibashi et al. |
| 5,967,898 | A | 10/1999 | Takasaka et al. |
| 6,279,906 | B1 | 8/2001 | Sanderson et al. |
| D454,567 | S | 3/2002 | Hayes et al. |
| D454,878 | S | 3/2002 | Hayes et al. |
| D465,244 | S | 11/2002 | Hussaini et al. |
| 6,512,511 | B2 | 1/2003 | Willner et al. |
| 6,530,838 | B2 | 3/2003 | Ha et al. |
| 6,544,124 | B2 | 4/2003 | Ireland et al. |
| 6,788,285 | B2 | 9/2004 | Paolucci et al. |
| 6,811,491 | B1 | 11/2004 | Levenberg et al. |
| 6,976,677 | B1 | 12/2005 | Mcvicar |
| D517,124 | S | 3/2006 | Merril et al. |
| D522,516 | S | 6/2006 | Hussaini et al. |
| 7,081,051 | B2 | 7/2006 | Himoto et al. |
| 7,095,442 | B2 | 8/2006 | Van Zee |
| D553,622 | S | 10/2007 | Petrotta |
| D558,651 | S | 1/2008 | Ikeda et al. |
| 7,316,618 | B2 | 1/2008 | Hsu |
| D563,409 | S | 3/2008 | Liu |
| D568,409 | S | 5/2008 | Ikeda et al. |
| D585,895 | S | 2/2009 | Hu et al. |
| D586,865 | S | 2/2009 | Ko et al. |
| D602,096 | S | 10/2009 | Ashida et al. |
| D615,131 | S | 5/2010 | Biheller |
| 7,733,637 | B1 | 6/2010 | Lam |
| D627,832 | S | 11/2010 | Xu |
| 7,833,097 | B1 | 11/2010 | Maddox et al. |
| D631,476 | S | 1/2011 | Piedra et al. |
| D637,655 | S | 5/2011 | Baumann et al. |
| D641,797 | S | 7/2011 | Chen |
| 8,042,811 | B1 | 10/2011 | Markowitz et al. |
| 8,210,534 | B2 | 7/2012 | Markowitz et al. |
| 8,298,084 | B2 | 10/2012 | Yee |
| 8,469,815 | B2 | 6/2013 | Hovseth |
| 8,497,659 | B2 | 7/2013 | Navid |
| 8,845,425 | B2 | 9/2014 | Nogami et al. |
| 8,939,838 | B2 | 1/2015 | Alten et al. |
| 8,972,617 | B2 | 3/2015 | Hirschman |
| D760,632 | S | 7/2016 | Muhl |
| 10,220,309 | B2 | 3/2019 | Kamata et al. |
| 2001/0031662 | A1 | 10/2001 | Larian |
| 2001/0045938 | A1 | 11/2001 | Willner et al. |
| 2001/0049302 | A1 | 12/2001 | Hagiwara et al. |
| 2002/0098887 | A1 | 7/2002 | Himoto et al. |
| 2002/0119819 | A1 | 8/2002 | Kunzle et al. |
| 2002/0145590 | A1 | 10/2002 | Paolucci et al. |
| 2003/0083130 | A1 | 5/2003 | Toyoshima |
| 2003/0100263 | A1 | 5/2003 | Tanaka et al. |
| 2003/0109314 | A1 | 6/2003 | Ku |
| 2004/0082361 | A1 | 4/2004 | Rajagopalan |
| 2004/0104825 | A1 | 6/2004 | Wang |
| 2005/0012711 | A1 | 1/2005 | Paolucci et al. |
| 2005/0085301 | A1 | 4/2005 | Hammond et al. |
| 2005/0215322 | A1 | 9/2005 | Himoto et al. |
| 2005/0233808 | A1 | 10/2005 | Himoto et al. |
| 2006/0152484 | A1 | 7/2006 | Rolus Borgward |
| 2006/0237209 | A1 | 10/2006 | Horinouchi et al. |
| 2006/0279039 | A1 | 12/2006 | Krieger et al. |
| 2007/0021210 | A1 | 1/2007 | Tachibana |
| 2007/0045392 | A1 | 3/2007 | Youens et al. |
| 2007/0111801 | A1 | 5/2007 | Haber et al. |
| 2007/0112989 | A1 | 5/2007 | Iwaki |
| 2007/0178966 | A1 | 8/2007 | Pohlman et al. |
| 2007/0218988 | A1 | 9/2007 | Lucich |
| 2007/0293318 | A1 | 12/2007 | Tetterington |
| 2008/0002350 | A1 | 1/2008 | Farrugia |
| 2008/0153593 | A1 | 6/2008 | Ikeda et al. |
| 2008/0191415 | A1 | 8/2008 | Arche et al. |
| 2009/0005164 | A1 | 1/2009 | Chang |
| 2009/0072784 | A1 | 3/2009 | Erickson |
| 2009/0079705 | A1 | 3/2009 | Sizelove et al. |
| 2009/0093307 | A1 | 4/2009 | Miyaki |
| 2009/0111508 | A1 | 4/2009 | Yeh et al. |
| 2009/0291760 | A1 | 11/2009 | Hepburn et al. |
| 2010/0009754 | A1 | 1/2010 | Shimamura et al. |
| 2010/0064883 | A1 | 3/2010 | Gynes |
| 2010/0118195 | A1 | 5/2010 | Eom et al. |
| 2010/0195279 | A1 | 8/2010 | Michael |
| 2011/0081969 | A1 | 4/2011 | Ikeda |
| 2011/0216495 | A1 | 9/2011 | Marx |
| 2011/0230261 | A1 | 9/2011 | Kim |
| 2011/0260969 | A1 | 10/2011 | Workman |
| 2011/0275437 | A1 | 11/2011 | Minchella Jennings et al. |
| 2012/0040758 | A1 | 2/2012 | Hovseth |
| 2012/0058821 | A1 | 3/2012 | Lan |
| 2012/0088582 | A1 | 4/2012 | Wu et al. |
| 2012/0113034 | A1 | 5/2012 | McDermid |
| 2012/0176369 | A1 | 7/2012 | Suzuki et al. |
| 2012/0188691 | A1 | 7/2012 | Zhou |
| 2012/0202597 | A1 | 8/2012 | Yee et al. |
| 2012/0271967 | A1 | 10/2012 | Hirschman |
| 2012/0302347 | A1 | 11/2012 | Nicholson |
| 2012/0302348 | A1 | 11/2012 | Karacal et al. |
| 2012/0322558 | A1 | 12/2012 | Tiley et al. |
| 2013/0058659 | A1 | 3/2013 | Umezu et al. |
| 2013/0095925 | A1 | 4/2013 | Xu |
| 2013/0106687 | A1 | 5/2013 | Baum et al. |
| 2013/0109476 | A1 | 5/2013 | Baum et al. |
| 2013/0120258 | A1 | 5/2013 | Maus |
| 2013/0194190 | A1 | 8/2013 | Lysenko |
| 2013/0267322 | A1 | 10/2013 | South |
| 2013/0279106 | A1 | 10/2013 | Ergun et al. |
| 2013/0335904 | A1 | 12/2013 | Griffin |
| 2014/0200085 | A1 | 7/2014 | Bares et al. |
| 2014/0206451 | A1 | 7/2014 | Helmes et al. |
| 2014/0221098 | A1 | 8/2014 | Boulanger |
| 2014/0235359 | A1 | 8/2014 | Navid |
| 2014/0247246 | A1 | 9/2014 | Maus |
| 2014/0274394 | A1 | 9/2014 | Willis |
| 2015/0018101 | A1 | 1/2015 | Schoenith et al. |
| 2015/0084900 | A1 | 3/2015 | Hodges et al. |
| 2015/0281422 | A1 | 10/2015 | Kessler et al. |
| 2016/0361627 | A1 | 1/2016 | Fujita et al. |
| 2016/0361632 | A1 | 1/2016 | Fujita et al. |
| 2016/0361633 | A1 | 1/2016 | Fujita et al. |
| 2016/0361641 | A1 | 1/2016 | Koizumi et al. |
| 2016/0107082 | A1 | 4/2016 | Song et al. |
| 2016/0149426 | A1 | 5/2016 | Hodges et al. |
| 2016/0361640 | A1 | 12/2016 | Iwao et al. |
| 2017/0052750 | A1 | 1/2017 | Koizumi et al. |
| 2019/0176029 | A1 | 6/2019 | Kamata et al. |
| 2021/0077901 | A1 | 3/2021 | Kamata et al. |

FOREIGN PATENT DOCUMENTS

| | | |
|---|---|---|
| CN | 201130035346.2 | 7/2011 |
| CN | 201430011311.9 | 6/2014 |
| CN | 104 436 646 | 3/2015 |
| EP | 1 759 745 | 3/2007 |

(56) References Cited

FOREIGN PATENT DOCUMENTS

| | | |
|---|---|---|
| EP | 2 018 030 | 1/2009 |
| EP | 2 772 825 A2 | 9/2014 |
| FR | 2 925 346 A1 | 6/2009 |
| FR | 2 953 608 A1 | 6/2011 |
| GB | 2 310 481 | 8/1997 |
| GB | 2 522 008 | 7/2015 |
| JP | 63-53873 A | 3/1988 |
| JP | H06-77387 U | 10/1994 |
| JP | 9-244803 A | 9/1997 |
| JP | 2002-182856 | 6/2002 |
| JP | 2002-224444 | 8/2002 |
| JP | 2003-018275 | 1/2003 |
| JP | 2003-140811 | 5/2003 |
| JP | 2004-313492 | 11/2004 |
| JP | 2006-136694 | 6/2006 |
| JP | 2007-307284 A | 11/2007 |
| JP | 4255510 | 4/2009 |
| JP | 2010-20742 | 1/2010 |
| JP | 2011-108256 | 6/2011 |
| JP | 2013-54548 | 3/2013 |
| JP | 2013-128744 | 7/2013 |
| KR | 2003-0021435 A | 3/2003 |
| WO | WO 2010/037259 A1 | 4/2010 |
| WO | 2013/095703 | 6/2013 |
| WO | 2015/006680 | 1/2015 |
| WO | 2015/014663 | 2/2015 |
| WO | 2016/176010 A1 | 11/2016 |

OTHER PUBLICATIONS

Hori Announces Steering Wheel Peripheral for Mario Kart on 3DS, Serkan Toto, https://techcrunch.com/2011/10/25/hori-steering-wheel-3ds/, Oct. 25, 2011(year: 2011), 3 pages.
Notice of Reasons for Refusal mailed Oct. 7, 2022 in Japanese Application No. 2021-131890, with English machine translation, 9 pages.
More than expected! Mariokart 7 handle review, ZAPA Blog 2.0 [online], Dec. 2, 2011, https://zapanet.info/blog/item/2287, [searched on Sep. 29, 2022], 7 pages.
Apr. 7, 2017 Partial European Search Report issued in European Application No. 16173964.4.
Apr. 28, 2017 Notice of Reasons for Refusal issued in Japanese Patent Application No. 2016-233836.
Aug. 10, 2017 Office Action issued in U.S. Appl. No. 15/626,557.
BigBen Interactive, Wii™ Steering Wheel, previously available at http://www/bigben.fr/access.php?id=168, Barcode: 3499550250848, at least as early as Nov. 19, 2008 (1 page).
BladePad. Downloaded from http://www.bladepad.com on Nov. 10, 2016 (2 pages).
Dec. 15, 2017 Partial European Search Report issued in EP Application No. 17176593.6.
Fujita et al., U.S. Appl. No. 15/178,972, filed Jun. 10, 2016, (320 pages).
Fujita et al., U.S. Appl. No. 15/178,991, filed Jun. 10, 2016, (321 pages).
Fujita et al., U.S. Appl. No. 15/179,011, filed Jun. 10, 2016, (323 pages).
Fujita et al., U.S. Appl. No. 15/411,156, filed Jan. 20, 2017 (320 pages).
Fujita et al., U.S. Appl. No. 15/413,977, filed Jan. 24, 2017 (326 pages).
Furuike et al., U.S. Appl. No. 15/292,359, filed Oct. 13, 2016, (93 pages).
Game grip STG-ONE. Downloaded from http://gamegrip-stgone.com/en/index.php on Nov. 10, 2016 (7 pages).
Gametel bluetooth controller for Android and iOS. Downloaded from https://www.engadget.com/2012/01/09/gametel-bluetooth-controller-for-android-and-ios-hands-on/ on Nov. 10, 2016 (7 pages).
IFrogz's Caliber Advantage. Downloaded from https://www.engadget.com/2013/01/11/ifrogz-caliber-advantage-iphone-gaming-case-hands-on/ on Nov. 10, 2016 (7 pages).
IPEGA PG-9017 Wireless Bluetooth Controller. Downloaded from http://www.infinityreviews.com/2013/04/ipega-bluetooth-controller-review.html on Nov. 10, 2016 (13 pages).
Ikuta et al., U.S. Appl. No. 15/446,346, filed Mar. 1, 2017 (99 pages).
Iwao, et al., U.S. Appl. No. 15/178,984, filed Jun. 10, 2016 (358 pages).
Iwao et al., U.S. Appl. No. 15/428,188, filed Feb. 9, 2017 (351 pages).
Jan. 2, 2017 European Search Report issued in European Application No. 16193339.5 (4 pages).
"Joy-Con Wheel for Nintendo Switch Controller-Black (Set of 2)", https://www.amazon.com/dp/B06XRF4DYC/ref=cm_sw_r_cp_ep_dp_hrF2ybRSA8 t, retrieved on Apr. 13, 2017 (5 pages).
Jun. 2, 2017 Office Action issued in U.S. Appl. No. 15/418,426.
Jun. 13, 2017 Notice of Allowance issued in U.S. Appl. No. 15/178,972.
Jun. 13, 2017 Notice of Allowance issued in U.S. Appl. No. 15/178,991.
Kamata, et al., U.S. Appl. No. 15/626,557, filed Jun. 19, 2017, (107 pages).
Koizumi, et al., U.S. Appl. No. 15/179,022, filed Jun. 10, 2016, (210 pages).
Koizumi et al., U.S. Appl. No. 15/344,208, filed Nov. 4, 2016 (199 pages).
Koizumi et al., U.S. Appl. No. 15/344,276, filed Nov. 4, 2016 (197 pages).
Koizumi et al., U.S. Appl. No. 15/418,426, filed Jan. 27, 2017 (200 pages).
Mad Catz Gamepads for Android and IOS. Downloaded from http://madcatz.com/gamesmart_lynx_9/ on November 10, 2016 (4 pages).
Mar. 13, 2017 Office Action issued in U.S. Appl. No. 15/428,188.
Mar. 15, 2017 Notice of Allowance issued in U.S. Appl. No. 15/413,977.
Mar. 20, 2017 Notice of Allowance issued in U.S. Appl. No. 15/178,991.
Mar. 31, 2017 Notice of Allowance issued in U.S. Appl. No. 15/179,011.
May 18, 2017 Office Action issued in U.S. Appl. No. 15/344,208.
May 19, 2017 Office Action issued in U.S. Appl. No. 15/344,276.
Moga Ace Power iOS Game Controller. Downloaded from http://www.ign.com/articles/2013/11/20/moga-ace-power-ios-game-controller-now-available on Nov. 10, 2016 (6 pages).
Nov. 3, 2016 European Search Report issued in European Application No. 16173841.4 (8 pages).
Nov. 16, 2016 Extended European Search Report issued in European Application No. 16173842.2 (8 pages).
Nov. 17, 2016 European Search Report issued in European Application No. 16173840.6 (4 pages).
O-iPower, Sony Official Cradle, "https://www.youtube.com/watch?v=1ly5pOxOPmU" Jan. 2, 2015.
PG-9023. Downloaded from http://www.ipega.hk/index.php?option=com_phocagallery&view=detail&catid=11%3Aiphone&id=1100%3Abluetooth-stretch-controller&Itemid=4&lang=en on Nov. 10, 2016 (2 pages).
Phonejoy Play smartphone game controller hits Kickstarter. Downloaded from http://www.slashgear.com/phonejoy-play-smartphone-game-controller-hits-kickstarter-05259565/ on Nov. 10, 2016 (9 pages).
PowerA's Moga Pro. Downloaded from http://venturebeat.com/2013/01/14/poweras-moga-pro-gives-you-a-console-gaming-experience-wherever-you-go -hands-on-video/ on Nov. 10, 2016 (5 pages).
PowerShell Controller + Battery. Downloaded from http://support.logitech.com/en_us/product/powershell-controller-and-battery on Nov. 10, 2016 (2 pages).
Razer Goes Mobile with Junglecat iOS Gaming Controller. Downloaded from http://www.razerzone.com/press/detail/press-releases/razer-goes-mobile-with-junglecat-ios-gaming-controller on Nov. 10, 2016 (5 pages).
Samsung Galaxy S4 Game Pad. Downloaded from http://www.geeky-gadgets.com/samsung-galaxy-s4-game-pad-21-03-2013/ on Nov. 10, 2016 (5 pages).

(56) References Cited

OTHER PUBLICATIONS

SMACON-GP. Downloaded from http://dragonquestgame.net/use-bluetooth-controller-smacon/ on Nov. 10, 2016 (9 pages).
Ubisoft—Ubisoft Wii™ Steering Wheel, previously available at http://www.ubi.com/US/Games/Info.aspx?pId=5436, apparently at least as early as Nov. 3, 2008 (2 pages).
Wii Wheel™ Accessory for the Wii Remote™ Operations Manual, Nintendo of America Inc., pp. 1-11, prior to Apr. 18, 2017.
Wikipad Gaming Tablet. Downloaded from http://www.gizorama.com/2013/news/wikipad-gaming-tablet-available-june-11 on Nov. 10, 2016 (4 pages).
Kamata et al., U.S. Appl. No. 16/254,277, filed Jan. 22, 2019, for "Accessory Device," (parent application).
Kamata et al., U.S. Appl. No. 17/109,288, filed Dec. 2, 2020, for "Accessory Device," (parent application).

ACCESSORY DEVICE

CROSS REFERENCE TO RELATED APPLICATIONS

This application is a continuation of U.S. application Ser. No. 17/109,288, filed Dec. 2, 2020, which is a continuation of U.S. application Ser. No. 16/254,277, filed on Jan. 22, 2019, now U.S. Pat. No. 10,881,952, which is a continuation of U.S. application Ser. No. 15/626,488, filed on Jun. 19, 2017, now U.S. Pat. No. 10,220,309, which claims priority to the disclosure of Japanese Patent Application No. 2017-002536 filed on Jan. 11, 2017, each of which is incorporated herein by reference.

FIELD

The technology disclosed herein relates to an accessory device for use with a game controller.

BACKGROUND AND SUMMARY

Accessory units are known in the art that are used with game controllers fitted into the accessory units. For example, one such accessory unit is a steering wheel-shaped accessory unit operated by being rotated as a whole, with a game controller attached thereto.

These accessory units, however, had room for improvement in terms of their usability when used with game controllers.

It is therefore an object of at least one exemplary aspect to provide an accessory device having a better usability.

At least one exemplary aspect may employ following configurations to attain the object set forth above. Note that in interpreting the claims, it is understood that the scope thereof should be interpreted based solely on the wording of the claims, and wherever the wording of the claims is inconsistent with the description hereinbelow, the wording of the claims precedes.

A first example of an accessory device according to at least one exemplary aspect is for use with a game controller that includes at least a first button and a second button. The accessory device includes a compartment, a grip portion, a first movable portion and a second movable portion. The compartment is configured to removably secure the game controller therein. The grip portion is configured to be held by a user with both hands. The first movable portion includes a first operation portion and a first button depression portion. The first operation portion is configured to be pressed by one hand of the user holding the grip portion. The first button depression portion is configured to move toward the first button of the game controller secured in the compartment, thereby pressing the first button of the game controller secured in the compartment, in response to the pressing operation on the first operation portion. The second movable portion includes a second operation portion and a second button depression portion. The second operation portion is configured to be pressed by the other hand of the user holding the grip portion. The second button depression portion is configured to move toward the second button of the game controller secured in the compartment, thereby pressing the second button of the game controller secured in the compartment, in response to the pressing operation on the second operation portion.

With the configuration above, by moving a plurality of movable portions provided on the accessory device while holding the accessory device, it is possible to operate a plurality of buttons provided on the game controller secured in the accessory device, thus improving the usability of the accessory device.

The first button depression portion may be configured to press the first button of the game controller by projecting through an upper surface of the compartment toward the first button of the game controller secured in the compartment in response to the pressing operation on the first operation portion. The second button depression portion may be configured to press the second button of the game controller by projecting through the upper surface of the compartment toward the second button of the game controller secured in the compartment in response to the pressing operation on the second operation portion.

With the configuration above, it is possible to press the first button and the second button of the game controller.

The first movable portion may be configured so that when the first button of the game controller is brought from a non-pressed position to a pressed position by the first movable portion, an amount of movement by which the first button depression portion moves toward the first button of the game controller secured in the compartment is smaller than an amount of movement by which the first operation portion moves. The second movable portion may be configured so that when the second button of the game controller is brought from a non-pressed position to a pressed position by the second movable portion, an amount of movement by which the second button depression portion moves toward the second button of the game controller secured in the compartment is smaller than an amount of movement by which the second operation portion moves.

With the configuration above, it is possible to further improve the controllability when operating the first button and the second button.

The first movable portion may further include a first shaft portion and a first arm portion. The first arm portion connects the first operation portion and the first button depression portion and is configured to pivot about the first shaft portion. The second movable portion may further include a second shaft portion and a second arm portion. The second arm portion connects the second operation portion and the second button depression portion and is configured to pivot about the second shaft portion.

With the configuration above, it is possible to operate a plurality of buttons provided on the game controller utilizing the leverage function.

The first arm portion may be configured so that a distance between the first operation portion and the first shaft portion is greater than a distance between the first button depression portion and the first shaft portion. The second arm portion may be configured so that a distance between the second operation portion and the second shaft portion is greater than a distance between the second button depression portion and the second shaft portion.

With the configuration above, it is possible to operate a plurality of buttons provided on the game controller with a small operating force.

The first button depression portion includes an actuation surface configured to be in contact with the first button, the actuation surface having edges, and one of the edges that is closest to the first shaft portion may be chamfered with a first amount of chamfer, and another one of the edges that is farthest away from the first shaft portion may be chamfered with an amount of chamfer smaller than the first amount of chamfer. The second button depression portion includes an actuation surface configured to be in contact with the second button, the actuation surface having edges, and one of the edges that is closest to the second shaft portion may be chamfered with a second amount of chamfer, and another one of the edges that is farthest away from the second shaft portion may be chamfered with an amount of chamfer smaller than the second amount of chamfer.

The first button depression portion includes an actuation surface configured to be in contact with the first button, the actuation surface having edges, and one of the edges that first comes in proximity to the first button when the first button depression portion moves toward the first button of the game controller secured in the compartment may be chamfered with a first amount of chamfer, and another one of the edges that is opposite from that edge may be chamfered with an amount of chamfer smaller than the first amount of chamfer. The second button depression portion includes an actuation surface configured to be in contact with the second button, the actuation surface having edges, and one of the edges that first comes in proximity to the second button when the second button depression portion moves toward the second button of the game controller secured in the compartment may be chamfered with a second amount of chamfer, and another one of the edges opposite from that edge may be chamfered with an amount of chamfer smaller than the second amount of chamfer.

A position of the first button depression portion may be offset from a position of the first operation portion by a predetermined distance in an axial direction of the first shaft portion. A position of the second button depression portion may be offset from a position of the second operation portion by a predetermined distance in an axial direction of the second shaft portion.

With the configuration above, it is possible to realize a degree of freedom in designing the arrangement of the first operation portion and the second operation portion, without being restricted by the position of the game controller to be attached.

A position of the first button depression portion may be offset from a position of the first operation portion by a predetermined distance in a front-rear direction. A position of the second button depression portion may be offset from a position of the second operation portion by a predetermined distance in the front-rear direction.

With the configuration above, it is possible to freely arrange the first operation portion and the second operation portion, without being restricted by the position of the game controller to be attached.

A frontmost portion of an area of the first operation portion that is configured to be contacted by a finger of a user may be located rearward of a rearmost portion of an actuation surface of the first button depression portion configured to be in contact with the first button. A frontmost portion of an area of the second operation portion that is configured to be contacted by a finger of a user may be located rearward of a rearmost portion of an actuation surface of the second button depression portion configured to be in contact with the second button.

With the configuration above, it is possible to realize a degree of freedom in designing the arrangement of the first operation portion and the second operation portion, without being restricted by the position of the game controller to be attached.

A width of the first button depression portion in a predetermined direction may be greater than a width of the first button in the predetermined direction. A width of the second button depression portion in the predetermined direction may be greater than a width of the second button in the predetermined direction.

With the configuration above, it is possible to reduce the excessive load to be given by the right button depression portion and the second button depression portion to the first button and the second button.

The predetermined direction may be a front-rear direction.

With the configuration above, it is possible to reduce the excessive load to be given by the first button depression portion and the second button depression portion to the first button and the second button.

The compartment may further include at least a first biasing portion and a second biasing portion. The first biasing portion is configured to bias the game controller in a direction substantially opposite from a direction in which the first button of the game controller is pressed by the first button depression portion when the game controller is secured in the compartment. The second biasing portion is configured to bias the game controller in a direction substantially opposite from a direction in which the second button of the game controller is pressed by the second button depression portion when the game controller is secured in the compartment, wherein the second biasing portion is located rightward of the first biasing portion.

With the configuration above, it is possible to stably press the first button and the second button.

The first biasing portion may be located at a position in the compartment directly below the first button depression portion or below and leftward of the first button depression portion. The second biasing portion may be located at a position in the compartment directly below the second button depression portion or below and rightward of the second button depression portion.

With the configuration above, it is possible to more stably press the first button and the second button.

The compartment may include a recessed portion through which a part of a side surface of the game controller is exposed when the game controller is secured in the compartment.

With the configuration above, it is easy to remove the game controller from the accessory device.

The first operation portion and the second operation portion may be both located on a rear surface of the accessory device. The accessory device may further include a raised portion on a rear side of the grip portion, configured to protrude further rearward than the first operation portion and the second operation portion.

With the configuration above, when the accessory device contacts the floor surface, or the like, it is possible to reduce the shock to be applied to the first operation portion and the second operation portion.

The grip portion may include a rim portion having a generally circular outer edge.

With the configuration above, an operation such as rotating the accessory device as a whole while holding the grip portion is easy.

The rim portion may include a front surface portion on a front side of the accessory device and a rear surface portion on a rear side of the accessory device, and the front surface portion and the rear surface portion are attached together, forming seams therebetween on an inner side and on an outer side of the rim portion. The seam on the inner side of the rim portion may be offset toward the front side with respect to the seam on the outer side of the rim portion.

With the configuration above, it is possible to improve the feel when holding the grip portion.

A second example of an accessory device according to at least one exemplary aspect is for use with a first game controller including a protruding portion on a rear surface thereof, a second game controller including a protruding portion on a rear surface thereof, the second game controller having a shape different from that of the first game controller. The accessory device includes a compartment. The compartment is configured to allow both of the first game controller and the second game controller to be removably attached thereto, one at a time, and configured to removably secure both of the first game controller and the second game controller therein, one at a time. The compartment includes a first engagement portion and a second engagement portion. The first engagement portion is located on a first side in a predetermined direction and configured to engage with the protruding portion of the first game controller. The second engagement portion is located on a second side in the predetermined direction and configured to engage with the protruding portion of the second game controller.

With the configuration above, it is possible to realize an accessory device such that game controllers of different shapes can be attached to and detached from the accessory device.

The first engagement portion may have a dented shape that is configured to engage with the protruding portion of the first game controller when the first game controller is secured in the compartment. The second engagement portion may have a dented shape that is configured to engage with the protruding portion of the second game controller when the second game controller is secured in the compartment.

With the configuration above, the dented shape to engage with the protruding portion of the first game controller and the dented shape to engage with the protruding portion of the second game controller are formed separately, thereby realizing an accessory device such that game controllers of different shapes can be attached to and detached from the accessory device.

The first game controller may include at least a first operation input portion. The second game controller may include at least a second operation input portion. The accessory device may include a first mark and a second mark. The first mark is configured to be substantially in line with the first operation input portion when the protruding portion of the first game controller is in engagement with the first engagement portion. The second mark is configured to be substantially in line with the second operation input portion when the protruding portion of the second game controller is in engagement with the second engagement portion.

With the configuration above, a user can intuitively understand the direction and the position of attachment of the first controller or the second game controller to the accessory device.

The first game controller may include at least a first button. The second game controller may include at least a second button. The accessory device may further include a first movable portion and a grip portion. The grip portion is configured to be held by a user with both hands. The first movable portion may include a first operation portion and a first button depression portion. The first operation portion is configured to be pressed by one hand of the user holding the grip portion. The first button depression portion is configured to move toward either the first game controller or the second game controller secured in the compartment in response to the pressing operation on the first operation portion, thereby pressing the first button when the protruding portion of the first game controller is in engagement with the first engagement portion and pressing the second button when the protruding portion of the second game controller is in engagement with the second engagement portion.

With the configuration above, by moving the movable portions provided on the accessory device while holding the accessory device, it is possible to operate buttons provided on a game controller with any game controller attached to the accessory device.

The first game controller may further include a third button. The second game controller may further include a fourth button. The accessory device may further include a second movable portion. The second movable portion includes a second operation portion and a second button depression portion. The second operation portion is configured to be pressed by the other hand of the user holding the grip portion. The second button depression portion is configured to move toward either the first game controller or the second game controller secured in the compartment in response to the pressing operation on the second operation portion, thereby pressing the third button when the protruding portion of the first game controller is in engagement with the first engagement portion and pressing the fourth button when the protruding portion of the second game controller is in engagement with the second engagement portion.

With the configuration above, by moving a plurality of movable portions provided on the accessory device while holding the accessory device, it is possible to operate a plurality of buttons provided on the game controller with any game controller attached to the accessory device, thereby realizing a variety of operations using the accessory device.

A length from a left end of the first game controller, which is on a left side when the first game controller is in engagement with the first engagement portion, to the first button may be a first length, and a length from a right end of the first game controller, which is on a right side when the first game controller is in engagement with the first engagement portion, to the third button may be a third length. A length from a left end of the second game controller, which is on a left side when the second game controller is in engagement with the second engagement portion, to the second button may be a second length greater than the first length, and a length from a right end of the second game controller, which is on a right side when the second game controller is in engagement with the second engagement portion, to the fourth button may be a fourth length less than the third length. In this case, a length from a left end surface of the compartment, configured to contact the left end of the second game controller when the protruding portion of the second game controller is in engagement with the second engagement portion, to a position at which the first button depression portion protrudes may be the second length, and a length from a right end surface of the compartment configured to contact the right end of the first game controller when the protruding portion of the first game controller is in engagement with the first engagement portion, to a position at which the second button depression portion protrudes may be the third length.

With the configuration above, even if the arrangement of buttons varies, the buttons can be pressed by the same movable portions by attaching the game controllers at positions that are offset from each other in the left-right direction.

The first movable portion may further include a first shaft portion and a first arm portion. The first arm portion connects the first operation portion and the first button depression portion and is configured to pivot about the first shaft portion. The second movable portion may further include a second shaft portion and a second arm portion. The second arm portion connects the second operation portion and the second button depression portion and is configured to pivot about the second shaft portion.

With the configuration above, it is possible to operate a plurality of buttons provided on the game controller utilizing the leverage function.

The first arm portion may be configured so that a distance between the first operation portion and the first shaft portion is greater than a distance between the first button depression portion and the first shaft portion. The second arm portion may be configured so that a distance between the second operation portion and the second shaft portion is greater than a distance between the second button depression portion and the second shaft portion.

With the configuration above, it is possible to operate a plurality of buttons provided on the game controller with a small operating force.

A position of the first button depression portion may be offset from a position of the first operation portion by a predetermined distance in an axial direction of the first shaft portion. A position of the second button depression portion may be offset from a position of the second operation portion by a predetermined distance in an axial direction of the second shaft portion.

With the configuration above, it is possible to realize a degree of freedom in designing the arrangement of the first operation portion and the second operation portion, without being restricted by the position of the game controller to be attached.

The first movable portion may be configured so that when the first button of the first game controller is brought from a non-pressed position to a pressed position by the first movable portion, an amount of movement by which the first button depression portion moves toward the first button of the first game controller in engagement with the first engagement portion is smaller than an amount of movement by which the first operation portion moves. The second movable portion may be configured so that when the second button of the second game controller is brought from a non-pressed position to a pressed position by the second movable portion, an amount of movement by which the second button depression portion moves toward the second button of the second game controller in engagement with the second engagement portion is smaller than an amount of movement by which the second operation portion moves.

With the configuration above, it is possible to further improve the controllability when operating the buttons.

A length of the first game controller or the second game controller in a vertical direction when the first game controller or the second game controller is secured in the compartment may be a fifth length, and a length of the first game controller or the second game controller in a horizontal direction when the first game controller or the second game controller is secured in the compartment may be a sixth length. A length in the vertical direction of the compartment may be such that an object of the fifth length can be secured in the compartment. A length in the horizontal direction of the compartment may be greater than the sixth length.

With the configuration above, differences in dimension between different shapes can be absorbed, thereby allowing game controllers of different shapes to be attached.

The compartment may further include at least two biasing portions. The biasing portions may be configured to bias the game controller upward and downward, respectively, so as to secure the game controller when the protruding portion of the first game controller is in engagement with the first engagement portion and when the protruding portion of the second game controller is in engagement with the second engagement portion.

With the configuration above, the game controller can be stably attached to the accessory device.

A third example of an accessory device according to at least one exemplary aspect is for use with a first game controller including at least a first button and a second button and a protruding portion on a rear surface thereof, and a second game controller including at least a third button and a fourth button and a protruding portion on a rear surface thereof, the second game controller having a different shape from that of the first game controller. The accessory device includes a compartment, a first movable portion and a second movable portion. The compartment is configured to allow both of the first game controller and the second game controller to be removably attached thereto, one at a time, and configured to removably secure both of the first game controller and the second game controller therein, one at a time. The compartment includes a first engagement portion and a second engagement portion. The first engagement portion is located on a first side in a predetermined direction and configured to engage with the protruding portion of the first game controller. The second engagement portion is located on a second side in the predetermined direction and configured to engage with the protruding portion of the second game controller. The first movable portion includes a first operation portion and a first button depression portion. The first button depression portion is configured to press the first button of the first game controller when the protruding portion of the first game controller is in engagement with the first engagement portion and configured to press the third button of the second game controller when the protruding portion of the second game controller is in engagement with the second engagement portion. The second movable portion includes a second operation portion and a second button depression portion. The second button depression portion is configured to press the second button of the first game controller when the protruding portion of the first game controller is in engagement with the first engagement portion and configured to press the fourth button of the second game controller when the protruding portion of the second game controller is in engagement with the second engagement portion.

With the configuration above, by moving a plurality of movable portions provided on the accessory device, it is possible to operate a plurality of buttons provided on the game controller secured in the accessory device, thus improving the usability of the accessory device. It is possible to realize an accessory device such that game controllers of different shapes can be attached to and detached from the accessory device.

The accessory device may further include a grip portion. The grip portion is configured to be held by a user with both hands. In this case, the first operation portion may be configured to be pressed by one hand of the user holding the grip portion. The second operation portion may be configured to be pressed by the other hand of the user holding the grip portion.

With the configuration above, by moving a plurality of movable portions provided on the accessory device while holding the accessory device, it is possible to operate a plurality of buttons provided on the game controller secured in the accessory device, thus improving the usability of the accessory device.

The first movable portion may be configured so that when the first button of the first game controller in engagement with the first engagement portion is brought from a non-pressed position to a pressed position by the first movable portion, an amount of movement by which the first button depression portion moves toward the first button is smaller than an amount of movement by which the first operation portion moves, and configured so that when the third button of the second game controller in engagement with the second engagement portion is brought from a non-pressed position to a pressed position by the first movable portion, an amount of movement by which the first button depression portion moves toward the third button is smaller than an amount of movement by which the first operation portion moves. The second movable portion may be configured so that when the second button of the first game controller in engagement with the first engagement portion is brought from a non-pressed position to a pressed position by the second movable portion, an amount of movement by which the second button depression portion moves toward the second button is smaller than an amount of movement by which the second operation portion moves, and configured so that when the fourth button of the second game controller in engagement with the second engagement portion is brought from a non-pressed position to a pressed position by the second movable portion, an amount of movement by which the second button depression portion moves toward the fourth button is smaller than an amount of movement by which the second operation portion moves.

With the configuration above, it is possible to further improve the controllability when operating the first button, the second button, the third button and the fourth button.

The first movable portion may further include a first shaft portion and a first arm portion. The first arm portion connects the first operation portion and the first button depression portion and is configured to pivot about the first shaft portion. The second movable portion may further include a second shaft portion and a second arm portion. The second arm portion connects the second operation portion and the second button depression portion and is configured to pivot about the second shaft portion.

With the configuration above, it is possible to operate a plurality of buttons provided on the first game controller or the second game controller utilizing the leverage effect.

The first arm portion may be configured so that a distance between the first operation portion and the first shaft portion is greater than a distance between the first button depression portion and the first shaft portion. The second arm portion may be configured so that a distance between the second operation portion and the second shaft portion is greater than a distance between the second button depression portion and the second shaft portion.

With the configuration above, it is possible to operate a plurality of buttons provided on the first game controller or the second game controller with a small operating force.

A position of the first button depression portion may be offset from a position of the first operation portion by a predetermined distance in an axial direction of the first shaft portion. A position of the second button depression portion may be offset from a position of the second operation portion by a predetermined distance in an axial direction of the second shaft portion.

With the configuration above, it is possible to realize a degree of freedom in designing the arrangement of the first operation portion and the second operation portion, without being restricted by the position of the first game controller or the second game controller to be attached.

A position of the first button depression portion may be offset from a position of the first operation portion by a predetermined distance in a front-rear direction. A position of the second button depression portion may be offset from a position of the second operation portion by a predetermined distance in the front-rear direction.

With the configuration above, it is possible to freely arrange the first operation portion and the second operation portion, without being restricted by the position of the first game controller or the second game controller to be attached.

A frontmost portion of an area of the first operation portion that is configured to be contacted by a finger of a user may be located rearward of a rearmost portion of an actuation surface of the first button depression portion configured to be in contact with the first button or the third button. A frontmost portion of an area of the second operation portion that is configured to be contacted by a finger of a user may be located rearward of a rearmost portion of an actuation surface of the second button depression portion configured to be in contact with the second button or the fourth button.

With the configuration above, it is possible to realize a degree of freedom in designing the arrangement of the first operation portion and the second operation portion, without being restricted by the position of the first game controller or the second game controller to be attached.

A width of the first button depression portion in a predetermined direction may be greater than a width of the first button and the third button in the predetermined direction. A width of the second button depression portion in the predetermined direction may be greater than a width of the second button and the fourth button in the predetermined direction.

With the configuration above, it is possible to reduce the excessive load to be applied by the first button depression portion and the second button depression portion to the first button, the second button, the third button and the fourth button.

The first game controller may further include a first operation input portion. The second game controller may further include a second operation input portion. In this case, the accessory device may include a first mark and a second mark. The first mark is configured to be substantially in line with the first operation input portion when the protruding portion of the first game controller is in engagement with the first engagement portion. The second mark is configured to be substantially in line with the second operation input portion when the protruding portion of the second game controller is in engagement with the second engagement portion.

With the configuration above, the dented shape to engage with the protruding portion formed on the rear surface of the first game controller and the dented shape to engage with the protruding portion formed on the rear surface of the second game controller are formed separately, thereby realizing an accessory device such that game controllers of different shapes can be attached to and detached from the accessory device.

According to the aspects discussed herein, it is possible to improve the usability of an accessory device.

These and other objects, features, aspects and advantages will become more apparent from the following detailed description when taken in conjunction with the accompanying drawings.

DETAILED DESCRIPTION OF NON-LIMITING EXAMPLE EMBODIMENTS

An information processing system according to at least one exemplary aspect will now be described. An example information processing system includes a main unit (information processing device, serving as a game device main unit) 2, a left controller 3, a right controller 4, and a steering wheel-shaped attachment 200. The left controller 3 and the right controller 4 can each be attached to and detached from the main unit 2. The left controller 3 and the right controller 4 can be attached to, and used as an integral unit with, the main unit 2, or the main unit 2 can be used as a separate unit from the left controller 3 and the right controller 4 (see FIG. 2). The information processing system can be used in a mode in which the image is displayed on the main unit 2, and another mode in which the image is displayed on a different display device (e.g., a stationary monitor) such as a TV. In the former mode, the information processing system can be used as a portable device (e.g., a portable game device). In the latter mode, the information processing system can be used as a home-console device (e.g., a home-console game device). The steering wheel-shaped attachment 200 of the information processing system can be used as an extension controller device with either the left controller 3 or the right controller 4 attached to a part of the steering wheel-shaped attachment 200. Note that as will be clear from the description below, either the left controller 3 or the right controller 4 can be attached to and detached from the steering wheel-shaped attachment 200. The term "accessory device" as used herein includes units such as so-called extension units and attachments.

Figure 1:
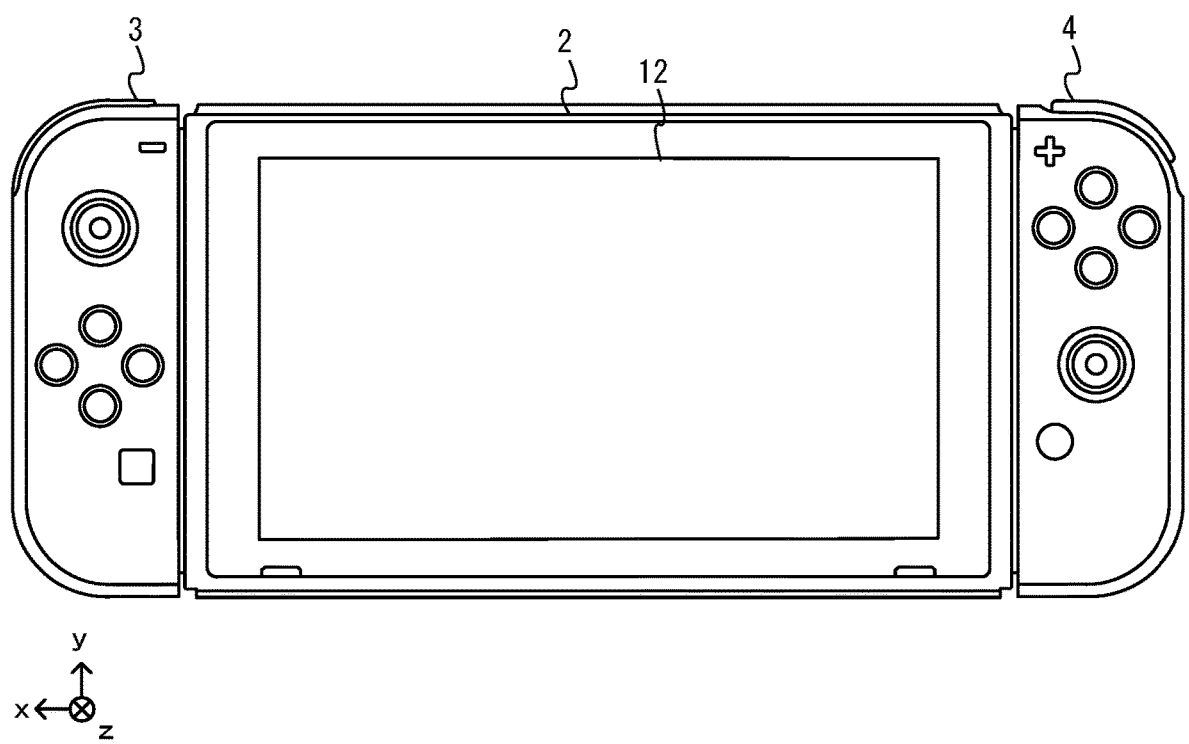
FIG. 1 shows a non-limiting example state in which a left controller 3 and a right controller 4 are attached to a main unit 2.

FIG. 1 shows a state in which the left controller 3 and the right controller 4 are attached to the main unit 2. As shown in FIG. 1, the left controller 3 and the right controller 4 are attached to and combined with the main unit 2. The main unit 2 is a unit for executing various processes (e.g., game processes) in the information processing system. The main unit 2 includes a display 12. The left controller 3 and the right controller 4 each include an operation section allowing a user to provide an input.

Figure 2:
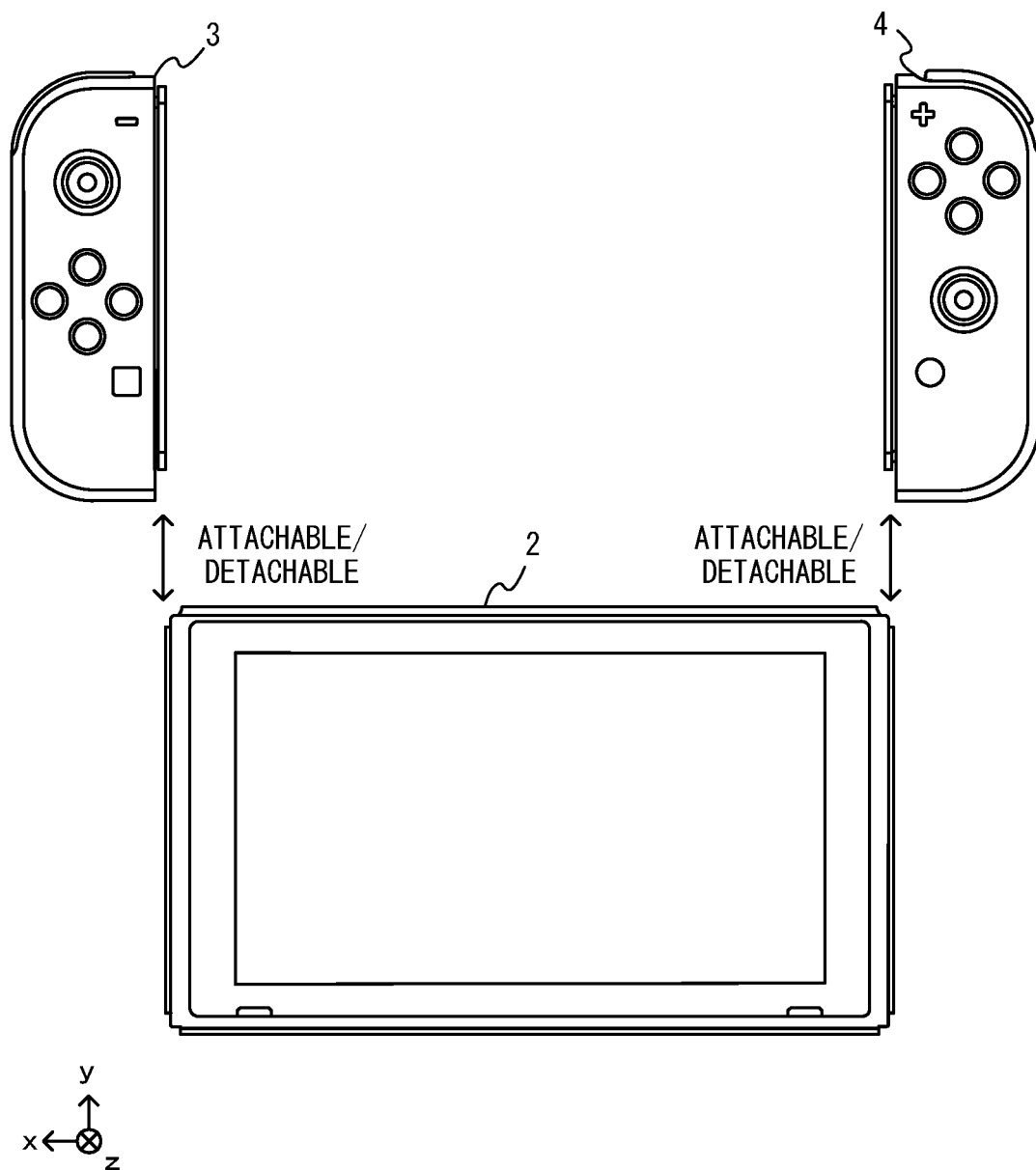
FIG. 2 is a non-limiting example state in which the left controller 3 and the right controller 4 are detached from the main unit 2.

FIG. 2 shows an example where the left controller 3 and the right controller 4 are detached from the main unit 2. As shown in FIG. 1 and FIG. 2, the left controller 3 and the right controller 4 can be attached to and detached from the main unit 2. The left controller 3 can be attached to the left side surface of the main unit 2 (the side surface on the x-axis positive direction side shown in FIG. 1). The left controller 3 can be attached to and detached from the main unit 2 by being slid in the y-axis direction shown in FIG. 1 against the left side surface of the main unit 2. The right controller 4 can be attached to the right side surface of the main unit 2 (the side surface on the x-axis negative direction side shown in FIG. 1). The right controller 4 can be attached to and detached from the main unit 2 by being slid in the y-axis direction shown in FIG. 1 against the right side surface of the main unit 2. Note that the left controller 3 and the right controller 4 may be referred to generally as "controllers". Note that in at least one exemplary aspect, the "controller device" to be operated by one user may be a single controller (e.g., one of the left controller 3 and the right controller 4), or a plurality of controllers (e.g., both of the left controller 3 and the right controller 4, and possibly including other controllers). The "controller device" can be implemented by one or more controller. In at least one exemplary aspect by attaching one controller (e.g., the right controller 4) to an accessory device (e.g., the steering wheel-shaped attachment 200), a user can operate the accessory device to thereby control information processes (e.g., game processes) being executed by the main unit 2. A specific example configuration of the main unit 2, the left controller 3 and the right controller 4 will now be described.

Figure 3:
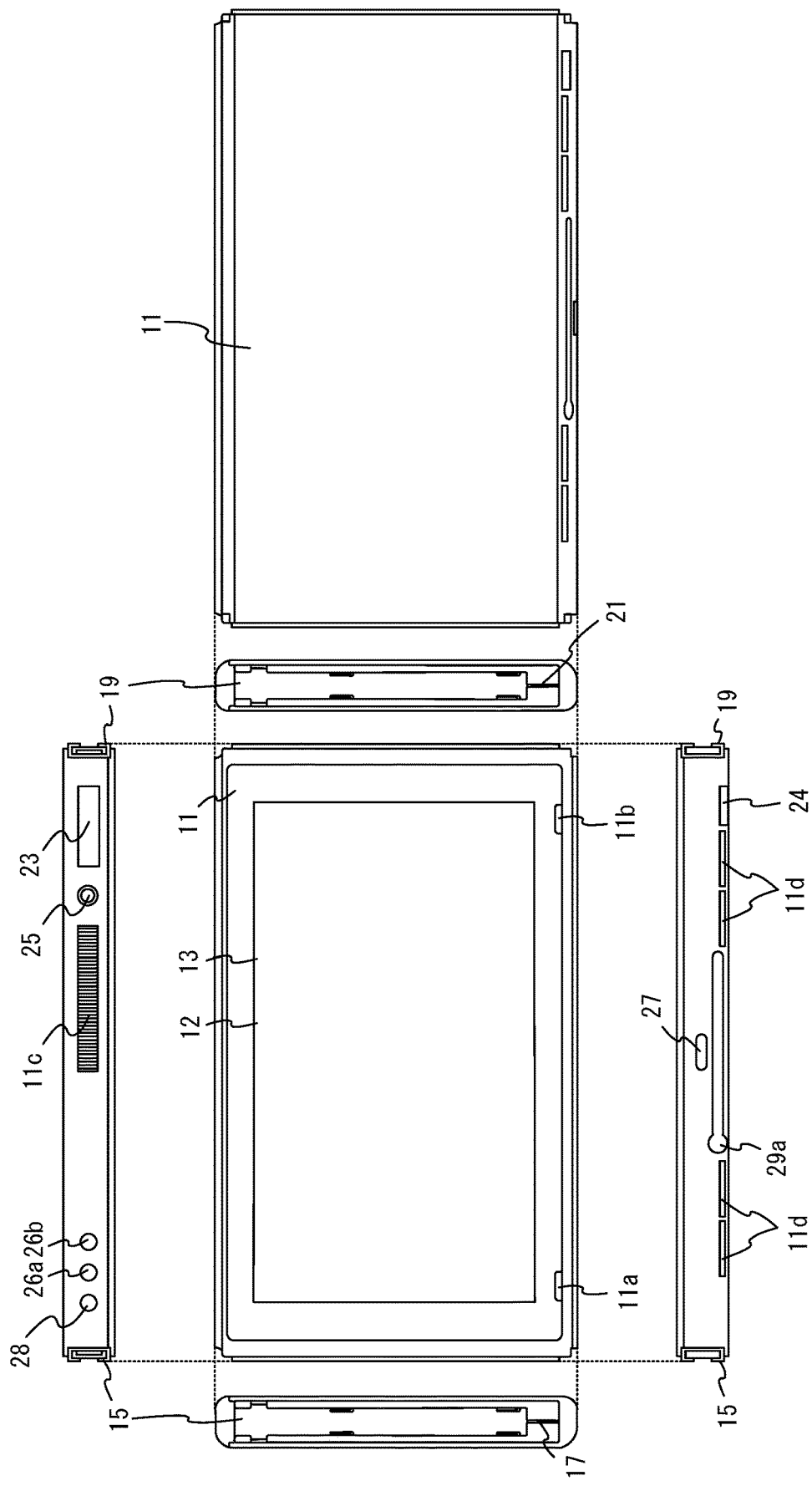
FIG. 3 is a six-sided view showing a non-limiting example of the main unit 2.

FIG. 3 is a six-sided view showing an example of the main unit 2. As shown in FIG. 3, the main unit 2 includes a generally plate-shaped housing 11. In at least one exemplary aspect, the primary surface (in other words, the front-side surface, i.e., the surface on which the display 12 is provided) of the housing 11 has a generally rectangular shape. In at least one exemplary aspect, the housing 11 is assumed to have a horizontally-elongated shape. That is, in at least one exemplary aspect, the longitudinal direction of the primary surface of the housing 11 (i.e., the x-axis direction shown in FIG. 1) is denoted as the horizontal direction (also referred to as the left-right direction), the width direction of the primary surface (i.e., the y-axis direction shown in FIG. 1) is denoted as the vertical direction (also referred to as the up-down direction), and the direction perpendicular to the primary surface (i.e., the z-axis direction shown in FIG. 1) is denoted as the depth direction (also referred to as the front-rear direction). The main unit 2 may be used in a direction in which the main unit 2 is in a landscape position. The main unit 2 may also be used in a direction in which the main unit 2 is in a portrait position. In that case, the housing 11 can be regarded as having a vertically-elongated shape.

Note that there is no particular limitation on the shape and the size of the housing 11. As an example, the housing 11 may be sized so that it can be portable. The main unit 2 alone, or the combined device including the left controller 3 and the right controller 4 attached to the main unit 2 may be a portable device. The main unit 2 or the combined device may be a hand-held device. The main unit 2 or the combined device may be a transportable device.

As shown in FIG. 3, the main unit 2 includes the display 12 provided on the primary surface of the housing 11. The display 12 displays an image (which may be a still image or a video image) obtained or produced by the main unit 2. In at least one exemplary aspect, the display 12 is assumed to be a liquid crystal display device (LCD). Note however that the display 12 may be any type of a display device.

The main unit 2 includes a touch panel 13 on the screen of the display 12. In at least one exemplary aspect, the touch panel 13 is of a type (e.g., the capacitive type) that enables a multi-touch input. Note however that there is no particular limitation on the type of the touch panel 13, and the touch panel 13 may be of a type (e.g., the resistive type) that enables a single-touch input, for example.

The main unit 2 includes a speaker (i.e., a speaker 88 shown in FIG. 6) inside the housing 11. As shown in FIG. 3, speaker holes 11a and 11b are formed in the primary surface of the housing 11. Then, output sounds from the speaker 88 are output respectively through these speaker holes 11a and 11b.

As shown in FIG. 3, the main unit 2 includes a left rail member 15 on the left side surface of the housing 11. The left rail member 15 is a member that allows the left controller 3 to be detachably attached to the main unit 2. The left rail member 15 is provided so as to extend in the up-down direction on the left side surface of the housing 11. The left rail member 15 has such a shape that can engage with a slider of the left controller 3 (i.e., a slider 40 shown in FIG. 4), and the left rail member 15 and the slider 40 together form a slide mechanism. This slide mechanism allows the left controller 3 to be slidably and detachably attached to the main unit 2.

The main unit 2 includes a left-side terminal 17. The left-side terminal 17 allows the main unit 2 to communicate with the left controller 3 in wired communication. The left-side terminal 17 is located so as to be in contact with the terminal of the left controller 3 (a terminal 42 shown in FIG. 4) when the left controller 3 is attached to the main unit 2. There is no particular limitation on the specific position of the left-side terminal 17. In at least one exemplary aspect, as shown in FIG. 3, the left-side terminal 17 is provided on the bottom surface of the left rail member 15. In at least one exemplary aspect, the left-side terminal 17 is provided near the lower end on the bottom surface of the left rail member 15, and is arranged at such a position that the left-side terminal 17 is not exposed to the outside by virtue of a part of the left rail member 15.

As shown in FIG. 3, similar elements to those provided on the left side surface of the housing 11 are provided on the right side surface of the housing 11. That is, the main unit 2 includes a right rail member 19 on the right side surface of the housing 11. The right rail member 19 is provided so as to extend in the up-down direction on the right side surface of the housing 11. The right rail member 19 has such a shape that it can engage with a slider of the right controller 4 (i.e., a slider 62 shown in FIG. 5), and the right rail member 19 and the slider 62 together form a slide mechanism. This slide mechanism allows the right controller 4 to be slidably and detachably attached to the main unit 2.

The main unit 2 includes a right-side terminal 21. The right-side terminal 21 allows the main unit 2 to communicate with the right controller 4 in wired communication. The right-side terminal 21 is located so as to be in contact with the terminal of the right controller 4 (a terminal 64 shown in FIG. 5) when the right controller 4 is attached to the main unit 2. There is no particular limitation on the specific position of the right-side terminal 21. In at least one exemplary aspect, as shown in FIG. 3, the right-side terminal 21 is provided on the bottom surface of the right rail member 19. In at least one exemplary aspect, the right-side terminal 21 is provided near the lower end on the bottom surface of the right rail member 19, and is arranged at such a position that the right-side terminal 21 is not exposed to the outside by virtue of a part of the right rail member 19.

As shown in FIG. 3, the main unit 2 includes a first slot 23. The first slot 23 is provided on the upper side surface of the housing 11. The first slot 23 is shaped so as to accommodate a storage medium of a first type. A storage medium of the first type is, for example, a dedicated storage medium (e.g., a dedicated memory card) for the information processing system or other information processing devices of the same type. The storage medium of the first type is used, for example, for storing data used in the main unit 2 (e.g., application save data, etc.) and/or for storing programs to be executed on the main unit 2 (e.g., application programs, etc.). The main unit 2 also includes a power button 28. As shown in FIG. 3, the power button 28 is provided on the upper side surface of the housing 11. The power button 28 is a button for turning ON/OFF the power of the main unit 2.

The main unit 2 includes a sound input/output terminal (specifically, an earphone jack) 25. That is, the main unit 2 allows a microphone or an earphone to be attached to the sound input/output terminal 25. As shown in FIG. 3, the sound input/output terminal 25 is provided on the upper side surface of the housing 11.

The main unit 2 includes sound volume buttons 26a and 26b. As shown in FIG. 3, the sound volume buttons 26a and 26b are provided on the upper side surface of the housing 11. The sound volume buttons 26a and 26b are buttons for giving instructions to adjust the volume of the sound output from the main unit 2. That is, the sound volume button 26a is a button for giving an instruction to lower the sound volume, and the sound volume button 26b is a button for giving an instruction to raise the sound volume.

The housing 11 is provided with an air outlet hole 11c. As shown in FIG. 3, the air outlet hole 11c is provided on the upper side surface of the housing 11. The air outlet hole 11c is provided so as to radiate (in other words, discharge) the heat generated inside the housing 11 to the outside of the housing 11. That is, the air outlet hole 11c can be said to be a heat-radiating hole.

The main unit 2 includes a lower terminal 27. The lower terminal 27 is a terminal for allowing the main unit 2 to communicate with the cradle. As shown in FIG. 3, the lower terminal 27 is provided on the lower side surface of the housing 11. The lower terminal 27 is connected to a terminal of the cradle when the main unit 2 is attached to the cradle. In at least one exemplary aspect, the lower terminal 27 is a USB connector (more specifically, a female-side connector). Only the main unit 2, with the left controller 3 and the right controller 4 detached from the main unit 2, can be placed in the cradle. In an alternative example, the combined device, including the left controller 3 and the right controller 4 attached to the main unit 2, can be placed in the cradle. The cradle can communicate (either via wired communication or wireless communication) with a stationary monitor (e.g., a stationary TV), which is an example of an external display device separate from the main unit 2. When the combined device or the main unit 2 alone is placed in the cradle, the information processing system can display the image obtained or produced by the main unit 2 on a stationary monitor. In at least one exemplary aspect, the cradle has a function of charging the combined device or the main unit 2 alone. The cradle also has a function as a hub device (specifically, a USB hub).

The main unit 2 also includes a second slot 24. In at least one exemplary aspect, the second slot 24 is provided on the lower side surface of the housing 11. Note however that in other embodiments, the second slot 24 may be provided on the same surface as the first slot 23. The second slot 24 is shaped so as to accommodate a storage medium of a second type, which is different from the first type. A storage medium of the second type may be, for example, a general-purpose storage medium. For example, the storage medium of the second type may be an SD card. As is the storage medium of the first type, the storage medium of the second type is used for storing data used in the main unit 2 (e.g., application save data, etc.) and/or for storing programs to be executed on the main unit 2 (e.g., application programs, etc.).

The housing 11 is provided with an air inlet hole 11d. As shown in FIG. 3, the air inlet hole 11d is provided on the lower side surface of the housing 11. The air inlet hole 11d is provided so as to take in (in other words, introduce) the air from the outside of the housing 11 to the inside of the housing 11. In at least one exemplary aspect, the air inlet hole 11d is provided on the surface opposite from the surface where the air outlet hole 11c is provided, thereby allowing for efficient discharge of the heat from inside the housing 11.

There is no particular limitation on the shape, the number and the arrangement of the various elements (specifically, the buttons, the slots, the terminals, etc.) provided on the housing 11 described above. For example, in other exemplary aspects, some of the power button 28 and the slots 23 and 24 may be provided on another side surface or the rear surface of the housing 11. In other exemplary aspects, some of the elements described above may be absent on the main unit 2.

Figure 4:
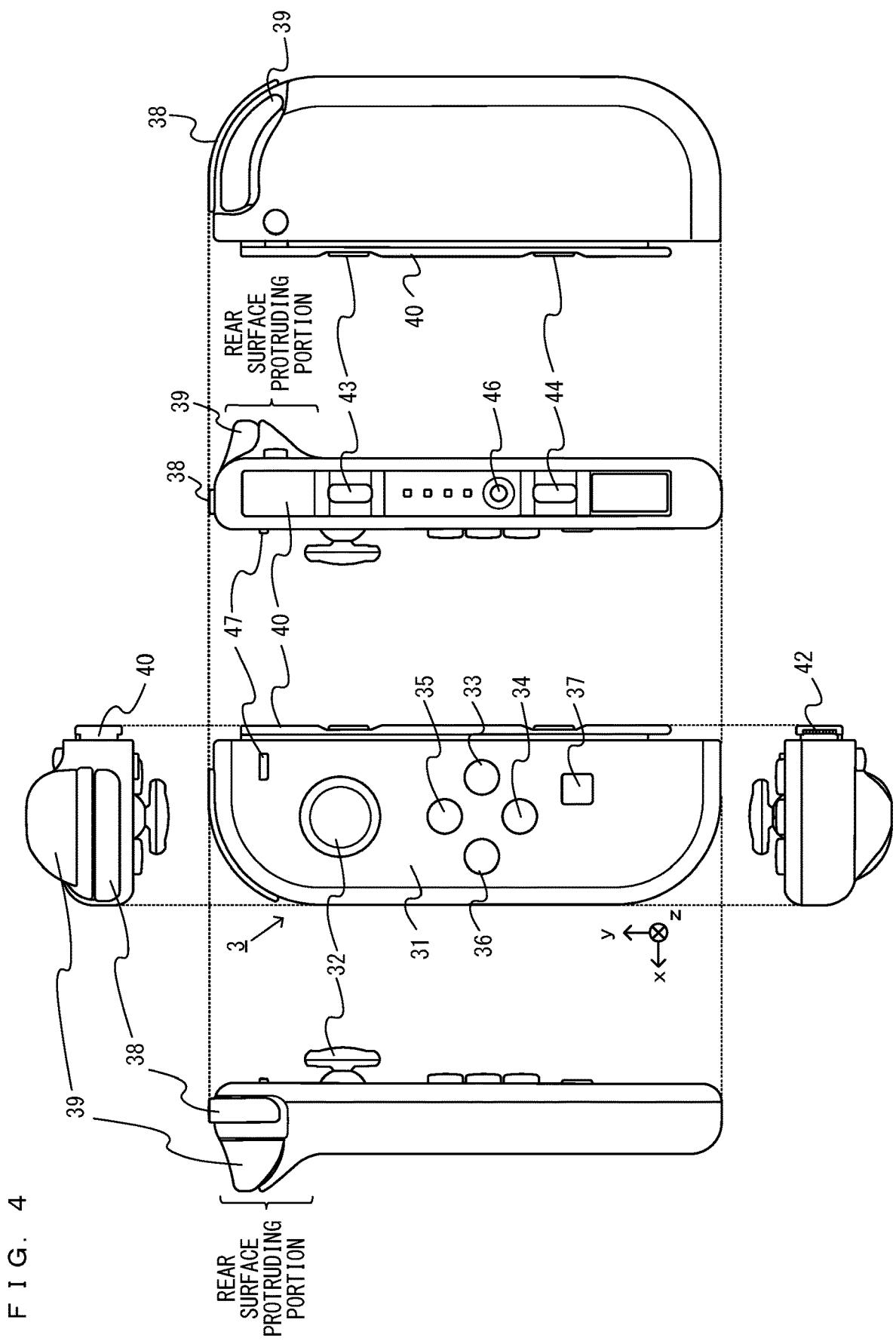
FIG. 4 is a six-sided view showing a non-limiting example of the left controller 3.

FIG. 4 is a six-sided view showing an example of the left controller 3. As shown in FIG. 4, the left controller 3 includes a housing 31. In at least one exemplary aspect, the housing 31 is generally plate-shaped. The primary surface (in other words, the front-side surface, i.e., the surface on the z-axis negative direction side shown in FIG. 1) of the housing 31 has a generally rectangular shape. In at least one exemplary aspect, the housing 31 has a vertically-elongated shape, i.e., a shape that is elongated in the up-down direction (i.e., the y-axis direction shown in FIG. 1). Note that when detached from the main unit 2, the left controller 3 may be held in a portrait position. The housing 31 is shaped and sized so that it can be held in one hand, particularly the left hand, when held in a portrait position. The left controller 3 may also be held in a landscape position. The left controller 3 may be held using both hands when held in a landscape position. Note that there is no particular limitation on the shape of the housing 31, and the housing 31 does not need to be generally plate-shaped in other exemplary aspects. The housing 31 does not need to have a rectangular shape, but may have a semi-circular shape, or the like, for example. The housing 31 does not need to have a vertically-elongated shape.

The length of the housing 31 in the up-down direction is generally equal to the length of the housing 11 of the main unit 2 in the up-down direction. The thickness of the housing 31 (i.e., the length thereof in the front-rear direction; in other words, the length thereof in the z-axis direction shown in FIG. 1) is generally equal to the thickness of the housing 11 of the main unit 2. Therefore, when the left controller 3 is attached to the main unit 2 (see FIG. 1), a user can hold the main unit 2 and the left controller 3 as if they were an integral unit.

As shown in FIG. 4, the left-side corner portion of the primary surface of the housing 31 has a more rounded shape than the right-side corner portion thereof. That is, the connecting portion between the upper side surface and the left side surface of the housing 31 and the connecting portion between the lower side surface and the left side surface of the housing 31 are more rounded (in other words, round-cornered with a greater radius) than the connecting portion between the upper side surface and the right side surface and the connecting portion between the lower side surface and the right side surface. Therefore, when the left controller 3 is attached to the main unit 2 (see FIG. 1), the left side of the combined device will have a rounded shape, making it easier for a user to hold the device.

The left controller 3 includes an analog stick 32. As shown in FIG. 4, the analog stick 32 is provided on the primary surface of the housing 31. The analog stick 32 is an example of a directional input section allowing a user to input a direction. The analog stick 32 includes a stick member that can be tilted in any direction (i.e., 360° directions including the upper, lower, left, right and diagonal directions) parallel to the primary surface of the housing 31. A user can tilt the stick member to make a direction input based on the tilt direction (and a magnitude input based on the tilt angle). Note that the directional input section may also be a cross-shaped key, a slide stick, or the like. In at least one exemplary aspect, a user can also make an input by pressing down the stick member (in a direction vertical to the housing 31). That is, the analog stick 32 is an input section that allows a user to make a direction input and a magnitude input based on the tilt direction and the tilt amount, respectively, of the stick member, and also to make a push input by pressing down the stick member.

The left controller 3 includes four operation buttons 33 to 36 (specifically, a right direction button 33, a lower direction button 34, an upper direction button 35 and a left direction button 36). As shown in FIG. 4, these four operation buttons 33 to 36 are provided below the analog stick 32 on the primary surface of the housing 31. Note that while four operation buttons are provided on the primary surface of the left controller 3 in the present exemplary aspect, there is no particular limitation on the number of operation buttons. These operation buttons 33 to 36 are used to give instructions in accordance with various programs executed on the main unit 2 (e.g., the OS program and application programs). Note that the operation buttons 33 to 36 can be used to make directional inputs, and the operation buttons 33 to 36 are therefore referred to as the right direction button 33, the lower direction button 34, the upper direction button 35 and the left direction button 36. Note however that the operation buttons 33 to 36 may be used to give instructions other than directional inputs.

The left controller 3 also includes a record button 37. As shown in FIG. 4, the record button 37 is provided on the primary surface of the housing 31, more specifically, in a lower right area of the primary surface. The record button 37 is a button for giving an instruction to save the image displayed on the display 12 of the main unit 2. For example, when a game image is displayed on the display 12, a user can press the record button 37 to save the game image that is displayed at the point in time when the button is pressed in a storage section of the main unit 2, for example.

The left controller 3 also includes a minus (−) button 47 that has the shape of the character "−". As shown in FIG. 4, the minus button 47 is provided on the primary surface of the housing 31, more specifically, in an upper right area of the primary surface. The minus button 47 is used to give instructions in accordance with various programs executed on the main unit 2 (e.g., the OS program and application programs). The minus button 47 is used, for example, as a select button (e.g., a button used to move the selection through different selection items) in game applications.

When the left controller 3 is attached to the main unit 2, the operation sections provided on the primary surface of the left controller 3 (specifically, the analog stick 32 and the buttons 33 to 37 and 47) are operated with the thumb of the left hand, for example, of a user holding the combined device. When the left controller 3 is used detached from the main unit 2 and held in a landscape position using both hands, the operation sections are operated with the left and right thumbs, for example, of a user holding the left controller 3. Specifically, in such a case, the analog stick 32 is operated by the thumb of the left hand of the user, and the operation buttons 33 to 36 are operated with the thumb of the right hand of the user.

The left controller 3 includes a first L button 38. The left controller 3 also includes a ZL button 39. As are the operation buttons 33 to 36, these operation buttons 38 and 39 are used to give instructions in accordance with various programs executed on the main unit 2. As shown in FIG. 4, the first L button 38 is provided over a corner portion between the left side surface and the upper side surface of the housing 31. The ZL button 39 is provided to extend over a corner portion between the left side surface and the upper side surface of the housing 31 (strictly speaking, between the left side surface and the upper side surface as seen from the front side of the housing 31) while extending into the reverse surface of the housing 31. That is, the ZL button 39 is provided on the rear side (the z-axis positive direction side shown in FIG. 1) of the first L button 38. In at least one exemplary aspect, since the upper left corner portion of the housing 31 has a rounded shape, the first L button 38 and the ZL button 39 each have a rounded shape in conformity with the rounded shape of the upper left corner portion of the housing 31. When the left controller 3 is attached to the main unit 2, the first L button 38 and the ZL button 39 will be placed over the upper left portion of the combined device.

The left controller 3 includes the slider 40 described above. As shown in FIG. 4, the slider 40 is provided so as to extend in the up-down direction on the right side surface of the housing 31. The slider 40 has such a shape that it can engage with the left rail member 15 (more specifically, the groove of the left rail member 15) of the main unit 2. Therefore, the slider 40 in engagement with the left rail member 15 is locked so as not to come off in the direction perpendicular to the sliding direction (in other words, the direction in which the left rail member 15 extends).

The left controller 3 includes the terminal 42 for allowing the left controller 3 to communicate with the main unit 2 in wired communication. The terminal 42 is located so as to be in contact with the left-side terminal 17 of the main unit 2 (FIG. 3) when the left controller 3 is attached to the main unit 2. There is no particular limitation on the specific position of the terminal 42. In at least one exemplary aspect, as shown in FIG. 4, the terminal 42 is provided at such a position that it is not exposed to the outside by virtue of the engaging surface of the slider 40. In at least one exemplary aspect, the terminal 42 is provided near the lower end on the engaging surface of the slider 40.

The left controller 3 also includes a second L button 43 and a second R button 44. As are the other operation buttons 33 to 36, these buttons 43 and 44 are used to give instructions in accordance with various programs executed on the main unit 2. As shown in FIG. 4, the second L button 43 and the second R button 44 are provided on the engaging surface of the slider 40. The second L button 43 is provided on the engaging surface of the slider 40 above the center of the engaging surface with respect to the up-down direction (the y-axis direction shown in FIG. 1). The second R button 44 is provided on the engaging surface of the slider 40 below the center of the engaging surface with respect to the up-down direction. The second L button 43 and the second R button 44 are arranged at such positions that they cannot be pressed down with the left controller 3 attached to the main unit 2. That is, the second L button 43 and the second R button 44 are buttons that are used when the left controller 3 is detached from the main unit 2. For example, the second L button 43 is operated with the index finger or the middle finger of the left hand of a user holding the left controller 3 detached from the main unit 2 in a landscape position with the engaging surface of the slider 40 facing upward. For example, the second R button 44 is operated with the index finger or the middle finger of the right hand of a user holding the left controller 3 detached from the main unit 2 in a landscape position with the engaging surface of the slider 40 facing upward. When the left controller 3 is attached to the steering wheel-shaped attachment 200, the second L button 43 and the second R button 44 can be operated by operating the operation portions provided on the steering wheel-shaped attachment 200 with the index finger or the middle finger of the left hand and the right hand of a user holding the steering wheel-shaped attachment 200.

The left controller 3 includes a pairing button 46. In at least one exemplary aspect, the pairing button 46 is used to give an instruction for a setting (referred to also as pairing) process regarding wireless communication between the left controller 3 and the main unit 2, and to give an instruction for a resetting process of resetting the left controller 3. Note that in other exemplary aspects, the pairing button 46 may only serve to instruct one of the setting process and the resetting process. For example, when a short-press operation is performed on the pairing button 46 (specifically, when the pairing button 46 is pressed down for a shorter period of time than a predetermined period of time), the left controller 3 executes the setting process. When a long-press operation is performed on the pairing button 46 (specifically, when the pairing button 46 is held down for the predetermined period of time or longer), the left controller 3 executes the resetting process. In at least one exemplary aspect, the pairing button 46 is provided on the engaging surface of the slider 40 as shown in FIG. 4. Thus, the pairing button 46 is arranged at such a position that the pairing button 46 cannot be seen when the left controller 3 is attached to the main unit 2. That is, the pairing button 46 is used when the left controller 3 is detached from the main unit 2.

In at least one exemplary aspect, the buttons provided on the engaging surface of the slider 40 (specifically, the second L button 43, the second R button 44 and the pairing button 46) are provided so as not to protrude past the engaging surface. That is, the upper surface (in other words, the surface to be pressed) of these buttons is arranged flush with the engaging surface of the slider 40 or arranged at a position sunken from the engaging surface. This allows the slider 40 to slide smoothly against the left rail member 15 when the slider 40 is engaged with the left rail member 15 of the main unit 2.

Figure 5:
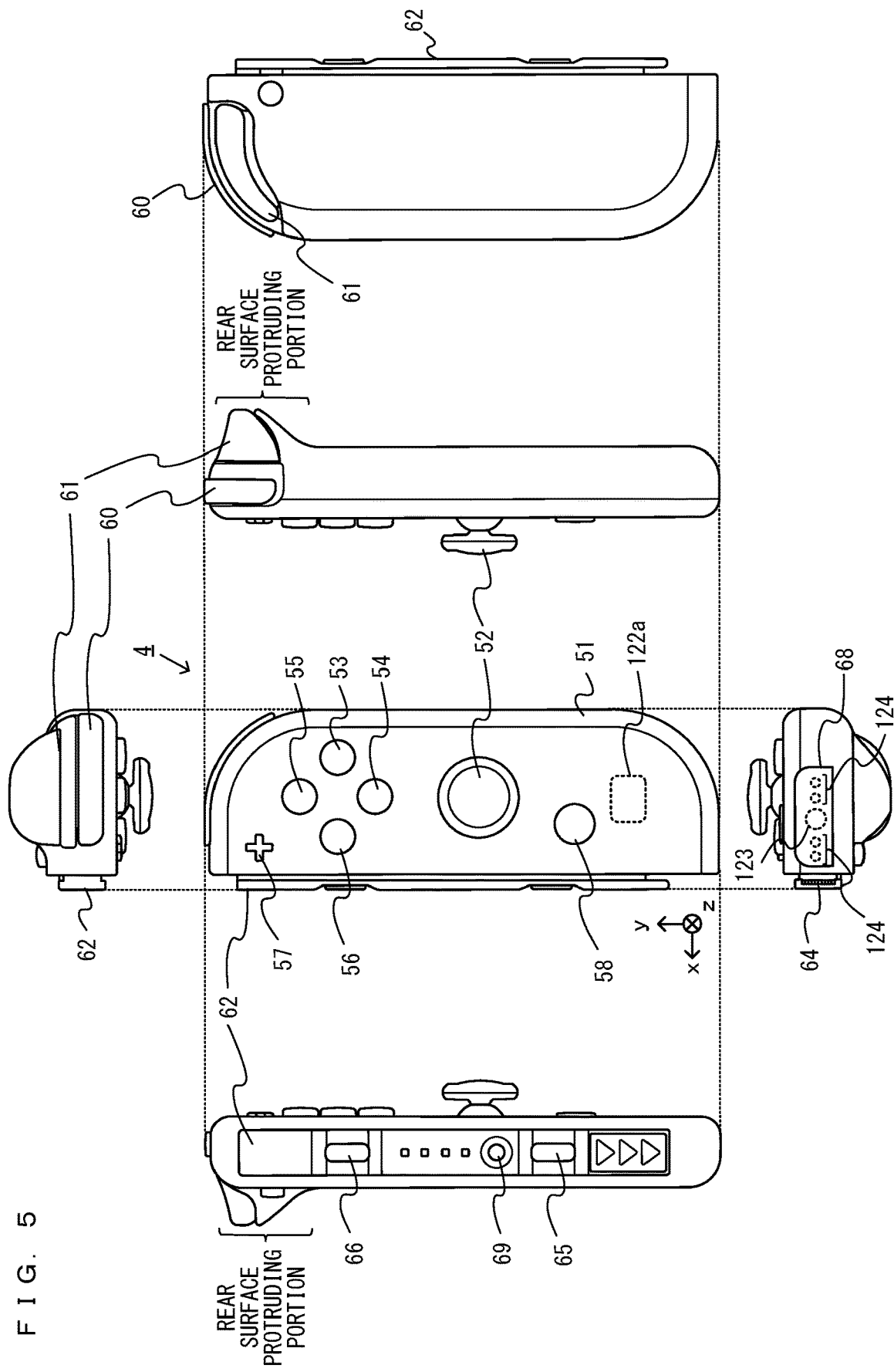
FIG. 5 is a six-sided view showing a non-limiting example of the right controller 4.

FIG. 5 is a six-sided view showing an example of the right controller 4. As shown in FIG. 5, the right controller 4 includes a housing 51. In at least one exemplary aspect, the housing 51 is generally plate-shaped. The primary surface (in other words, the front-side surface, i.e., the surface on the z-axis negative direction side shown in FIG. 1) of the housing 51 has a generally rectangular shape. In at least one exemplary aspect, the housing 51 has a vertically-elongated shape, i.e., a shape that is elongated in the up-down direction. When detached from the main unit 2, the right controller 4 may be held in a portrait position. The housing 51 is shaped and sized so that it can be held in one hand, particularly the left hand, when held in a portrait position. The right controller 4 may also be held in a landscape position. The right controller 4 may be held using both hands when held in a landscape position.

As with the housing 31 of the left controller 3, the length of the housing 51 of the right controller 4 in the up-down direction is generally equal to the length of the housing 11 of the main unit 2 in the up-down direction, and the thickness thereof is generally equal to the thickness of the housing 11 of the main unit 2. Therefore, when the right controller 4 is attached to the main unit 2 (see FIG. 1), a user can hold the main unit 2 and the right controller 4 as if they were an integral unit.

As shown in FIG. 5, the right-side corner portion of the primary surface of the housing 51 has a more rounded shape than the left-side corner portion thereof. That is, the connecting portion between the upper side surface and the right side surface of the housing 51 and the connecting portion between the lower side surface and the right side surface of the housing 51 are more rounded (in other words, round-cornered with a greater radius) than the connecting portion between the upper side surface and the left side surface and the connecting portion between the lower side surface and the left side surface. Therefore, when the right controller 4 is attached to the main unit 2 (see FIG. 1), the right side of the combined device will have a rounded shape, making it easier for a user to hold the device.

As does the left controller 3, the right controller 4 includes an analog stick 52 as the directional input section. In at least one exemplary aspect, the analog stick 52 has the same configuration as the analog stick 32 of the left controller 3. As does the left controller 3, the right controller 4 includes four operation buttons 53 to 56 (specifically, the A button 53, the B button 54, the X button 55 and the Y button 56). In at least one exemplary aspect, these four operation buttons 53 to 56 are of the same mechanism as the four operation buttons 33 to 36 of the left controller 3. As shown in FIG. 5, the analog stick 52 and the operation buttons 53 to 56 are provided on the primary surface of the housing 51. Note that while the number of operation buttons provided on the primary surface of the right controller 4 is four, there is no particular limitation on the number of operation buttons.

In at least one exemplary aspect, the positional relationship between the two types of operation sections (the analog stick and the operation buttons) of the right controller 4 is opposite from the positional relationship between these two types of operation sections of the left controller 3. That is, the analog stick 52 is arranged above the operation buttons 53 to 56 on the right controller 4, whereas the analog stick 32 is arranged below the operation buttons 33 to 36 on the left controller 3. With such an arrangement, the left controller 3 and the right controller 4, when detached from the main unit 2, can be operated in a similar fashion.

The right controller 4 also includes a plus (+) button 57 that has the shape of the character "+". As shown in FIG. 5, the plus button 57 is provided on the primary surface of the housing 51, more specifically, in an upper left area of the primary surface. As are the other operation buttons 53 to 56, the plus button 57 is used to give instructions in accordance with various programs executed on the main unit 2 (e.g., the OS program and application programs). The plus button 57 is used, for example, as a start button in a game application (e.g., a button used to give an instruction to start the game).

The right controller 4 includes a home button 58. As shown in FIG. 5, the home button 58 is provided on the primary surface of the housing 51, more specifically, in a lower left area of the primary surface. The home button 58 is a button for displaying a predetermined menu screen on the display 12 of the main unit 2. The menu screen is, for example, a screen where a user can launch an application specified by the user, from among a plurality of applications that can be executed on the main unit 2. The menu screen may be displayed at the start-up of the main unit 2, for example. In at least one exemplary aspect, a predetermined control screen may be displayed on the display 12 (the menu screen may be displayed instead of the control screen) when the home button 58 is pressed while an application is executed on the main unit 2 (i.e., while the image of the application is displayed on the display 12). Note that the control screen is, for example, a screen where a user can give an instruction to end an application and display the menu screen on the display 12, and an instruction to resume an application, etc.

The operation sections provided on the primary surface of the right controller 4 (specifically, the analog stick 52 and the buttons 53 to 58) are operated with the thumb of the right hand, for example, of a user holding the combined device when the right controller 4 is attached to the main unit 2. When the right controller 4 is used detached from the main unit 2 and held in a landscape position using both hands, the operation sections are operated with the left and right thumbs, for example, of a user holding the right controller 4. Specifically, in such a case, the analog stick 52 is operated with the thumb of the left hand of the user, and the operation buttons 53 to 56 are operated with the thumb of the right hand of the user.

The right controller 4 includes a first R button 60. The right controller 4 includes a ZR button 61. As shown in FIG. 5, the first R button 60 is provided over a corner portion between the right side surface and the upper side surface of the housing 51. The ZR button 61 is provided to extend over a corner portion between the right side surface and the upper side surface of the housing 51 (strictly speaking, between the right side surface and the upper side surface as seen from the front side of the housing 51) while extending into the reverse surface of the housing 51. That is, the ZR button 61 is provided on the rear side (the z-axis positive direction side shown in FIG. 1) of the first R button 60. In at least one exemplary aspect, since the upper right corner portion of the housing 51 has a rounded shape, the first R button 60 and the ZR button 61 each have a rounded shape in conformity with the rounded shape of the upper right portion of the housing 51. When the right controller 4 is attached to the main unit 2, the first R button 60 and the ZR button 61 will be placed over the upper right portion of the combined device.

The right controller 4 includes a similar slider mechanism to that of the left controller 3. That is, the right controller 4 includes the slider 62 described above. As shown in FIG. 5, the slider 62 is provided so as to extend in the up-down direction on the left side surface of the housing 51. The slider 62 has such a shape that it can engage with the right rail member 19 (more specifically, the groove of the right rail member 19) of the main unit 2. Therefore, the slider 62 in engagement with the right rail member 19 is locked so as not to come off in the direction perpendicular to the sliding direction (in other words, the direction in which the right rail member 19 extends).

The right controller 4 includes the terminal 64 for allowing the right controller 4 to communicate with the main unit 2 in wired communication. The terminal 64 is located so as to be in contact with the right-side terminal 21 of the main unit 2 (FIG. 3) when the right controller 4 is attached to the main unit 2. There is no particular limitation on the specific position of the terminal 64. In at least one exemplary aspect, as shown in FIG. 5, the terminal 64 is provided at such a position that it is not exposed to the outside by virtue of the engaging surface of the slider 62. In at least one exemplary aspect, the terminal 64 is provided near the lower end on the engaging surface of the slider 62.

As does the left controller 3, the right controller 4 also includes a second L button 65 and a second R button 66. As are the operation buttons 53 to 56, these buttons 65 and 66 are used to give instructions in accordance with various programs executed on the main unit 2. As shown in FIG. 5, the second L button 65 and the second R button 66 are provided on the engaging surface of the slider 62. The second L button 65 is provided on the engaging surface of the slider 62 below the center of the engaging surface with respect to the up-down direction (the y-axis direction shown in FIG. 1). The second R button 66 is provided on the engaging surface of the slider 62 above the center of the engaging surface with respect to the up-down direction. As are the second L button 43 and the second R button 44 of the left controller 3, the second L button 65 and the second R button 66 are arranged at such positions that they cannot be pressed down with the right controller 4 attached to the main unit 2, and they are buttons that are used when the right controller 4 is detached from the main unit 2. For example, the second L button 65 is operated with the index finger or the middle finger of the left hand of a user holding the right controller 4 detached from the main unit 2 in a landscape position with the engaging surface of the slider 62 facing upward. For example, the second R button 66 is operated with the index finger or the middle finger of the right hand of a user holding the right controller 4 detached from the main unit 2 in a landscape position with the engaging surface of the slider 62 facing upward. When the right controller 4 is attached to the steering wheel-shaped attachment 200, the second L button 65 and the second R button 66 can be operated by operating the operation portions provided on the steering wheel-shaped attachment 200 with the index finger or the middle finger of the left hand and the right hand of a user holding the steering wheel-shaped attachment 200.

The right controller 4 includes a pairing button 69. As is the pairing button 46 of the left controller 3, the pairing button 69 is used to give an instruction for a setting (referred to also as "pairing") process regarding wireless communication between the right controller 4 and the main unit 2, and to give an instruction for a resetting process of resetting the right controller 4. The setting process and the resetting process are the same as those for the left controller 3, and will not therefore be described in detail below. In at least one exemplary aspect, the pairing button 69 is provided on the engaging surface of the slider 62 as shown in FIG. 5. That is, for the same reason for the pairing button 46 of the left controller 3, the pairing button 69 is arranged at such a position that the pairing button 69 cannot be seen with the right controller 4 attached to the main unit 2.

With the right controller 4, as with the left controller 3, the buttons provided on the engaging surface of the slider 62 (specifically, the second L button 65, the second R button 66 and the pairing button 69) are provided so as not to protrude past the engaging surface. This allows the slider 62 to slide smoothly against the right rail member 19 when the slider 62 is engaged with the right rail member 19 of the main unit 2.

A window portion 68 is provided in the lower side surface of the housing 51. The right controller 4 includes an infrared image-capturing section 123 and an infrared light-emitting section 124 arranged inside the housing 51. The infrared image-capturing section 123 captures an image around the right controller 4 through the window portion 68, wherein the image-capturing direction is the downward direction of the right controller 4 (the y-axis negative direction shown in FIG. 5). The infrared light-emitting section 124 irradiates a member whose image is to be captured by the infrared image-capturing section 123 with infrared light through the window portion 68, wherein the range of irradiation is a predetermined range that is centered around the downward direction of the right controller 4 (the y-axis negative direction shown in FIG. 5).

The right controller 4 includes an NFC communication section 122. The NFC communication section 122 implements near-field wireless communication in accordance with the NFC (Near Field Communication) standard. The NFC communication section 122 includes an antenna 122a used for the near-field wireless communication, and a circuit (e.g., an NFC chip) for generating a signal (radio wave) to be transmitted from the antenna 122a. For example, the antenna 122a is provided at such a position inside the housing 51 that it is possible to communicate, in the near-field wireless communication, with another wireless communication device (e.g., an NFC tag), which is the target of the near-field wireless communication, when the wireless communication device is arranged in another device that is in the vicinity of, or in contact with, the area under the primary surface of the housing 51. Note that the near-field wireless communication is not limited to those based on the NFC standard, but may also be any proximity communication (referred to also as non-contact communication). The proximity communication for example includes communication schemes in which one device generates an electromotive force on the other device by radio waves therefrom (e.g., through electromagnetic induction).

Note that for the left controller 3 and the right controller 4, there is no particular limitation on the shape, the number and the arrangement of the various elements (specifically, the slider, the stick, the buttons, etc.) provided on the housing 31 or 51. For example, in other exemplary aspects, the left controller 3 and the right controller 4 may include a directional input section of a different type from an analog stick. The slider 40 or 62 may be arranged at a position that corresponds to the position of the rail member 15 or 19 provided on the main unit 2, and may be, for example, arranged on the primary surface or the reverse surface of the housing 31 or 51. In other exemplary aspects, one or more of the various elements described above may be absent from the left controller 3 and the right controller 4.

Figure 6:
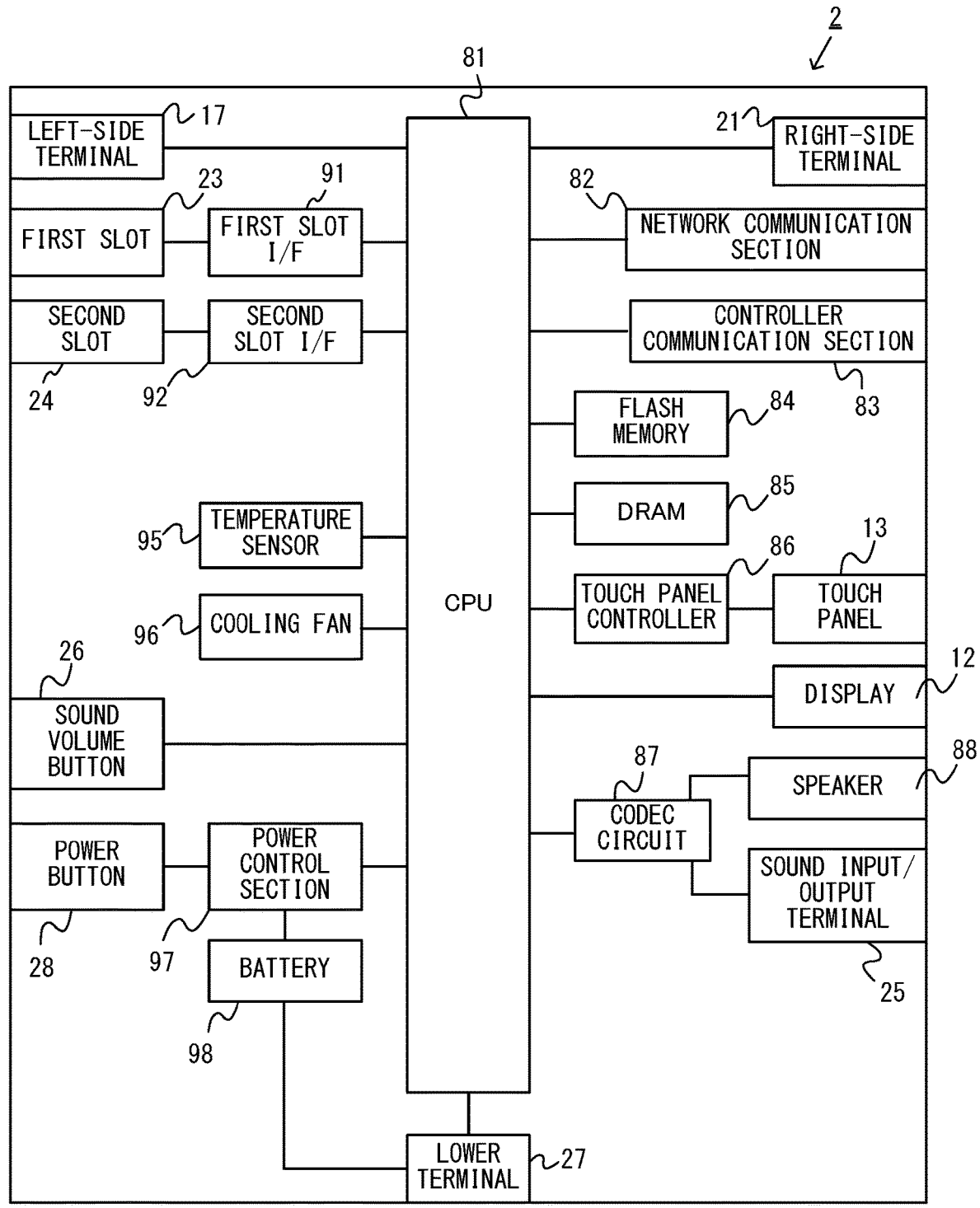
FIG. 6 is a block diagram showing a non-limiting example internal configuration of the main unit 2.

FIG. 6 is a block diagram showing an example internal configuration of the main unit 2. In addition to the elements shown in FIG. 3, the main unit 2 also includes elements 81 to 98 shown in FIG. 6. Some of these elements 81 to 98 may be mounted, as electronic components, on an electronic circuit board and accommodated in the housing 11.

The main unit 2 includes a CPU (Central Processing Unit) 81. The CPU 81 is an information processing section for executing various information processes to be executed on the main unit 2. The CPU 81 executes various information processes by executing an information processing program (e.g., a game program) stored in a storage section (specifically, an internal storage medium such as a flash memory 84 or external storage media attached to the slots 23 and 24, etc.).

The main unit 2 includes, as an example internal storage medium provided in the main unit 2, the flash memory 84 and a DRAM (Dynamic Random Access Memory) 85. The flash memory 84 and the DRAM 85 are connected to the CPU 81. The flash memory 84 is a memory used primarily for storing various data (which may be programs) saved on the main unit 2. The DRAM 85 is a memory used for temporarily storing various data used in information processes.

The main unit 2 includes a first slot interface (hereinafter abbreviated as "I/F") 91. The main unit 2 also includes a second slot I/F 92. The first slot I/F 91 and the second slot I/F 92 are connected to the CPU 81. The first slot I/F 91 is connected to the first slot 23, and reads and writes data from and to a storage medium of the first type (e.g., an SD card) inserted in the first slot 23, in response to an instruction from the CPU 81. The second slot I/F 92 is connected to the second slot 24, and reads and writes data from and to a storage medium of the second type (e.g., a dedicated memory card) inserted in the second slot 24, in response to an instruction from the CPU 81.

The CPU 81 executes the information processes described above by reading and writing data from and to the flash memory 84 and the DRAM 85 and the storage media.

The main unit 2 includes a network communication section 82. The network communication section 82 is connected to the CPU 81. The network communication section 82 communicates (specifically, in wireless communication) with an external device via a network. In at least one exemplary aspect, the network communication section 82 communicates with an external device via connection with a wireless LAN based on a scheme that is in conformity with the Wi-Fi standard, which is the first mode of communication. Also, the network communication section 82 communicates in wireless communication with other main units 2 of the same kind based on a predetermined communication scheme (e.g., communication based on a proprietary protocol or infrared communication), which is the second mode of communication. Note that with the wireless communication in the second mode of communication described above, it is possible to communicate in wireless communication with other main units 2 placed within a closed local network area, thus implementing the function of enabling so-called "local communication", in which data is exchanged via direct communication between a plurality of main units 2.

The main unit 2 includes a controller communication section 83. The controller communication section 83 is connected to the CPU 81. The controller communication section 83 communicates with the left controller 3 and/or the right controller 4 in wireless communication. While there is no particular limitation on the communication scheme between the main unit 2 and the left controller 3 and the right controller 4, the controller communication section 83 may communicate with the left controller 3 and the right controller 4 in accordance with the Bluetooth (registered trademark) standard.

The CPU 81 is connected to the left-side terminal 17, the right-side terminal 21 and the lower terminal 27 described above. When communicating with the left controller 3 in wired communication, the CPU 81 transmits data to the left controller 3 via the left-side terminal 17 and receives operation data from the left controller 3 via the left-side terminal 17. When communicating with the right controller 4 in wired communication, the CPU 81 transmits data to the right controller 4 via the right-side terminal 21 and receives operation data from the right controller 4 via the right-side terminal 21. When communicating with the cradle, the CPU 81 transmits data to the cradle via the lower terminal 27. Thus in at least one exemplary aspect, the main unit 2 is capable of communicating with the left controller 3 and the right controller 4 either in wired communication or in wireless communication. When the combined device including the left controller 3 and the right controller 4 attached to the main unit 2, or the main unit 2 alone, is attached to the cradle, the main unit 2 can output data (e.g., image data and sound data) to a stationary monitor, or the like, via the cradle.

The main unit 2 can communicate with a plurality of left controllers 3 simultaneously (in other words, in parallel). The main unit 2 can communicate with a plurality of right controllers 4 simultaneously (in other words, in parallel). Therefore, users can make inputs to the main unit 2 by using a plurality of left controllers 3 and a plurality of right controllers 4.

The main unit 2 includes a touch panel controller 86, which is a circuit for controlling the touch panel 13. The touch panel controller 86 is connected between the touch panel 13 and the CPU 81. Based on a signal from the touch panel 13, for example, the touch panel controller 86 generates data representing the position at which the touch input has been performed, and outputs the data to the CPU 81.

The display 12 is connected to the CPU 81. The CPU 81 displays images generated and/or images obtained from outside on the display 12 (e.g., by executing the information processes described above).

The main unit 2 includes a codec circuit 87 and a speaker (specifically, a left speaker and a right speaker) 88. The codec circuit 87 is connected to the speaker 88 and the sound input/output terminal 25, and is also connected to the CPU 81. The codec circuit 87 is a circuit for controlling the input/output of sound data to/from the speaker 88 and the sound input/output terminal 25. That is, when sound data is received from the CPU 81, the codec circuit 87 outputs, to the speaker 88 or the sound input/output terminal 25, a sound signal obtained by performing a D/A conversion on the sound data. Thus, a sound is output from the speaker 88 or a sound output section (e.g., an earphone) connected to the sound input/output terminal 25. When a sound signal is received from the sound input/output terminal 25, the codec circuit 87 performs an A/D conversion on the sound signal and outputs sound data of a predetermined format to the CPU 81. The sound volume button 26 is connected to the CPU 81. The CPU 81 controls the sound volume of the output from the speaker 88 or the sound output section based on an input on the sound volume button 26.

The main unit 2 includes a power control section 97 and a battery 98. The power control section 97 is connected to the battery 98 and the CPU 81. Although not shown in the figure, the power control section 97 is connected to various sections of the main unit 2 (specifically, various sections receiving power supply from the battery 98, the left-side terminal 17 and the right-side terminal 21). The power control section 97 controls the power supply from the battery 98 to the various sections based on an instruction from the CPU 81. The power control section 97 is connected to the power button 28. The power control section 97 controls the power supply to the various sections based on an input on the power button 28. That is, when the power-OFF operation is performed on the power button 28, the power control section 97 stops the power supply to some or all of the various sections, and when the power-ON operation is performed on the power button 28, the power control section 97 starts the power supply to some or all of the various sections. The power control section 97 also outputs, to the CPU 81, information representing the input on the power button 28 (specifically, information indicating whether or not the power button 28 is being pressed).

The battery 98 is connected to the lower terminal 27. Where an external charging device (e.g., the cradle) is connected to the lower terminal 27, and power is supplied to the main unit 2 via the lower terminal 27, the battery 98 is charged with the power supplied thereto.

The main unit 2 includes a cooling fan 96 for radiating heat from inside the main unit 2. With the cooling fan 96 in operation, the air outside the housing 11 is introduced into the housing 11 through the air inlet hole 11*d* and the air inside the housing 11 is discharged through the air outlet hole 11*c*, thereby discharging heat from inside the housing 11. The cooling fan 96 is connected to the CPU 81, and the operation of the cooling fan 96 is controlled by the CPU 81. The main unit 2 includes a temperature sensor 95 for detecting the temperature inside the main unit 2. The temperature sensor 95 is connected to the CPU 81, and the detection results of the temperature sensor 95 are output to the CPU 81. The CPU 81 controls the operation of the cooling fan 96 based on the detection results of the temperature sensor 95.

Figure 7:
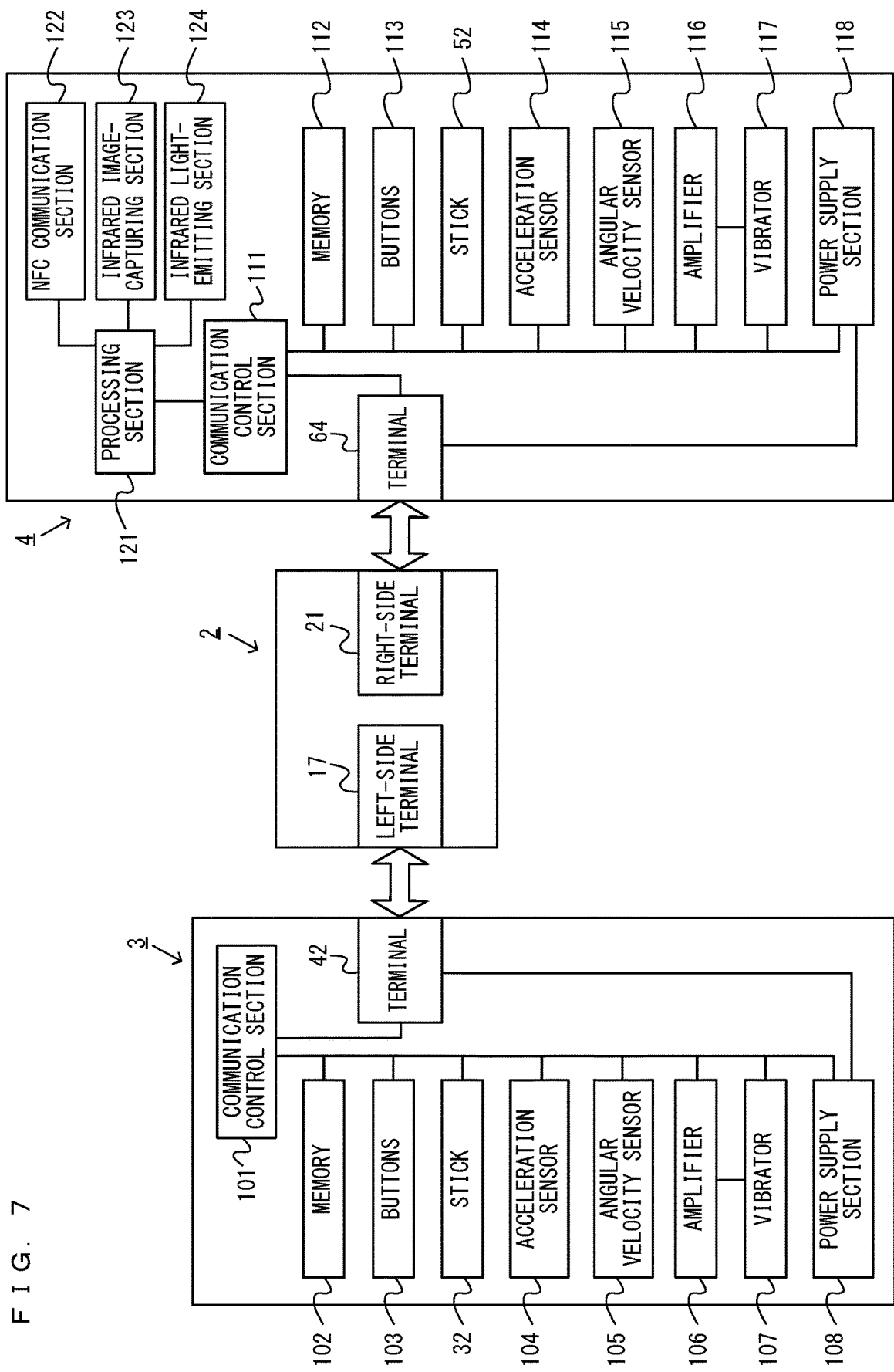
FIG. 7 is a block diagram showing a non-limiting example internal configuration of the main unit 2, the left controller 3 and the right controller 4.

FIG. 7 a block diagram showing an example internal configuration the main unit 2, the left controller 3 and the right controller 4. Note that the details of the internal configuration that are related to the main unit 2 are shown in FIG. 6, and are therefore not shown in FIG. 7.

The left controller 3 includes a communication control section 101 for communicating with the main unit 2. As shown in FIG. 7, the communication control section 101 is connected to various elements including the terminal 42. In at least one exemplary aspect, the communication control section 101 is capable of communicating with the main unit 2 both in wired communication via the terminal 42 and in wireless communication without using the terminal 42. The communication control section 101 controls the communication method used by the left controller 3 for communicating with the main unit 2. That is, when the left controller 3 is attached to the main unit 2, the communication control section 101 communicates with the main unit 2 via the terminal 42. When the left controller 3 is detached from the main unit 2, the communication control section 101 communicates with the main unit 2 (specifically, with the controller communication section 83) in wireless communication. The wireless communication between the controller communication section 83 and the communication control section 101 is in accordance with the Bluetooth (registered trademark) standard, for example.

The left controller 3 includes a memory 102 such as a flash memory, for example. The communication control section 101 is a microcomputer (referred to also as a microprocessor), for example, and executes various processes by executing firmware stored in the memory 102.

The left controller 3 includes the buttons 103 (specifically, the buttons 33 to 39, 43, 44 and 46). The left controller 3 includes the analog stick (labeled "stick" in FIG. 7) 32. The buttons 103 and the analog stick 32 repeatedly output, with appropriate timing, information regarding operations performed thereon to the communication control section 101.

The left controller 3 includes an acceleration sensor 104. In at least one exemplary aspect, the acceleration sensor 104 detects the magnitude of the linear acceleration along directions of threes predetermined axes (e.g., the xyz axes shown in FIG. 4). Note that the acceleration sensor 104 may detect acceleration in one axis direction or two axis directions. The left controller 3 includes an angular velocity sensor 105. In at least one exemplary aspect, the angular velocity sensor 105 detects the angular velocity about three predetermined axes (e.g., the xyz axes shown in FIG. 4). Note that the angular velocity sensor 105 may detect the angular velocity about one axis or two axes. The acceleration sensor 104 and the angular velocity sensor 105 are each connected to the communication control section 101. Then, the detection results of the acceleration sensor 104 and the angular velocity sensor 105 are repeatedly output, with appropriate timing, to the communication control section 101.

The communication control section 101 obtains input-related information (specifically, information regarding operations or detection results of sensors) from the input sections (specifically, the buttons 103, the analog stick 32 and the sensors 104 and 105). The communication control section 101 transmits operation data including the obtained information (or information obtained by performing a predetermined process on the obtained information) to the main unit 2. Note that operation data is transmitted repeatedly once per a predetermined period of time. Note that the interval at which the input-related information is transmitted to the main unit 2 may or may not be the same among different input sections.

As the operation data is transmitted to the main unit 2, the main unit 2 can obtain the input that has been performed on the left controller 3. That is, the main unit 2 can determine operations performed on the buttons 103 and the analog stick 32 based on the operation data. The main unit 2 can calculate information regarding movement and/or attitude of the left controller 3 based on the operation data (specifically, the detection results of the acceleration sensor 104 and the angular velocity sensor 105).

The left controller 3 includes a vibrator 107 for indications to the user through vibration. In at least one exemplary aspect, the vibrator 107 is controlled by an instruction from the main unit 2. That is, when the instruction is received from the main unit 2, the communication control section 101 drives the vibrator 107 in accordance with the instruction.

The left controller 3 includes an amplifier 106. When the instruction is received, the communication control section 101 outputs a control signal in accordance with the instruction to the amplifier 106. The amplifier 106 amplifies the control signal from the communication control section 101 and generates a driving signal for driving the vibrator 107 to give the driving signal to the vibrator 107. This actuates the vibrator 107.

The left controller 3 includes a power supply section 108. In at least one exemplary aspect, the power supply section 108 includes a battery and a power control circuit. Although not shown in the figure, the power control circuit is connected to the battery and is connected to the various sections of the left controller 3 (specifically, various sections receiving power supply from the battery). The power control circuit controls the power supply from the battery to the various sections. The battery is also connected to the terminal 42. In at least one exemplary aspect, when the left controller 3 is attached to the main unit 2, the battery is charged with the power supply from the main unit 2 via the terminal 42 under a predetermined condition.

As shown in FIG. 7, the right controller 4 includes a communication control section 111 for communicating with the main unit 2. The right controller 4 includes a memory 112 connected to the communication control section 111. The communication control section 111 is connected to various element including the terminal 64. The communication control section 111 and the memory 112 have similar functions to the communication control section 101 and the memory 102 of the left controller 3. Therefore, the communication control section 111 is capable of communicating with the main unit 2 both in wired communication via the terminal 64 and in wireless communication without using the terminal 64 (specifically, communication in accordance with the Bluetooth (registered trademark) standard), and controls the communication method by which the right controller 4 communicates with the main unit 2.

The right controller 4 includes similar input sections (specifically, the buttons 113, the analog stick 52, an acceleration sensor 114 and an angular velocity sensor 115) to those of the left controller 3. These input sections have similar functions and operate in a similar fashion to the input sections of the left controller 3.

The right controller 4 includes a vibrator 117 and an amplifier 116. The vibrator 117 and the amplifier 116 operate in a similar fashion to the vibrator 107 and the amplifier 106 of the left controller 3. That is, the communication control section 111 actuates the vibrator 117 using the amplifier 116 in accordance with an instruction from the main unit 2.

The right controller 4 includes a power supply section 118. The power supply section 118 has a similar function and operates in a similar fashion to the power supply section 108 of the left controller 3. That is, the power supply section 118 controls the power supply to the various sections receiving power supply from the battery. When the right controller 4 is attached to the main unit 2, the battery is charged with the power supply from the main unit 2 via the terminal 64 under a predetermined condition.

The right controller 4 includes the NFC communication section 122, which implements near-field wireless communication in accordance with the NFC standard. The NFC communication section 122 has the function of a so-called NFC reader/writer. The near-field wireless communication as used herein includes communication schemes in which one device (herein, the right controller 4) generates an electromotive force on the other device (herein, a device in proximity to the antenna 122a) by radio waves therefrom (e.g., through electromagnetic induction). The other device can operate on the generated electromotive force, and the other device may or may not have a power source. The NFC communication section 122 can communicate with a communication partner when the right controller 4 (the antenna 122a) and the communication partner come in proximity to each other (typically, when the distance between the devices is ten-odd centimeters or less). The communication partner is any device capable of near-field wireless communication with the NFC communication section 122, and is for example an NFC tag or a storage medium having the function of an NFC tag. Note however that the communication partner may be any other device that has an NFC card emulation function.

The right controller 4 includes the infrared image-capturing section 123. The infrared image-capturing section 123 includes an infrared camera for capturing an image around the right controller 4. While the infrared image-capturing section 123 may capture images using the ambient light, the infrared image-capturing section 123 includes the infrared light-emitting section 124 for outputting infrared light. The infrared light-emitting section 124 outputs infrared light in synchronism with the timing at which the infrared camera captures an image, for example.

The right controller 4 includes a processing section 121. The processing section 121 is connected to the communication control section 111 and also connected to the NFC communication section 122. The processing section 121 executes a management process for the NFC communication section 122 in response to an instruction from the main unit 2. For example, the processing section 121 controls the action of the NFC communication section 122 in response to an instruction from the main unit 2. The processing section 121 also controls the activation of the NFC communication section 122, and controls the action (specifically, reading and writing, etc.) of the NFC communication section 122 on a communication partner (e.g., an NFC tag). The processing section 121 also receives information to be transmitted to the communication partner from the main unit 2 via the communication control section 111 to pass this information to the NFC communication section 122, and obtains from the NFC communication section 122 information received from the communication partner to transmit this information to the main unit 2 via the communication control section 111.

The processing section 121 includes a CPU, a memory, etc., and execute a management process for the infrared image-capturing section 123 in response to an instruction from the main unit 2 based on a predetermined program (e.g., an application program for performing image processes and various arithmetic operations) stored in a storage device provided in the right controller 4 (e.g., a non-volatile memory or a hard disk) not shown in the figures. For example, the processing section 121 causes the infrared image-capturing section 123 to perform an image-capturing operation, and obtains and/or calculates information based on the image-capturing result (e.g., information of the captured image or information calculated from such information, etc.) to transmit this information to the main unit 2 via the communication control section 111. Moreover, the processing section 121 executes a management process for the infrared light-emitting section 124 in response to an instruction from the main unit 2.

Figure 8:
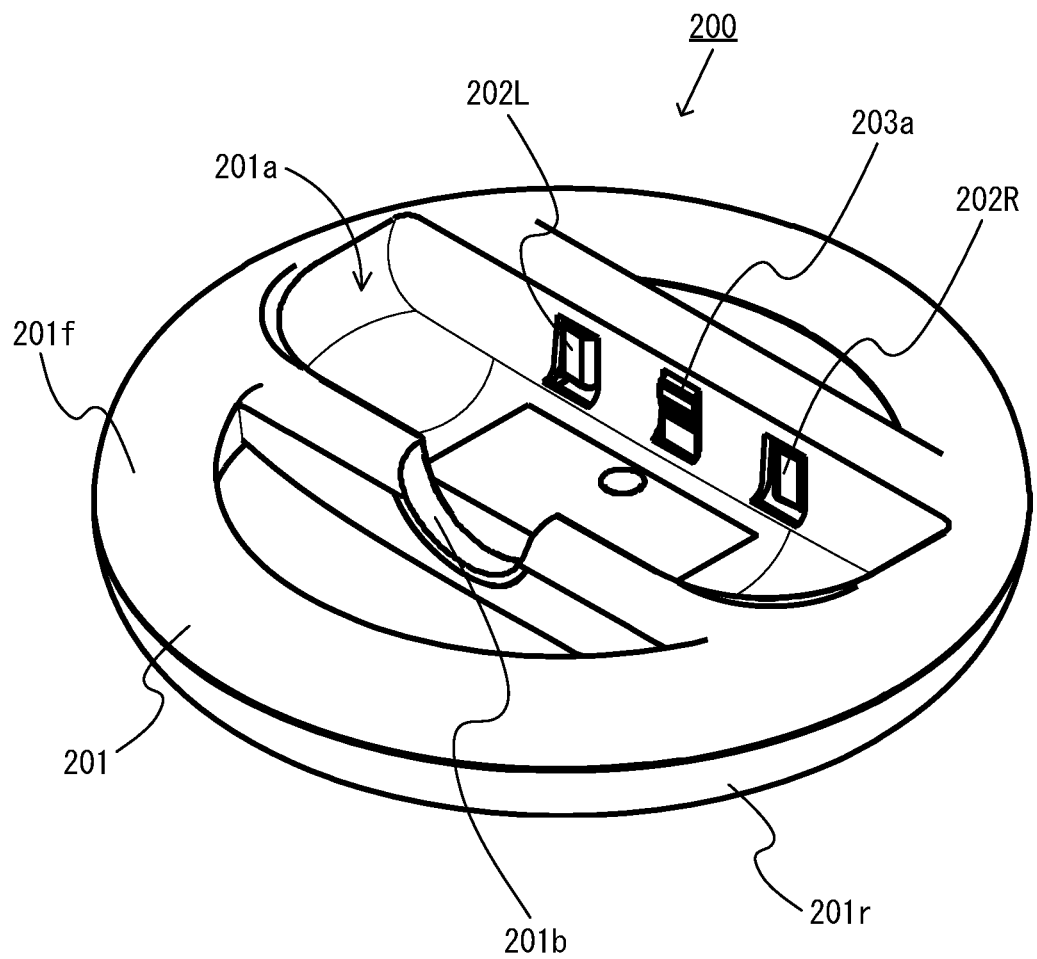
FIG. 8 is a perspective view showing a non-limiting example of the external appearance of a steering wheel-shaped attachment 200.

Referring next to FIG. 8 to FIG. 11, the steering wheel-shaped attachment 200, which is an example of the accessory device, will be described. Note that FIG. 8 is a perspective view showing an example of the external appearance of the steering wheel-shaped attachment 200.

Figure 9:
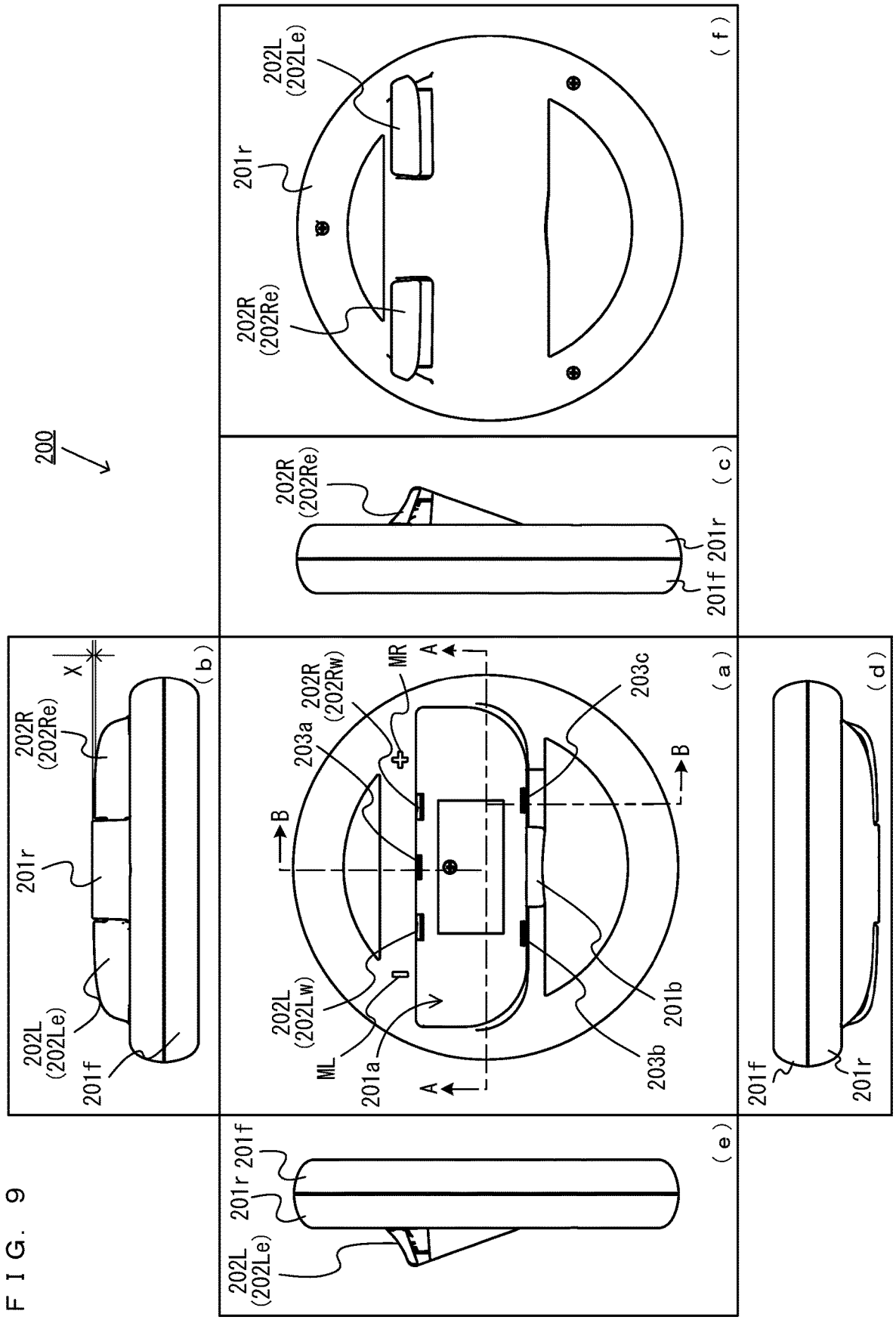
FIG. 9 is a six-sided view showing a non-limiting example of the external appearance of the steering wheel-shaped attachment 200.
Figure 10:
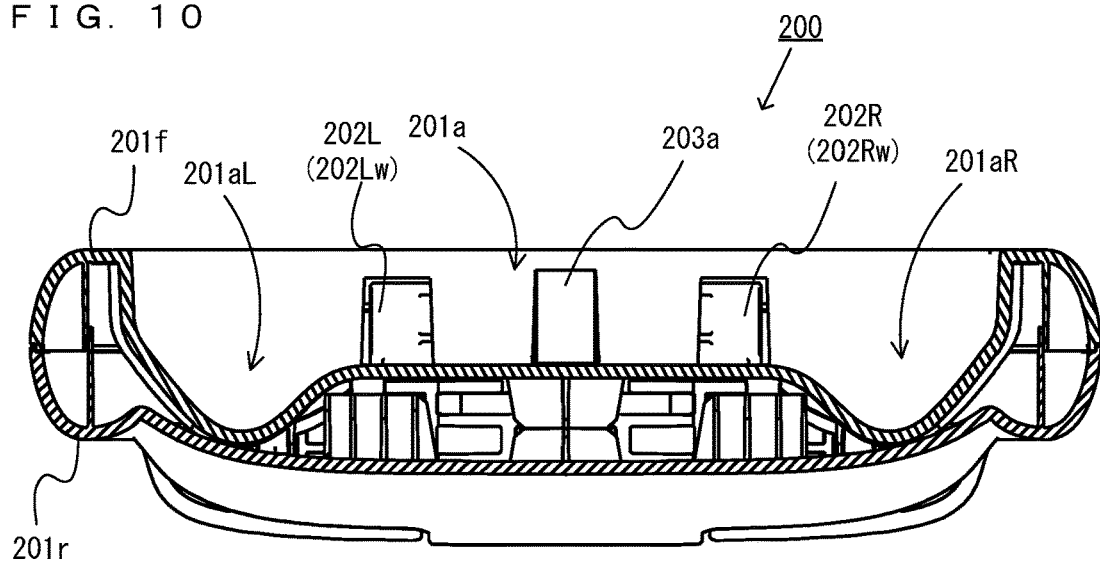
FIG. 10 is a cross-sectional view showing a non-limiting example configuration of the steering wheel-shaped attachment 200 as seen from section A-A.
Figure 11:
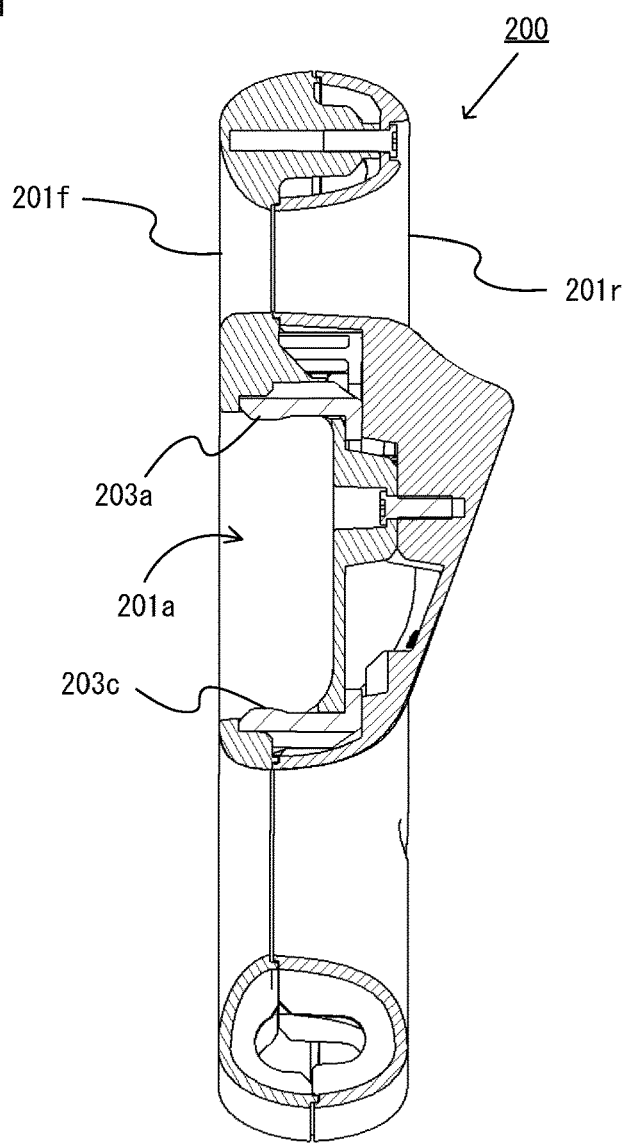
FIG. 11 is a cross-sectional view showing a non-limiting example configuration of the steering wheel-shaped attachment 200 as seen from section B-B.

FIG. 9 is a six-sided view showing an example of the external appearance of the steering wheel-shaped attachment 200. Note that in FIG. 9, (a) is a front view of the steering wheel-shaped attachment 200, (b) is a top view of the steering wheel-shaped attachment 200, (c) is a right side view of the steering wheel-shaped attachment 200, (d) is a bottom view of the steering wheel-shaped attachment 200, (e) is a left side view of the steering wheel-shaped attachment 200, and (f) is a rear view of the steering wheel-shaped attachment 200. FIG. 10 is a cross-sectional view showing an example configuration of the steering wheel-shaped attachment 200 as seen from section A-A. FIG. 11 is a cross-sectional view showing an example configuration of the steering wheel-shaped attachment 200 as seen from section B-B.

In FIG. 8 to FIG. 11, the steering wheel-shaped attachment 200 at least includes a grip portion 201, a movable portion 202 and a biasing portion 203.

The grip portion 201 includes a steering wheel-shaped rim portion (referred to also as a steering portion or a wheel portion) shaped so that the circumferential edge thereof is generally circular. In the example shown in FIG. 8 and FIG. 9, the grip portion 201 is provided with a ring-shaped rim portion. Note that the shape of the rim portion does not need to be a ring shape, but may be any shape that can be held and steered by a user, such as a shape obtained by cutting off a part of a ring shape, a shape obtained by deforming a part of a ring shape, an elliptical shape, drop handle shape, a shape with a plurality of projections along the outer circumference, etc. The cross-sectional shape of the rim portion does not need to be a circular shape, but may be any other shape such as an elliptical shape, an oval shape, a polygonal shape, a rounded polygonal shape, a deformed circular shape, etc. The grip portion 201 includes a compartment 201a having a recessed shape formed around the center of the rim portion (e.g., around the center of the generally circular shape). The compartment 201a is formed in a recessed shape that can engage with the left controller 3 or the right controller 4 being in a horizontal position, and a plurality of biasing portions 203 (three biasing portions 203a, 203b and 203c in at least one exemplary aspect,) are provided on the upper and lower walls of the recessed shape. A pair of movable portions 202 are provided on the upper wall of the recessed shape of the compartment 201a.

The grip portion 201 is formed by attaching together a front portion 201f to be the front surface-side portion in which the compartment 201a is to be formed, and a rear portion 201r to be the rear surface-side portion (a portion where the operation portions 202Le and 202Re of the movable portion 202 to be described later are provided). As is clear from FIG. 11, etc., the seam between the front portion 201f and the rear portion 201r on the outer side of the rim portion is generally at the center between the front side and the rear side, whereas the seam on the inner side of the rim portion is offset toward the front side with respect to the center between the front side and the rear side. By forming the seam between the front portion 201f and the rear portion 201r as described above, a user holding the rim portion is unlikely to touch the seam on the inner side of the rim portion, thus improving the feel during use. Note that the front side of the steering wheel-shaped attachment 200, on which the compartment 201a is formed, is the front side for a user operating the steering wheel-shaped attachment 200, whereas the rear side, on which the operation portions 202Le and 202Re of the movable portion 202 are provided, is the rear side as seen from the user. Therefore, in the description below, the surface of the steering wheel-shaped attachment 200 that faces toward a user when the steering wheel-shaped attachment 200 is held and operated by the user may be referred to as the "front surface", and a surface on the reverse side from the "front surface" as the "rear surface". Note that from a different point of view, the side of the steering wheel-shaped attachment 200 on which the compartment 201a is formed may be regarded as the "front surface", and the side on which the operation portions 202Le and 202Re of the movable portion 202 are provided as the "rear surface".

As shown in FIG. 10, a pair of, left and right, dented portions 201aL and 201aR are formed on the bottom surface (the rear side surface) of the compartment 201a of the grip portion 201. As will be clear from the description below, the dented portion 201aL engages with the rear surface protruding portion, which includes the ZL button 39, etc., provided on the rear surface of the left controller 3, when the left controller 3 is attached to the compartment 201a. The dented portion 201aR engages with the rear surface protruding portion, which includes the ZR button 61, etc., provided on the rear surface of the right controller 4 when the right controller 4 is attached to the compartment 201a. Herein, the engagement between the rear surface protruding portion and the dented portion 201aL or 201aR may be such that they are not entirely in contact with each other or such that they are not in contact with each other. A detachment cut-out 201b is formed by cutting out an arc-shaped portion at the center of the lower wall of the compartment 201a of the grip portion 201.

The movable portion 202 includes a pair of movable portions, i.e., a left movable portion 202L and a right movable portion 202R. The left movable portion 202L includes the left operation portion 202Le, a left protruding portion 202Lw and a left shaft portion 202Lp (see FIG. 15). The left operation portion 202Le projects outward from the left side of the rear surface of the grip portion 201 so that it can be pressed in the downward direction using the index finger or the middle finger, for example, of the left hand of a user holding the steering wheel-shaped attachment 200. The left button depression portion 202Lw is provided so as to protrude from the left-side upper wall of the compartment 201a of the grip portion 201, and can function also as the left protruding portion. Herein, "to protrude" encompasses not only a configuration in which the portion protrudes from the left-side upper wall only when the portion is moved in response to a user operation but also a configuration in which the portion is protruding from the left-side upper wall even before the user operation is performed and moves further away from the left-side upper wall in response to the user operation. When the left operation portion 202Le is pressed, the left movable portion 202L pivots about the left shaft portion 202Lp so that the left button depression portion 202Lw protrudes into the compartment 201a. When the left operation portion 202Le is not pressed, the movable portion 202L is biased to pivot in the reverse direction about the left shaft portion 202Lp, thereby retracting the left button depression portion 202Lw out of the compartment 201a. Note that the position where the left button depression portion 202Lw is provided in the compartment 201a will be described later.

Figure 15:
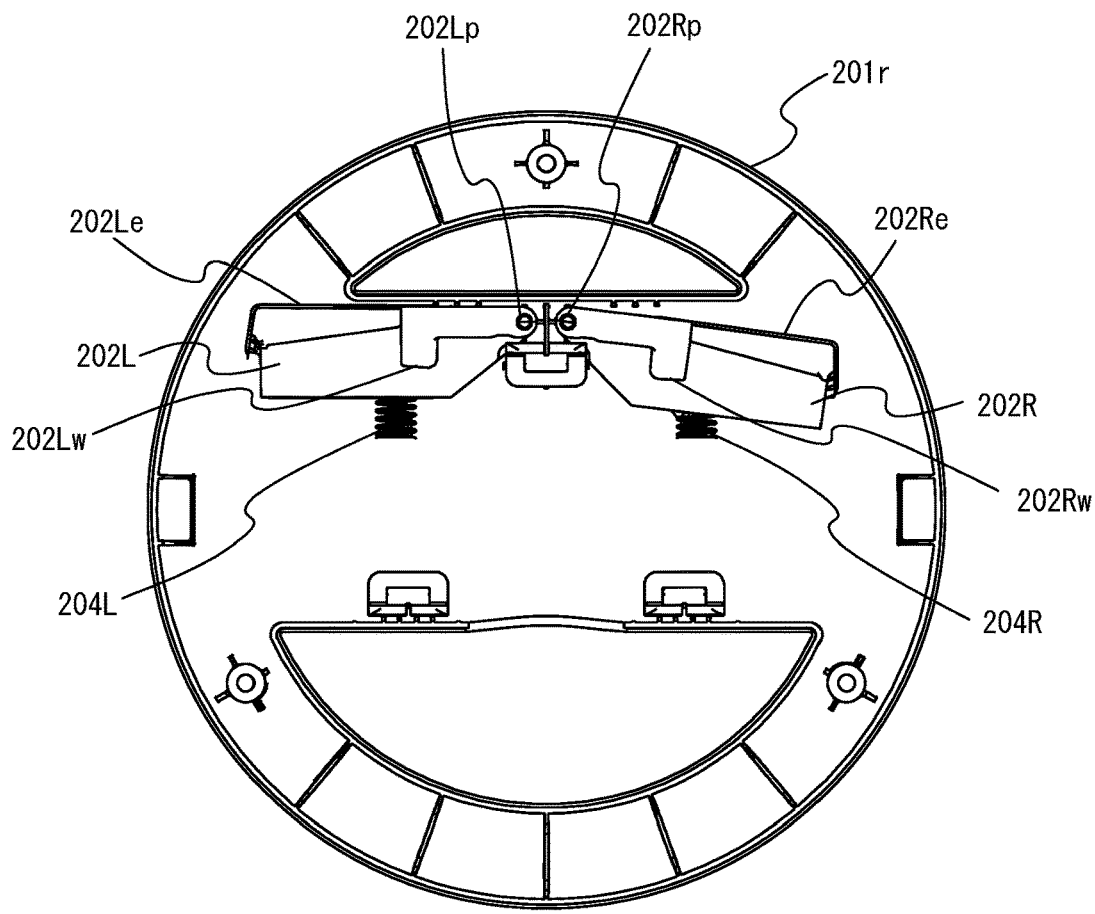
FIG. 15 is an internal structure diagram showing a non-limiting example of the operation of a left movable portion 202L and a right movable portion 202R in the steering wheel-shaped attachment 200.
Figure 16:
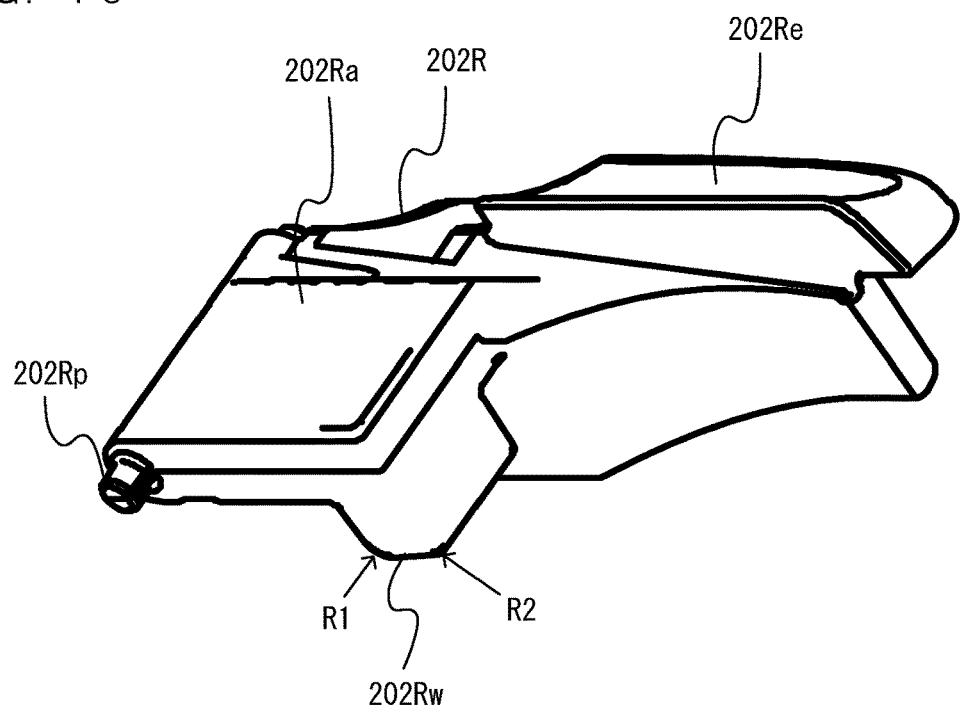
FIG. 16 is a perspective view showing a non-limiting example of the external appearance of the right movable portion 202R.
Figure 17:
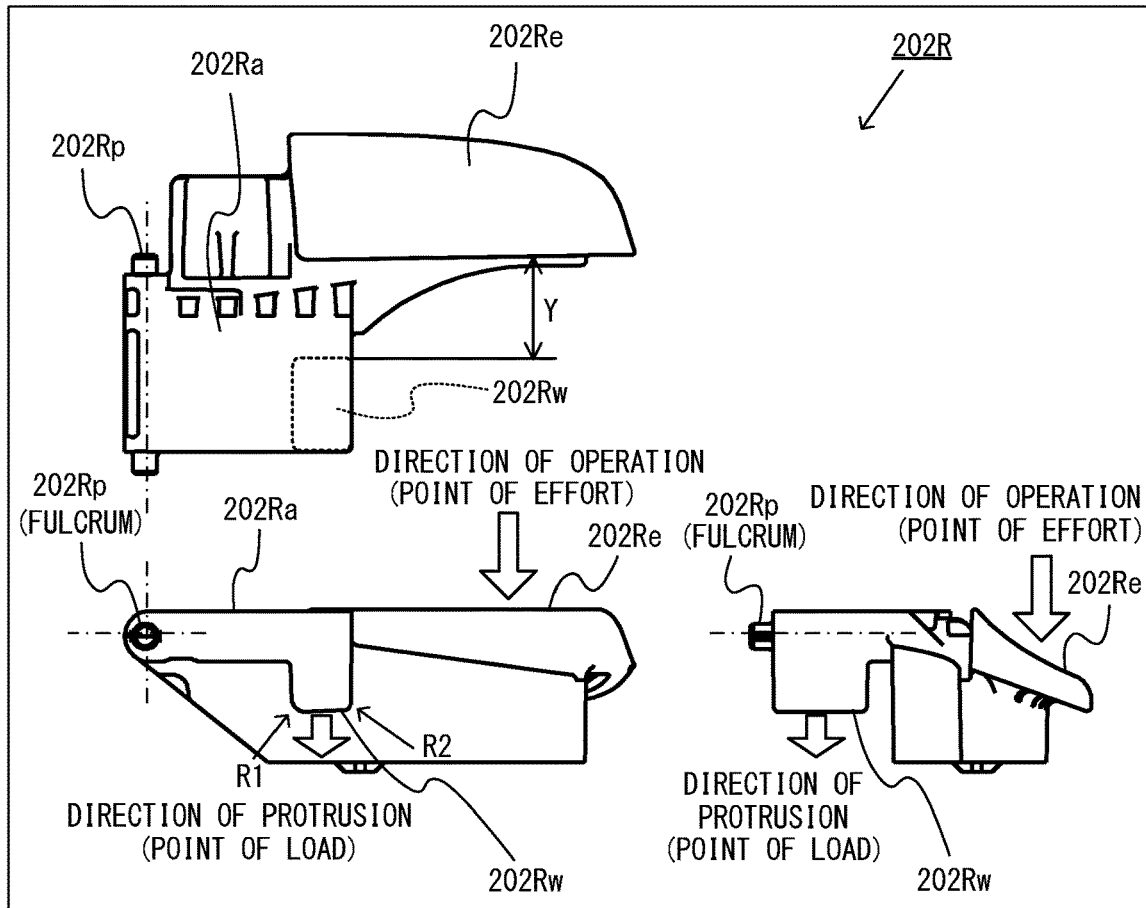
FIG. 17 is a three-sided view showing a non-limiting example of the external appearance of the right movable portion 202R.

The right movable portion 202R includes the right operation portion 202Re, a right button depression portion 202Rw and a right shaft portion 202Rp (see FIG. 15 to FIG. 17). The right operation portion 202Re projects outward from the right side of the rear surface of the grip portion 201 so that it can be pressed in the downward direction using the index finger or the middle finger, for example, of the right hand of a user holding the steering wheel-shaped attachment 200. The right button depression portion 202Rw is provided so as to protrude from the right-side upper wall of the compartment 201a of the grip portion 201, and can function also as the right protruding portion. Herein, "to protrude" encompasses not only a configuration in which the portion protrudes from the right-side upper wall only when the portion is moved in response to a user operation but also a configuration in which the portion is protruding from the right-side upper wall even before the user operation is performed and moves further away from the right-side upper wall in response to the user operation. When the right operation portion 202Re is pressed, the right movable portion 202R pivots about the right shaft portion 202Rp so that the right button depression portion 202Rw protrudes into the compartment 201a. When the right operation portion 202Re is not pressed, the movable portion 202R is biased to pivot in the reverse direction about the right shaft portion 202Rp, thereby retracting the right button depression portion 202Rw out of the compartment 201a. Note that the position where the right button depression portion 202Rw is provided in the compartment 201a will be described later.

As shown in FIG. 9, the left operation portion 202Le of the left movable portion 202L, the right operation portion 202Re of the right movable portion 202R and the rear portion 201r of the grip portion 201 are arranged on the rear side of the rim portion of the steering wheel-shaped attachment 200. Of the three components arranged on the rear side, the rear portion 201r of the grip portion 201 is provided most rearward of the steering wheel-shaped attachment 200. Specifically, as shown in FIG. 9, the rear portion 201r further protrudes rearward by the distance X from the rearmost end of the left operation portion 202Le and the right operation portion 202Re. By arranging a portion of the grip portion 201 most rearward of the steering wheel-shaped attachment 200, as described above, this portion can serve as a guard portion for the movable portion 202. For example, when the steering wheel-shaped attachment 200 is placed on a flat surface, or the like, with its rear surface facing down, the guard portion can reduce the unexpected shock or pressure to be applied to the movable portion 202 from the flat surface.

The biasing portion 203 includes three biasing portions 203a, 203b and 203c, for example, which are each an elastic member (e.g., a rubber member such as silicone rubber) for holding the left controller 3 or the right controller 4 attached to the compartment 201a so that the left controller 3 or the right controller 4 does not come off the compartment 201a. As shown in FIG. 9, the biasing portion 203a is fixed at the center of the upper wall of the compartment 201a of the grip portion 201, the biasing portion 203a protruding downward from the upper wall. The biasing portion 203b is fixed at a position on the left-side lower wall of the compartment 201a of the grip portion 201 that is directly below or on the outer side (left side) with respect to the left button depression portion 202Lw, the biasing portion 203b protruding upward from the lower wall. The biasing portion 203c is fixed at a position on the right-side lower wall of the compartment 201a of the grip portion 201 that is directly below or on the outer side (right side) with respect to the right button depression portion 202Rw, the biasing portion 203c protruding upward from the lower wall.

Note that the elastic member of the biasing portions 203a, 203b and 203c may be a spring member (a leaf spring, a coil spring, etc.) or a foamed member (sponge, etc.). The biasing portions 203a, 203b and 203c do not need to be an elastic member, and may be an adhesive tape with a low adhesiveness or a touch fastener, etc. The biasing portions 203a, 203b and 203c may be integral with the wall surface of the compartment 201a. The biasing portions 203a, 203b and 203c do not need to protrude from the wall surface of the compartment 201a, but may be a recessed portion in the wall surface. For example, by engaging the recessed portion formed in the wall surface with the side surface of the left controller 3 or the right controller 4, the left controller 3 or the right controller 4 attached to the compartment 201a can be held so that it does not come off the compartment 201a.

Figure 12:
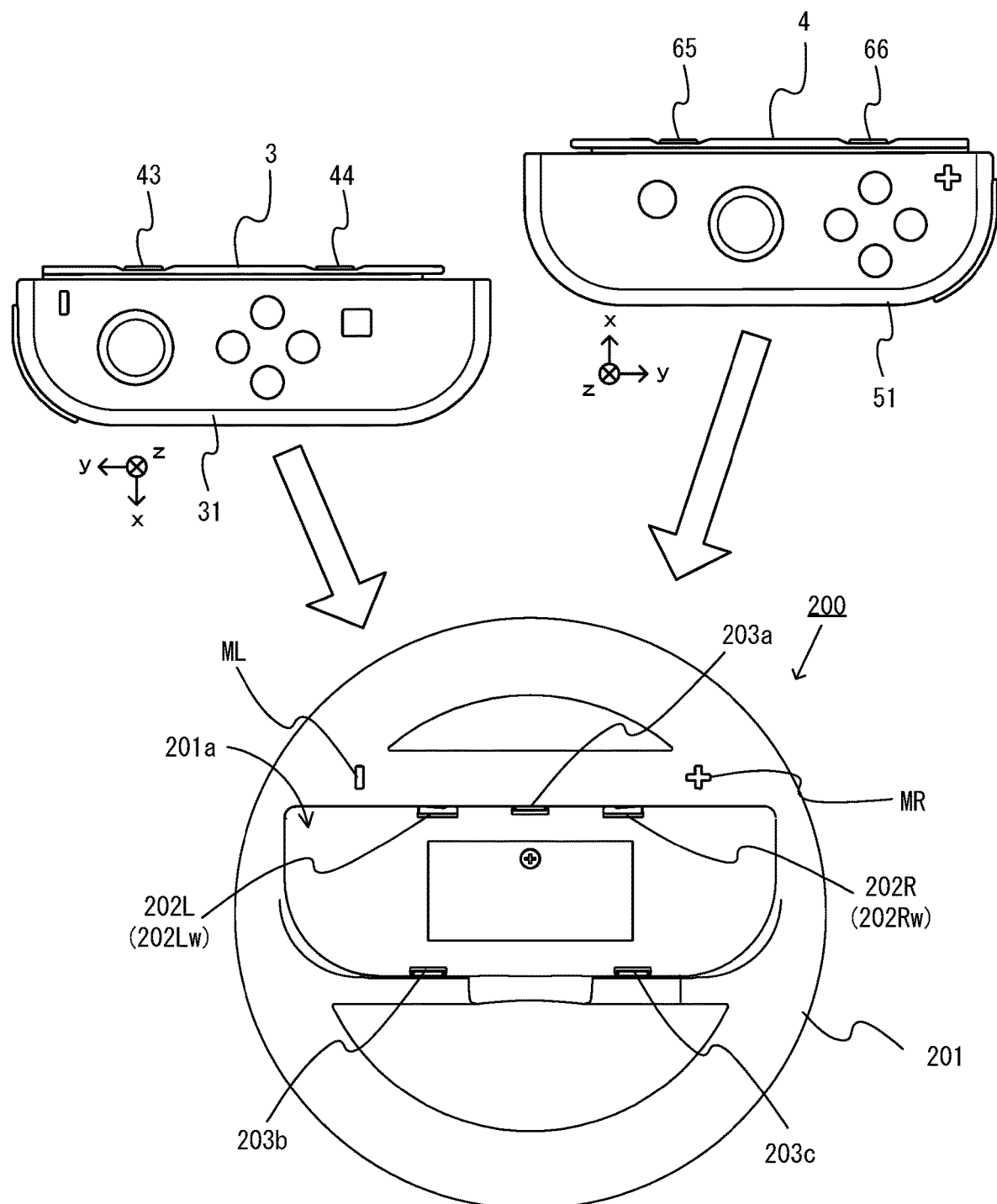
FIG. 12 illustrates a non-limiting example state in which the left controller 3 or the right controller 4 is to be attached to the steering wheel-shaped attachment 200.
Figure 13:
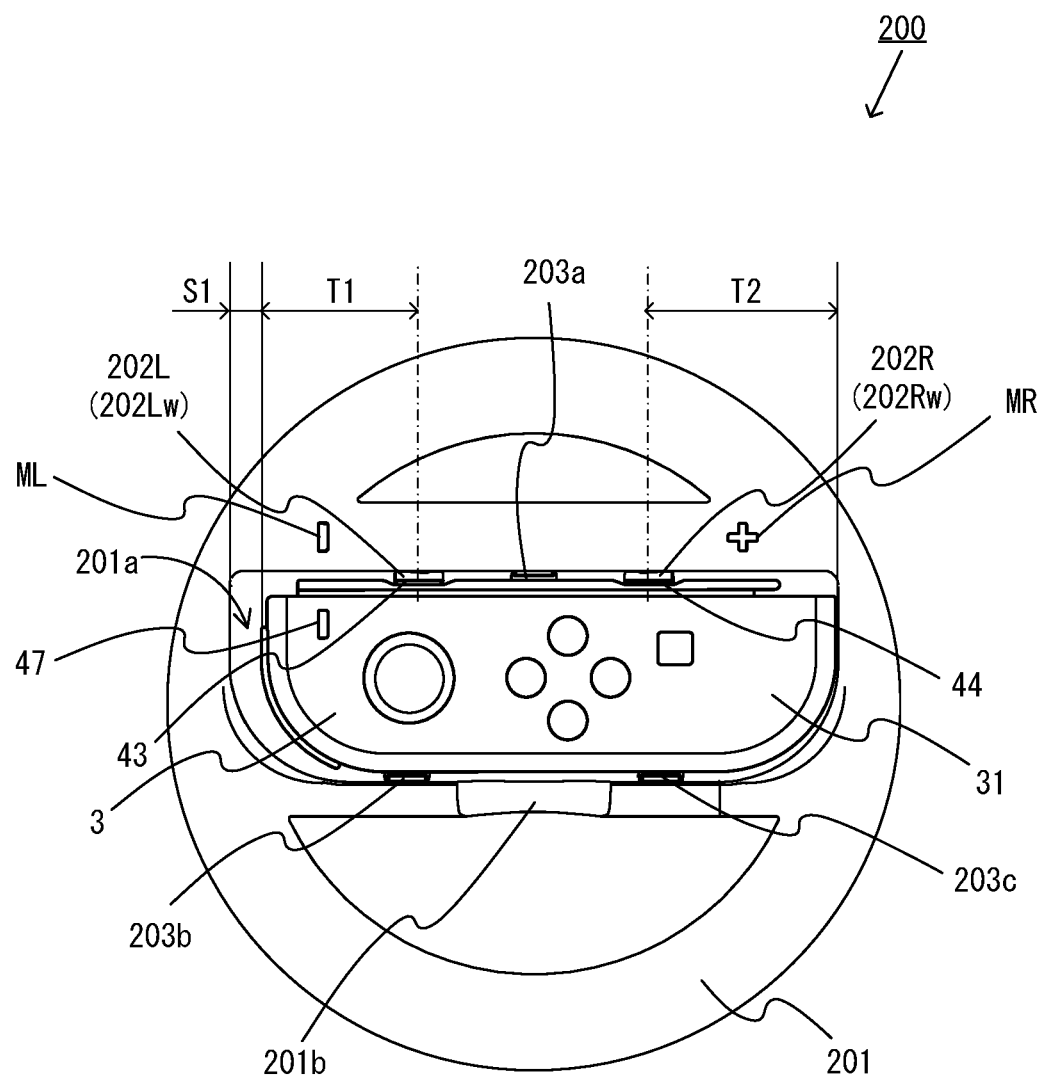
FIG. 13 is a front view showing a non-limiting example state in which the left controller 3 is attached to the steering wheel-shaped attachment 200.
Figure 14:
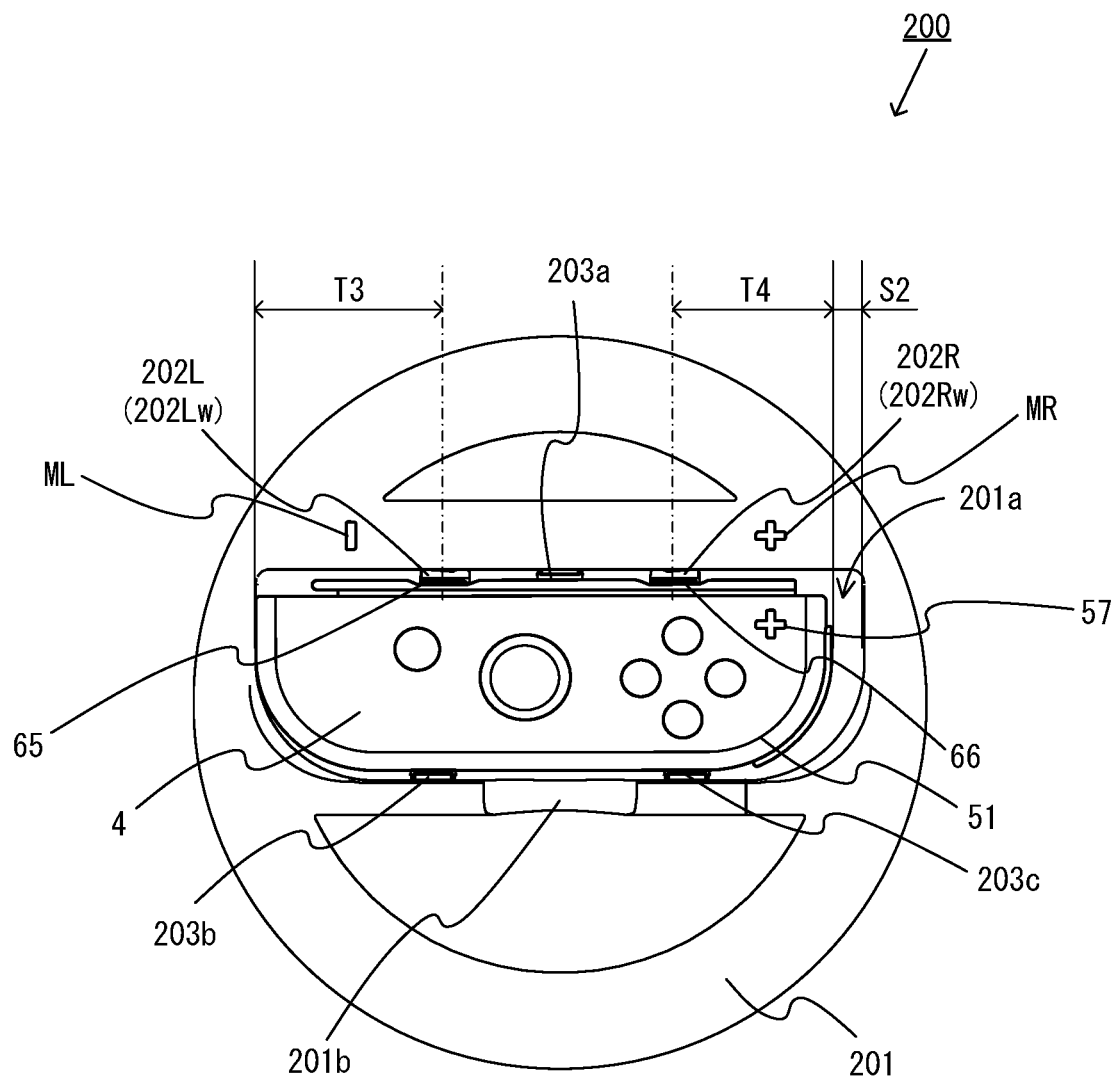
FIG. 14 is a front view showing a non-limiting example state in which the right controller 4 is attached to the steering wheel-shaped attachment 200.

Referring next to FIG. 12 to FIG. 14, the state in which the left controller 3 or the right controller 4 is attached to the steering wheel-shaped attachment 200 will be described. Note that FIG. 12 illustrates an example state in which the left controller 3 or the right controller 4 is to be attached to the steering wheel-shaped attachment 200. FIG. 13 is a front view showing an example state in which the left controller 3 is attached to the steering wheel-shaped attachment 200. FIG. 14 is a front view showing an example state in which the right controller 4 is attached to the steering wheel-shaped attachment 200.

In FIG. 12, both of the left controller 3 and the right controller 4 can be removably attached to the steering wheel-shaped attachment 200, one at a time. For example, when the left controller 3 is attached to the steering wheel-shaped attachment 200, the housing 31 of the left controller 3 is engaged with the compartment 201a so that the right side surface of the left controller 3 to be attached to the main unit 2 (the side surface on the x-axis negative direction side in FIG. 4) faces the upper wall of the compartment 201a of the grip portion 201 and the rear surface of the left controller 3 (the rear surface on the z-axis positive direction side in FIG. 4) is in contact with the bottom surface of the compartment 201a. When the right controller 4 is attached to the steering wheel-shaped attachment 200, the housing 51 of the right controller 4 is engaged with the compartment 201a so that the left side surface of the right controller 4 to be attached to the main unit 2 (the side surface on the x-axis positive direction side in FIG. 5) faces the upper wall of the compartment 201a of the grip portion 201 and the rear surface of the right controller 4 (the rear surface on the z-axis positive direction side in FIG. 5) is in contact with the bottom surface of the compartment 201a.

As shown in FIG. 13, when the left controller 3 is attached to the steering wheel-shaped attachment 200, the left controller 3 is fitted into the compartment 201a so that the bottom surface of the compartment 201a of the steering wheel-shaped attachment 200 is in contact with the rear surface of the left controller 3. In such a case, the dented portion 201aL formed in a left-side area of the bottom surface of the compartment 201a (see FIG. 10) is in engagement with the rear surface protruding portion (see FIG. 4) including the ZL button 39, etc., provided on the rear surface of the left controller 3. A portion of the right side surface (the side surface which is on the x-axis negative direction side in FIG. 4 and which faces upward when attached to the compartment 201a) of the left controller 3 that is around the center of the right side surface is supported by the biasing portion 203a. A portion of the left side surface (the side surface which is on the x-axis positive direction side in FIG. 4 and which faces downward when attached to the compartment 201a) of the left controller 3 that is around the position opposite from the second L button 43 is supported by the biasing portion 203b. A portion of the left side surface of the left controller 3 that is around the position opposite from the second R button 44 is supported by the biasing portion 203c. As described above, when the left controller 3 is attached to the compartment 201a, the opposite side surfaces (the side surfaces facing upward and downward when attached to the compartment 201a) of the left controller 3 are supported by the three biasing portions 203a, 203b and 203c.

The horizontal dimension of the compartment 201a is greater than the longitudinal dimension (the length in the y-axis direction in FIG. 4) of the left controller 3 by the length S1. Therefore, the left controller 3 can be attached to the compartment 201a while being in contact with the left wall of the compartment 201a, attached to the compartment 201a while being in contact with the right wall of the compartment 201a, or attached to the compartment 201a while being not in contact with ether the left wall or the right wall of the compartment 201a. In at least one exemplary aspect, however, when the left controller 3 is attached to the compartment 201a, the housing 31 of the left controller 3 is engaged with the compartment 201a so that the mark ML provided on the grip portion 201 is aligned in the left-right direction with the minus button 47 of the left controller 3 and that the right side surface (the lower side surface on the y-axis negative direction side in FIG. 4) of the left controller 3 is in contact with the right wall of the compartment 201a. As the left controller 3 is positioned in the left-right direction in the compartment 201a, as described above, the second L button 43 is aligned in the left-right direction with the left button depression portion 202Lw of the left movable portion 202L, and the second R button 44 is aligned in the left-right direction with the right button depression portion 202Rw of the right movable portion 202R. Therefore, when the left button depression portion 202Lw protrudes into the compartment 201a, with the left controller 3 having been attached to and positioned in the compartment 201a as described above, the left button depression portion 202Lw presses the second L button 43. When the right button depression portion 202Rw protrudes into the compartment 201a, with the left controller 3 having been attached to and positioned in the compartment 201a as described above, the right button depression portion 202Rw presses the second R button 44. That is, by attaching the left controller 3 to the compartment 201a in alignment with the mark ML provided on the grip portion 201, a user can easily recognize the direction in which the left controller 3 is to be attached to the steering wheel-shaped attachment 200 and can know the precise position of the left controller 3 in the compartment 201a.

As described above, the biasing portion 203b is provided at a position that is directly below or on the outer side with respect to the left button depression portion 202Lw, and the biasing portion 203c is provided directly below or on the outer side with respect to the right button depression portion 202Rw. That is, when the left button depression portion 202Lw protrudes into the compartment 201a, thereby pressing the second L button 43, a portion of the controller that is directly below or slightly on the left side of the second L button 43 is supported by the biasing portion 203b, or portions of the controller that are on the opposite sides of, and below, the second L button 43 are supported by the biasing portion 203b and the biasing portion 203c, thus allowing the second L button 43 to be pressed stably. When the right button depression portion 202Rw protrudes into the compartment 201a, thereby pressing the second R button 44, a portion of the controller that is directly below or slightly on the right side of the second R button 44 is supported by the biasing portion 203c, or portions of the controller that are on the opposite sides of, and below, the second R button 44 are supported by the biasing portion 203b and the biasing portion 203c, thus allowing the second R button 44 to be pressed stably.

The width of the left button depression portion 202Lw in the front-rear direction (i.e., the direction from the front surface toward the rear surface) is greater than the width of the second L button 43 in that direction (the z-axis direction shown in FIG. 4). The width of the right button depression portion 202Rw in the front-rear direction is greater than the width of the second R button 44 in that direction. Then, even when the depth at which the left controller 3 is attached to the compartment 201a varies in the front-rear direction, such variation can be absorbed by the relatively large width in the front-rear direction of the left button depression portion 202Lw and the right button depression portion 202Rw, and the second L button 43 and the second R button 44 can therefore be pressed reliably by the left button depression portion 202Lw and the right button depression portion 202Rw. Moreover, it is possible to prevent a portion of the left button depression portion 202Lw or the right button depression portion 202Rw from contacting a portion of the slider 40 of the left controller 3 around the second L button 43 and the second R button 44 and excessively pressing the second L button 43 and the second R button 44, and it is therefore possible to prevent an excessive load from being applied to the second L button 43 and the second R button 44.

As shown in FIG. 14, when the right controller 4 is attached to the steering wheel-shaped attachment 200, the right controller 4 is fitted into the compartment 201a so that the bottom surface of the compartment 201a of the steering wheel-shaped attachment 200 is in contact with the rear surface of the right controller 4. In such a case, the dented portion 201aR formed in a right-side area of the bottom surface of the compartment 201a (see FIG. 10) is in engagement with the rear surface protruding portion (see FIG. 5) including the ZR button 61, etc., provided on the rear surface of the right controller 4. A portion of the left side surface (the side surface which is on the x-axis positive direction side in FIG. 5 and which faces upward when attached to the compartment 201a) of the right controller 4 that is around the center of the left side surface is supported by the biasing portion 203a. A portion of the right side surface (the side surface which is on the x-axis negative direction side in FIG. 5 and which faces downward when attached to the compartment 201a) of the right controller 4 that is around the position opposite from the second L button 65 is supported by the biasing portion 203b. A portion of the right side surface of the right controller 4 that is around the position opposite from the second R button 66 is supported by the biasing portion 203c. As described above, when the right controller 4 is attached to the compartment 201a, the opposite side surfaces (the side surfaces facing upward and downward when attached to the compartment 201a) of the right controller 4 are supported by the three biasing portions 203a, 203b and 203c.

The horizontal dimension of the compartment 201a is greater than the longitudinal dimension (the length in the y-axis direction in FIG. 5) of the right controller 4 by the length S2. Therefore, the right controller 4 can be attached to the compartment 201a while being in contact with the left wall of the compartment 201a, attached to the compartment 201a while being in contact with the right wall of the compartment 201a, or attached to the compartment 201a while being not in contact with either the left wall or the right wall of the compartment 201a. In at least one exemplary aspect, however, when the right controller 4 is attached to the compartment 201a, the housing 51 of the right controller 4 is engaged with the compartment 201a so that the mark MR provided on the grip portion 201 is aligned in the left-right direction with the plus button 57 of the right controller 4 and that the left side surface (the lower side surface on the y-axis negative direction side in FIG. 5) of the right controller 4 is in contact with the left wall of the compartment 201a. As the right controller 4 is positioned in the left-right direction in the compartment 201a, as described above, the second L button 65 is aligned in the left-right direction with the left button depression portion 202Lw of the left movable portion 202L, and the second R button 66 is aligned in the left-right direction with the right button depression portion 202Rw of the right movable portion 202R. Therefore, when the left button depression portion 202Lw protrudes into the compartment 201a, with the right controller 4 having been attached to and position in the compartment 201a as described above, the left button depression portion 202Lw presses the second L button 65. When the right button depression portion 202Rw protrudes into the compartment 201a, with the right controller 4 having been attached to and positioned in the compartment 201a as described above, the right button depression portion 202Rw presses the second R button 66. That is, by attaching the right controller 4 to the compartment 201a in alignment with the mark MR provided on the grip portion 201, a user can easily recognize the direction in which the right controller 4 is to be attached to the steering wheel-shaped attachment 200 and can know the precise position of the right controller 4 in the compartment 201a.

As described above, the biasing portion 203b is provided at a position that is on the outer side (left side) of directly below the left button depression portion 202Lw, and the biasing portion 203c is provided at a position that is on the outer side (right side) of directly below the right button depression portion 202Rw. That is, when the left button depression portion 202Lw protrudes into the compartment 201a, thereby pressing the second L button 65, portions of the controller that are on the opposite sides of, and below, the second L button 65 are supported by the biasing portion 203b and the biasing portion 203c, thus allowing the second L button 65 to be pressed stably. When the right button depression portion 202Rw protrudes into the compartment 201a, thereby pressing the second R button 66, portions of the controller that are on the opposite sides of, and below, the second R button 66 are supported by the biasing portion 203b and the biasing portion 203c, thus allowing the second R button 66 to be pressed stably.

Note that as described above, the biasing portion 203b may be provided at a position directly below the left button depression portion 202Lw, and the biasing portion 203c may be provided at a position directly below the right button depression portion 202Rw. That is, when the left button depression portion 202Lw protrudes into the compartment 201a, thereby pressing the second L button 65, a portion of the controller that is directly below the second L button 65 is supported by the biasing portion 203b, thus also allowing the second L button 65 to be pressed stably. When the right button depression portion 202Rw protrudes into the compartment 201a, thereby pressing the second R button 66, a portion of the controller that is directly below the second R button 66 is supported by the biasing portion 203b, thus also allowing the second R button 66 to be pressed stably.

The width of the left button depression portion 202Lw in the front-rear direction (i.e., the direction from the front surface toward the rear surface) is greater than the width of the second L button 65 in that direction (the z-axis direction shown in FIG. 4). The width of the right button depression portion 202Rw in the front-rear direction is greater than the width of the second R button 66 in that direction. Then, even when the depth at which the right controller 4 is attached to the compartment 201a varies in the front-rear direction, such variation can be absorbed by the relatively large width in the front-rear direction of the left button depression portion 202Lw and the right button depression portion 202Rw, and the second L button 65 and the second R button 66 can therefore be pressed reliably by the left button depression portion 202Lw and the right button depression portion 202Rw. Moreover, it is possible to prevent a portion of the left button depression portion 202Lw or the right button depression portion 202Rw from contacting a portion of the slider 40 of the left controller 3 around the second L button 65 and the second R button 66 and excessively pressing the second L button 65 and the second R button 66, and it is therefore possible to prevent an excessive load from being applied to the second L button 65 and the second R button 66.

As is clear from FIG. 13 and FIG. 14, the length T1 from the left side surface (i.e., the upper side surface on the y-axis positive direction side in FIG. 4) of the left controller 3 attached to the compartment 201a to the second L button 43 is different from the length T3 from the left side surface (i.e., the lower side surface in the y-axis negative direction side in FIG. 5) of the right controller 4 attached to the compartment 201a to the second L button 65. Therefore, when the left controller 3 and the right controller 4 are attached to the same position in the compartment 201a, the position of the second L button 43 in the compartment 201a is different from the position of the second L button 65 in the compartment 201a, making it no longer possible to press the second L button 43 and the second L button 65 using a single left button depression portion 202Lw. However, when the left controller 3 and the right controller 4 are offset from each other by the length S1 in the left-right direction in the compartment 201a, the position of the second L button 43 in the compartment 201a will be the same as the position of the second L button 65 in the compartment 201a, making it possible to press the second L button 43 and the second L button 65 using a single left button depression portion 202Lw. That is, the difference S1 between the horizontal dimension (the length in the y-axis direction in FIG. 4 and FIG. 5) of the compartment 201a and the longitudinal dimension of the left controller 3 and the right controller 4 may be set to be the difference between the length T3 and the length T1.

Also, the length T2 from the right side surface (i.e., the lower side surface in the y-axis negative direction side in FIG. 4) of the left controller 3 attached to the compartment 201a to the second R button 44 is different from the length T4 from the right side surface (i.e., the upper side surface on the y-axis positive direction side in FIG. 5) of the right controller 4 attached to the compartment 201a to the second R button 66. Therefore, when the left controller 3 and the right controller 4 are attached to the same position in the compartment 201a, the position of the second R button 44 in the compartment 201a is different from the position of the second R button 66 in the compartment 201a, making it no longer possible to press the second R button 44 and the second R button 66 using a single right button depression portion 202Rw. However, when the left controller 3 and the right controller 4 are offset from each other by the length S1 in the left-right direction in the compartment 201a, the position of the second R button 44 in the compartment 201a will be the same as the position of the second L button 65 in the compartment 201a, making it possible to press the second R button 44 and the second R button 66 using a single right button depression portion 202Rw. That is, as the length T1 and the length T4 are equal to each other and the length T2 and the length T3 are equal to each other, it is possible to press the second R button 44 and press the second R button 66 using a single right button depression portion 202Rw because of the difference S1 the horizontal dimension (the length in the y-axis direction in FIG. 4 and FIG. 5) of the compartment 201a and the longitudinal dimension of the left controller 3 and the right controller 4.

The detachment cut-out 201b formed in the lower wall of the compartment 201a is used when detaching the left controller 3 or the right controller 4 from the steering wheel-shaped attachment 200. As described above, the detachment cut-out 201b is formed by cutting out an arc-shaped portion at the center of the lower wall of the compartment 201a. By virtue of the detachment cut-out 201b, a portion of the side surface facing downward (the side surface of the left controller 3 in the x-axis positive direction side in FIG. 4 or the side surface of the right controller 4 on the x-axis negative direction side in FIG. 5) of the left controller 3 or the right controller 4 attached to the steering wheel-shaped attachment 200 is exposed to the outside of the compartment 201a. Therefore, a user can easily detach the left controller 3 or the right controller 4 from the compartment 201a by pulling off the controller toward the user with a finger or fingers on the side surface of the left controller 3 or the right controller 4 exposed through the detachment cut-out 201b while the entirety of the steering wheel-shaped attachment 200 is secured. Note that the detachment cut-out 201b may be formed in a wall different from the lower wall of the compartment 201a or a plurality of detachment cut-outs may be formed in the lower wall and/or in other walls of the compartment 201a.

Referring next to FIG. 15 to FIG. 17, the operation and the structure of the movable portion 202 will be described. Note that FIG. 15 is an internal structure diagram showing an example of the operation of the left movable portion 202L and the right movable portion 202R in the steering wheel-shaped attachment 200. FIG. 16 is a perspective view showing an example of the external appearance of the right movable portion 202R. FIG. 17 is a three-sided view showing an example of the external appearance of the right movable portion 202R.

In FIG. 15, the left movable portion 202L is provided on the rear portion 201r of the grip portion 201 so that the left movable portion 202L can pivot about the left shaft portion 202Lp. Then, when the left operation portion 202Le is pressed in the downward direction, the left movable portion 202L pivots counterclockwise about the left shaft portion 202Lp, thereby also pivoting the left button depression portion 202Lw in the downward direction. The left movable portion 202L is biased by a spring 204L in the reverse direction (i.e., clockwise) from the direction in which it pivots when it is pressed, and when the left operation portion 202Le is not pressed, the left operation portion 202Le is supported in a predetermined operation stand-by position (e.g., a position at which the left operation portion 202Le lies in a generally horizontal direction). Note that the example shown in FIG. 15 shows a state in which the left movable portion 202L is in the stand-by position.

In FIG. 15, the right movable portion 202R is provided on the rear portion 201r of the grip portion 201 so that the right movable portion 202R can pivot about the right shaft portion 202Rp. Then, when the right operation portion 202Re is pressed in the downward direction, the right movable portion 202R pivots clockwise about the right shaft portion 202Rp, thereby also pivoting the right button depression portion 202Rw in the downward direction. The right movable portion 202R is biased by a spring 204R in the reverse direction (i.e., counterclockwise) from the direction that it pivots when it is pressed, and when the right operation portion 202Re is not pressed, the right operation portion 202Re is in a predetermined operation stand-by position (e.g., a position at which the right operation portion 202Re lies in a generally horizontal direction). Note that the example shown in FIG. 15 shows a state in which the right movable portion 202R is being pressed, thereby causing the right button depression portion 202Rw to protrude into the compartment 201a.

For example, the shape of the left movable portion 202L and the shape of the right movable portion 202R are in left-right symmetry. In the following description, the structure of the movable portion 202 will be described using the right movable portion 202R as a representative example.

In FIG. 16 and FIG. 17, the right movable portion 202R generally includes the right operation portion 202Re, the right button depression portion 202Rw, an arm portion 202Ra and the right shaft portion 202Rp, which are molded as an integral unit, for example. The right shaft portion 202Rp is pivotally supported on the grip portion 201 so that the axial direction is in the front-rear direction. Then, the right operation portion 202Re and the right button depression portion 202Rw are both provided on the right side of the right shaft portion 202Rp, and are secured on the right shaft portion 202Rp via the arm portion 202Ra, which connects the right shaft portion 202Rp and the right operation portion 202Re. The distance from the right operation portion 202Re to the right shaft portion 202Rp in a direction perpendicular to the axial direction (the length of the arm portion 202Ra of the right operation portion 202Re) is greater than the distance from the right button depression portion 202Rw to the right shaft portion 202Rp in a direction perpendicular to the axial direction (the length of the arm portion 202Ra of the right button depression portion 202Rw). Therefore, when the right operation portion 202Re is pressed, the right button depression portion 202Rw pivots in the same direction. The amount of movement by which the right button depression portion 202Rw moves through the pivoting is smaller than the amount of movement by which the right operation portion 202Re moves. The amount of movement as used herein is the amount by which the right button depression portion 202Rw or the right operation portion 202Re moves through the pivoting, representing the length of the arc traced when the right movable portion 202R pivots about the right shaft portion 202Rp.

Thus, the right movable portion 202R functions as a lever of which the fulcrum is the right shaft portion 202Rp, the point of effort is the right operation portion 202Re and the point of load is the right button depression portion 202Rw. Specifically, the right movable portion 202R functions as a lever that moves about the fulcrum (the right shaft portion 202Rp), in which in response to a movement of the point of effort (the movement of the right operation portion 202Re in response to a press operation), the point of load moves (the right button depression portion 202Rw protrudes) in the same direction as the point of effort over a distance that is shorter than the distance over which the point of effort moves. Therefore, when the right operation portion 202Re is pressed, the second R button 44 or the second R button 66 will be pressed by the amount of movement smaller than the amount of movement of the press operation, thereby allowing a user to press an operation button of the left controller 3 or the right controller 4 with a small force, thus allowing a user to operate the operation button using a subtle touch.

As described above, the left movable portion 202L is in left-right symmetry with the right movable portion 202R. Therefore, the left movable portion 202L also functions as a lever of which the fulcrum is the left shaft portion 202Lp, the point of effort is the left operation portion 202Le and the point of load is the left button depression portion 202Lw. That is, the left movable portion 202L functions as a lever that moves about the fulcrum (the left shaft portion 202Lp), in which in response to a movement of the point of effort (the movement of the left operation portion 202Le in response to a press operation), the point of load moves (the left button depression portion 202Lw protrudes) in the same direction as the point of effort over a distance that is shorter than the distance over which the point of effort moves. Therefore, when the left operation portion 202Le is pressed, the second L button 43 or the second L button 65 will be pressed by the amount of movement smaller than the amount of movement of the press operation, thereby allowing a user to press an operation button of the left controller 3 or the right controller 4 with a small force, thus allowing a user to operate the operation button using a subtle touch.

Note that the "amount of movement" as used above is a concept that encompasses the amount of key stroke of the right operation portion 202Re (and the right button depression portion 202Rw) and the left operation portion 202Le (and the left button depression portion 202Lw), the amount of key stroke by which the right button depression portion 202Rw presses the second R button 44 or the second R button 66, and the amount of key stroke by which the left button depression portion 202Lw presses the second L button 43 or the second L button 65.

Note that the arm portion 202Ra that connects the right shaft portion 202Rp and the right operation portion 202Re and connects the right shaft portion 202Rp and the right button depression portion 202Rw may be a single arm portion as shown in FIG. 16 and FIG. 17, but there may be separate arm portions. That is, if the separate arm portions share the right shaft portion 202Rp so that the right operation portion 202Re and the right button depression portion 202Rw move in conjunction with each other, the separate arm portions can be regarded as being a single arm portion that connects the right operation portion 202Re and the right button depression portion 202Rw. The right shaft portion 202Rp may be integral with, or separate from, the right movable portion 202R, and the structure may be such that an arm portion of the right operation portion 202Re and an arm portion of the right button depression portion 202Rw pivot about the right shaft portion 202Rp, which is fixed.

The right button depression portion 202Rw includes a lower surface (or "actuation surface") to be in contact with the second R button 44 or the second R button 66, and the lower surface has an edge or edges thereof chamfered. Specifically, a curved surface of a predetermined curvature is formed along the edge or edges. The curvature R1 of the curved surface of one edge of the lower surface that is closest to the right shaft portion 202Rp is greater than the curvature R2 of the curved surface of another edge that is farthest away from the right shaft portion 202Rp (e.g., R1=1.5R and R2=0.5R). By forming a larger rounded shape (a curved surface of the curvature R1) along an edge that is closest to the right shaft portion 202Rp, it is more likely that the flat portion of the right button depression portion 202Rw first contacts the second R button 44 or the second R button 66 when the right button depression portion 202Rw protrudes into the compartment 201a, thus preventing the edge from first contacting the second R button 44 or the second R button 66 and deteriorating the controllability. Also, by forming a larger rounded shape along an edge that is closest to the right shaft portion 202Rp, it is possible to reduce the excessive load to be applied by the right button depression portion 202Rw to the second R button 44 or the second R button 66.

Note that the chamfered shape of each edge of the lower surface of the right button depression portion 202Rw does not need to be a curved surface, but may be of any shape that is not right-angled. For example, the chamfer may be done by slantly cutting off the edge of the lower surface of the right button depression portion 202Rw, or may be a rounded chamfer composed of a plurality of curvatures. With any chamfered shape, the edge of the lower surface of the right button depression portion 202Rw that is closest to the right shaft portion 202Rp is shaped with a greater amount of chamfer than the edge that is farthest away from the right shaft portion 202Rp.

As described above, the left movable portion 202L has a shape that is in left-right symmetry with the shape of the right movable portion 202R, and the structure of the movable portion 202 has been described above using the right movable portion 202R as a representative example. The edges of the lower surface of the left button depression portion 202Lw are similarly chamfered to the right button depression portion 202Rw. That is, a curved surface of a predetermined curvature is formed along each edge of the lower surface of the left button depression portion 202Lw to be in contact with the second L button 43 or the second L button 65. As is the curvature R1 described above, the curvature R3 of the curved surface of one edge of the lower surface that is closest to the left shaft portion 202Lp is greater than the curvature R4 of the curved surface of another edge that is farthest away from the left shaft portion 202Lp (e.g., R3=1.5R and R4=0.5R). By forming a larger rounded shape (a curved surface of the curvature R3) along an edge that is closest to the left shaft portion 202Lp, it is more likely that the flat portion of the left button depression portion 202Lw first contacts the second L button 43 or the second L button 65 when the left button depression portion 202Lw protrudes into the compartment 201a, thus preventing the edge from first contacting the second L button 43 or the second L button 65 and deteriorating the controllability. Also, by forming a larger rounded shape along an edge that is closest to the left shaft portion 202Lp, it is possible to reduce the excessive load to be applied by the left button depression portion 202Lw to the second L button 43 or the second L button 65.

Note that the chamfered shape of each edge of the lower surface of the left button depression portion 202Lw does not need to be a curved surface, but may be of any shape that is not right-angled. For example, the chamfer may be done by slantly cutting off the edge of the lower surface of the left button depression portion 202Lw, or may be a rounded chamfer composed of a plurality of curvatures. With any chamfered shape, the edge of the lower surface of the left button depression portion 202Lw that is closest to the left shaft portion 202Lp is shaped with a greater amount of chamfer than the edge that is farthest away from the left shaft portion 202Lp.

As is clear from FIG. 16 and FIG. 17, the right operation portion 202Re and the right button depression portion 202Rw of the right movable portion 202R are provided at different positions from each other along the axial direction of the right shaft portion 202Rp. For example, for the direction from the front surface toward the rear surface of the steering wheel-shaped attachment 200, the frontmost portion of an area of the right operation portion 202Re that can be contacted by a finger of a user is located rearward of the rearmost portion of the actuation surface of the right button depression portion 202Rw to be in contact with the second R button 44 or the second R button 66. Specifically, the right button depression portion 202Rw is provided on the front surface of the steering wheel-shaped attachment 200 and the right operation portion 202Re is provided on the rear surface of the steering wheel-shaped attachment 200, and the right operation portion 202Re and the right button depression portion 202Rw are provided at positions that do not overlap with each other in the front-rear direction (in the example of FIG. 17, the frontmost portion of an area of the right operation portion 202Re that can be contacted by a finger of a user and the rearmost portion of the actuation surface of the right button depression portion 202Rw to be in contact with the second R button 44 or the second R button 66 are separated from each other by the distance Y in the front-rear direction). That is, the axial direction of the right shaft portion 202Rp lies in the front-rear direction of the steering wheel-shaped attachment 200, and the right button depression portion 202Rw is provided on the rear side of the right operation portion 202Re. Thus, with a lever structure in which the point of effort and the point of load are provided at different positions in the axial direction, rather than providing the point of effort and the point of load along the same line in a direction perpendicular to the fulcrum axial direction, it is possible to freely arrange the right operation portion 202Re without being limited by the position of the left controller 3 or the right controller 4 to be attached.

Note that while the right operation portion 202Re and the right button depression portion 202Rw are provided at different positions in the axial direction of the right shaft portion 202Rp, as shown in FIG. 16 and FIG. 17, if the entirety of the right movable portion 202R is integrally molded, for example, the right shaft portion 202Rp can be regarded as being provided on one side of one arm, with the operation portion 202Re and the right button depression portion 202Rw being provided on the other side of the arm.

Figure 18:
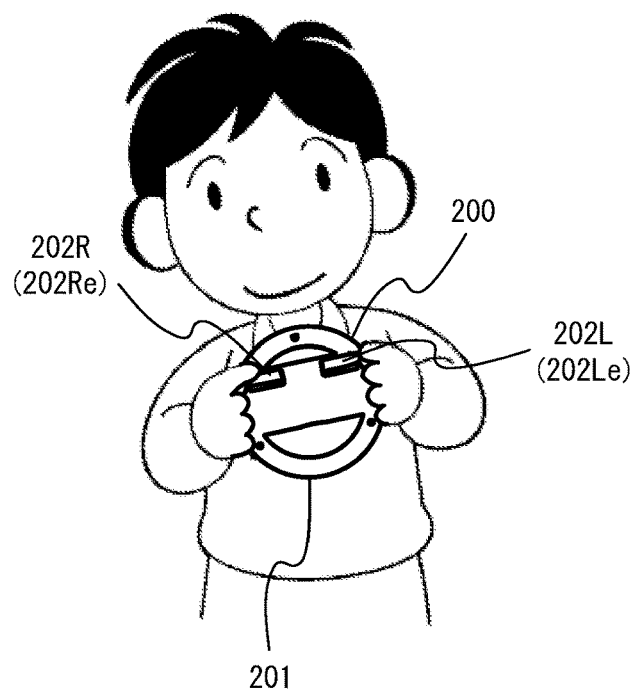
FIG. 18 shows a non-limiting example of how a user performs a game operation by holding the steering wheel-shaped attachment 200 with the left controller 3 or the right controller 4 attached thereto.

Referring next to FIG. 18, operations performed using the steering wheel-shaped attachment 200 with the left controller 3 or the right controller 4 attached thereto will be described. FIG. 18 shows an example of how a user performs a game operation by holding the steering wheel-shaped attachment 200 with the left controller 3 or the right controller 4 attached thereto using both hands (i.e., the right hand and the left hand). In at least one exemplary aspect, the main unit 2 executes processes in response to operations performed with the steering wheel-shaped attachment 200 based on data transmitted from the left controller 3 or the right controller 4 attached to the steering wheel-shaped attachment 200.

For example, in at least one exemplary aspect, a user holds the rim portion of the steering wheel-shaped attachment 200 using both hands, as shown in FIG. 18, to perform operations using the steering wheel-shaped attachment 200 by rotating the steering wheel-shaped attachment 200 as a whole or by pressing the left operation portion 202Le or the right operation portion 202Re. In other exemplary aspects, a user can perform operations using the steering wheel-shaped attachment 200 by moving the steering wheel-shaped attachment 200 as a whole in the up-down direction, the left-right direction, the front-rear direction, etc., changing the orientation of the steering wheel-shaped attachment 200, or operating the operation sections of the left controller 3 or the right controller 4 exposed on the front side of the steering wheel-shaped attachment 200.

In response to such operations using the steering wheel-shaped attachment 200, the main unit 2 performs an information process (e.g., a game process). As an example, in response to an operation using the steering wheel-shaped attachment 200, the main unit 2 causes a virtual object displayed on a display screen (e.g., a display device to which the display 12 and the main unit 2 are connected) to perform an action, and displays, on the display screen, an image of a virtual space that reflects the action of the virtual object. For example, the main unit 2 changes the direction of movement of the virtual object in response to rotating the steering wheel-shaped attachment 200, and changes the speed of movement of the virtual object in response to the pressing operation on the left operation portion 202Le or the right operation portion 202Re.

The left controller 3 or the right controller 4 attached to the steering wheel-shaped attachment 200 includes inertia sensors (the acceleration sensor 104 and the angular velocity sensor 105, or the acceleration sensor 114 and the angular velocity sensor 115), and data representing the detection results from the inertia sensors can be wirelessly transmitted from the left controller 3 or the right controller 4 to the main unit 2. Then, using the detection results of the inertia sensor, the main unit 2 can calculate the attitude and/or motion of the left controller 3 or the right controller 4 (i.e., the attitude and/or motion of the steering wheel-shaped attachment 200). Thus the action of the virtual object can be controlled based on the attitude and/or motion of the steering wheel-shaped attachment 200.

In response to the pressing operation on the left operation portion 202Le, the second L button 43 or the second L button 65 is pressed, and data from the pressing of the operation button can be wirelessly transmitted from the left controller 3 or the right controller 4 to the main unit 2. Moreover, in response to the pressing operation of the right operation portion 202Re, the second R button 44 or the second R button 66 is pressed, and data from the pressing of the operation button can be wirelessly transmitted from the left controller 3 or the right controller 4 to the main unit 2. Then, the main unit 2 can control the action of the virtual object in response the pressing operation on the operation button. Moreover, a user is allowed to operate various buttons and an analog stick provided on the front surface of the left controller 3 or the right controller 4 secured in the steering wheel-shaped attachment 200, and it is possible to control the action of the virtual object in response to the operation.

Figure 19:
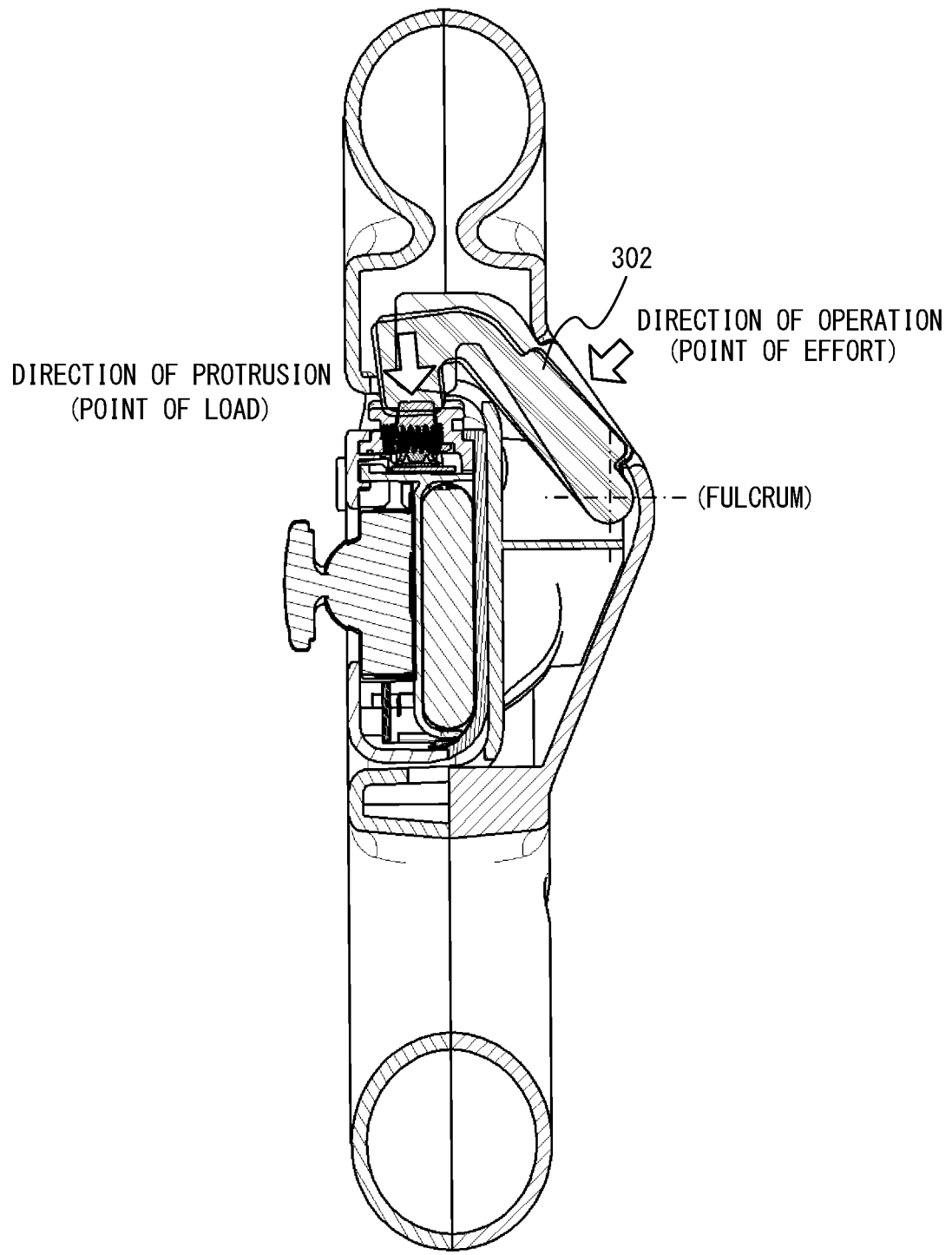
FIG. 19 is a vertical cross-sectional view showing a non-limiting example structure of a movable portion 302 provided on a steering wheel-shaped attachment.
Figure 20:
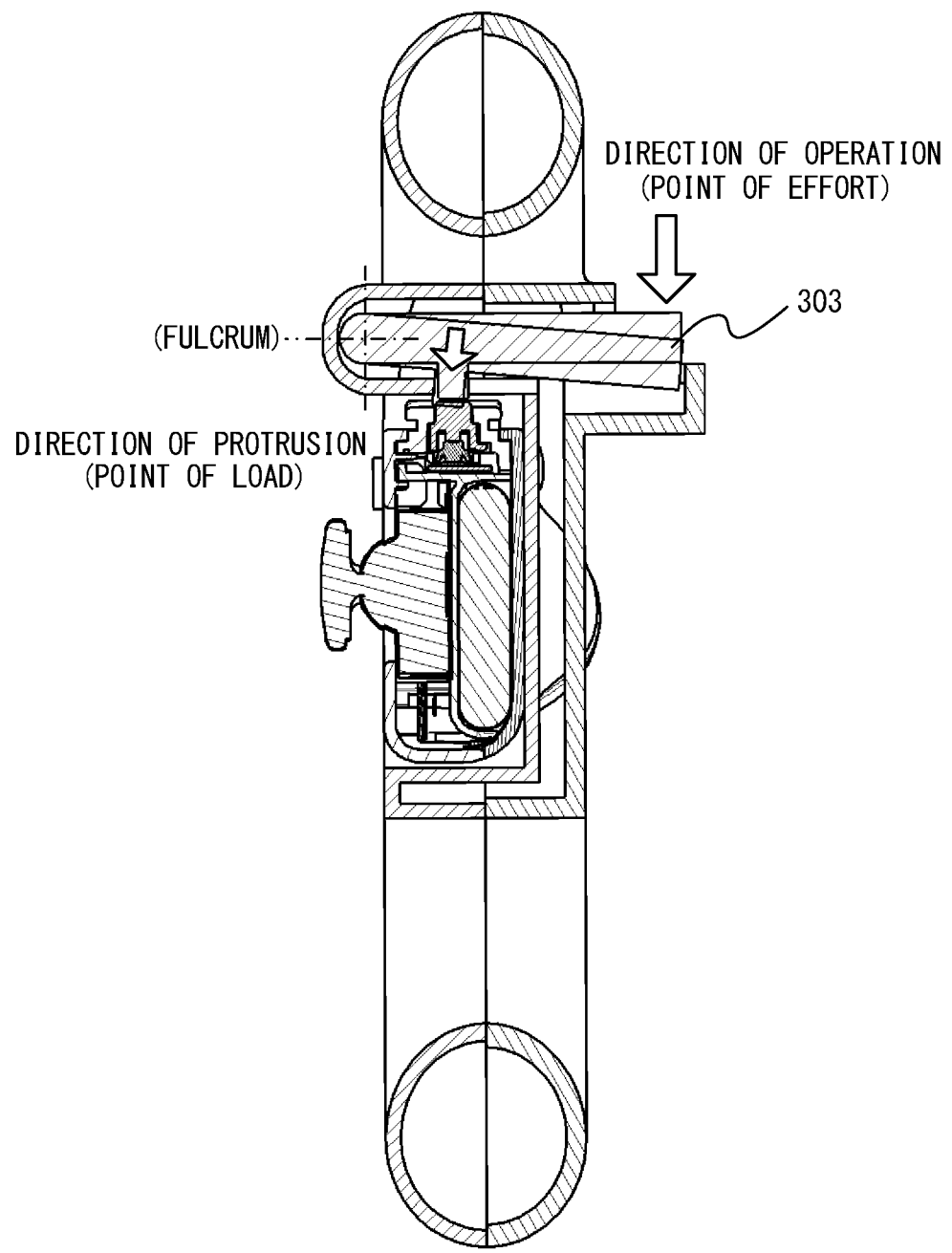
FIG. 20 is a vertical cross-sectional view showing a non-limiting example structure of a movable portion 303 provided on a steering wheel-shaped attachment.
Figure 21:
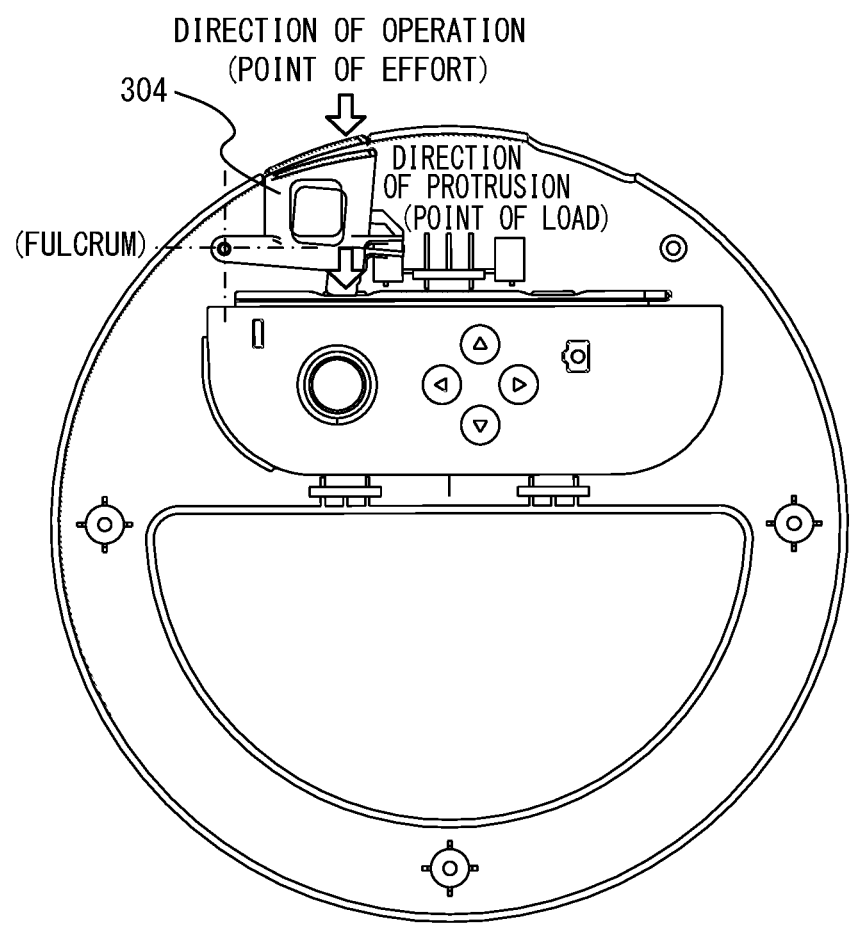
FIG. 21 is an internal structure diagram showing a non-limiting example structure of a movable portion 304 provided on a steering wheel-shaped attachment.

Note that while the description above is directed to an example in which the movable portion 202 is provided on the steering wheel-shaped attachment 200, a movable portion capable of a different pivoting action may be provided thereon. Referring now to FIG. 19 to FIG. 21, an example of a steering wheel-shaped attachment provided with a movable portion capable of a different pivoting action will be described. Note that FIG. 19 is a vertical cross-sectional view showing an example structure of a movable portion 302 provided on a steering wheel-shaped attachment. Note that FIG. 20 is a vertical cross-sectional view showing an example structure of a movable portion 303 provided on steering wheel-shaped attachment. FIG. 21 is an internal structure diagram showing an example structure of a movable portion 304 provided on a steering wheel-shaped attachment.

In FIG. 19, the movable portion 302 is provided behind the controller attached to the steering wheel-shaped attachment so that the movable portion 302 can pivot about the fulcrum provided on the back of the steering wheel-shaped attachment. As shown in FIG. 19, the axial direction of the fulcrum of the movable portion 302 extends in the left-right direction of the steering wheel-shaped attachment. The fulcrum of the movable portion 302 is provided below and behind the operation button of the controller to be pressed by the movable portion 302. Then, the operation portion (point of effort) of the movable portion 302 and the protruding portion (point of load) thereof are each provided in front of the fulcrum, and the operation portion is provided behind the protruding portion. Thus, when the operation portion of the movable portion 302 is pressed in the downward direction, the protruding portion thereof pivots also in the downward direction about the fulcrum. The amount of movement by which the protruding portion moves through the pressing is greater than the amount of movement by which the operation portion moves by being pressed. Therefore, it is possible to reduce the amount of operation of pressing the operation button of the left controller 3 or the right controller 4 attached to the steering wheel-shaped attachment. Thus, the movable portion 302 functions as a lever provided so as to extend in the front-rear direction on the back of the steering wheel-shaped attachment.

In FIG. 20, the movable portion 303 is provided above the controller attached to the steering wheel-shaped attachment so that the movable portion 303 can pivot about the fulcrum provided in front of the steering wheel-shaped attachment. As shown in FIG. 20, the axial direction of the fulcrum of the movable portion 303 extends in the left-right direction of the steering wheel-shaped attachment. The fulcrum of the movable portion 303 is provided above and in front of the operation button of the controller to be pressed by the movable portion 303. Then, the operation portion (point of effort) of the movable portion 303 and the protruding portion (point of load) thereof are provided behind the fulcrum at different positions along the same line in a direction perpendicular to the fulcrum axial direction, and the operation portion is provided behind the protruding portion. Thus, when the operation portion of the movable portion 303 is pressed in the downward direction, the protruding portion thereof pivots also in the downward direction about the fulcrum. The amount of movement by which the protruding portion moves through the pressing is smaller than the amount of movement by which the operation portion moves by being pressed. Thus, the movable portion 303 functions as a lever provided so as to extend in the front-rear direction in an upper portion of the steering wheel-shaped attachment.

In FIG. 21, the movable portion 304 is provided above the controller attached to the steering wheel-shaped attachment so that the movable portion 304 can pivot about the fulcrum provided in an upper portion of the steering wheel-shaped attachment. As shown in FIG. 21, the axial direction of the fulcrum of the movable portion 304 extends in the front-rear direction of the steering wheel-shaped attachment. The fulcrum of the movable portion 304 is provided above and on the left of the operation button of the controller to be pressed by the movable portion 304. Then, the operation portion (point of effort) of the movable portion 304 and the protruding portion (point of load) thereof are both provided on the right of the fulcrum and directly above the operation button of the controller to be pressed by the movable portion 304, and the operation portion is provided directly above the protruding portion. Thus, when the operation portion of the movable portion 304 is pressed in the downward direction, the protruding portion thereof, which is provided directly below the operation portion, pivots also in the downward direction about the fulcrum. The amount of movement by which the protruding portion moves through the pressing is equal to the amount of movement by which the operation portion moves by being pressed. Therefore, the operating force of pressing the operation portion is equal to the force by which the operation button of the left controller 3 or the right controller 4 is pressed, and there is no leverage effect, allowing a user to operate the operation portion of the movable portion 304 with the same feel of operation as that when pressing the operation button of the left controller 3 or the right controller 4 with no attachment attached thereto. As described above, the movable portion 304 is provided directly above the steering wheel-shaped attachment and functions as an operation portion with no leverage effect.

Thus, in at least one exemplary aspect, both of the left controller 3 and the right controller 4 can be attached to and detached from the steering wheel-shaped attachment 200, which is an example accessory device, one at a time, and with one of the controllers attached thereto, processes can be performed in response to operations performed while holding the steering wheel-shaped attachment 200. While operations can be performed based on the attitude or motion of the steering wheel-shaped attachment 200 itself, the steering wheel-shaped attachment 200 includes a plurality of movable portions used to operate operation sections provided on the left controller 3 and the right controller 4. Therefore, a user can operate the plurality of movable portions provided on the steering wheel-shaped attachment 200 while moving the steering wheel-shaped attachment 200 as a whole, thereby realizing a variety of operations.

Note that the method for detecting the motion or attitude of the left controller 3 and the right controller 4 attached to the steering wheel-shaped attachment 200 as described above is merely an example, and such motion or attitude may be detected using methods or other data. For example, the motion or attitude may be calculated based only on the acceleration of the left controller 3 or the right controller 4, may be calculated based only on the angular velocity of the left controller 3 or the right controller 4, or may be calculated based on the combination of the angular velocity and the acceleration of the left controller 3 or the right controller 4. It is understood that even when only the acceleration of the left controller 3 or the right controller 4 is detected, it is possible to calculate the direction of the gravitational acceleration of the left controller 3 or the right controller 4, and the motion or attitude can be calculated by successively calculating the x-, y- and z-axis directions based on the gravitational acceleration.

The main unit 2, the left controller 3 and the right controller 4 may each be any device, such as a portable game device or any other portable electronic device (a PDA (Personal Digital Assistant), a mobile telephone, a personal computer, a camera, a tablet, etc.). The device which is attached to the steering wheel-shaped attachment 200 and which transmits operation data to the main unit 2 does not need to be a game controller. For example, the device attached to the steering wheel-shaped attachment 200 may be a remote controller device for operating/controlling a remotely-located device through remote control, and a remote controller device that does not operate/control a game device may be attached to the steering wheel-shaped attachment 200. For example, a remote controller device that operates/controls another device such as a monitor, a personal computer, a camera, a tablet, a mobile telephone, other household appliances, an outdoor appliance, a vehicle, etc., may be provided to be attachable to and detachable from the steering wheel-shaped attachment 200.

The image displayed on the main unit 2 is displayed as a game image obtained by the CPU 81 executing an information process (a game process) in response to an operation performed using the steering wheel-shaped attachment 200. That is, although the image to be displayed on the main unit 2 is produced by the CPU 81 of the main unit 2 performing an information process (e.g., a game process), at least a part of the process for producing the image may be performed by another device. For example, when the main unit 2 is capable of communicating with still another device (e.g., a server, another image display device, another game device, another portable terminal, or another information processing device), the process may be executed in cooperation with the other device. Thus, a process similar to the process described above can be performed with at least a part of the process being performed by another device. The information process described above may be executed by one processor or a plurality of processors cooperating together included in an information processing system including at least one information processing device. Although the CPU 81 of the main unit 2 may execute a predetermined program for performing the information process, a part or whole of the process described above may be performed by a dedicated circuit included in the main unit 2.

The variation described above, in at least one exemplary aspect, can be implemented in a so-called "cloud computing" system or a distributed wide area network or local network system. For example, in a distributed local network system, the processes described above can be executed in cooperation between a home-console information processing device (a home-console game device) and a portable information processing device (a portable game device). Note that in these systems, it is understood that there is no particular limitation on the device or devices to be used for the processes described above, and that at least one exemplary aspect can be implemented no matter how the processes are distributed.

The program may be loaded onto the main unit 2 via an external storage medium such as an external memory, or may be loaded onto the main unit 2 via a wired or wireless communication network. The program may be pre-recorded on a non-volatile storage device inside the main unit 2. Note that the information storage medium for storing the program described above may be a CD-ROM, a DVD or other similar media, such as an optical disc storage medium, a flexible disc, a hard disk, a magneto-optical disc and a magnet tape, as well as a non-volatile memory. The information storage medium for storing the program described above may also be a volatile memory capable of storing the program. Any of such storage media can be said to be a recording medium that can be read by a computer, or the like. For example, the program on such a recording medium may be loaded onto a computer, or the like, to be executed thereon, thereby realizing the various functions described above.

While some example systems, methods, devices and units have been described above in detail, they are merely illustrative and are not intended to limit the scope of the present disclosure. It is understood that various improvements and modifications can be made without departing from the spirit and scope of the appended claims, and that the scope of the present disclosure should be construed based only on the scope of the appended claims. It is understood that from the description of the exemplary aspects, those skilled in the art can determine the range of equivalence based on the description herein and the technical knowledge. It should be understood that for any element written in a singular form preceded by a word such as "a" or "an", as used herein, a plurality is not excluded for that element. It should also be understood that any term used herein is used in a sense in which the term is normally used in the pertinent field of art, unless otherwise noted. Therefore, unless defined otherwise, any technical term used herein should be interpreted as it is commonly understood by those skilled in the art to which the preceding description pertains. In case of any contradiction, the present specification (including the definitions therein) precedes.

As described above, an accessory device, or the like, may have an improved usability.

What is claimed is:

1. An accessory device for use with a game controller that includes a top surface, a bottom surface opposite to the top surface, and a side wall surface that connects the top surface and the bottom surface, the side wall surface including at least a right button and a left button, the accessory device comprising:
   a compartment configured to removably secure the game controller at least partly therein, with the right button and the left button being positioned at least partly within the compartment and the right button positioned to the right of the left button;
   a right lever; and
   a left lever, wherein
   the right lever includes:
      a right fulcrum;
      a right point of effort located to the right of the right fulcrum and configured to be contacted by one hand of a user holding the accessory device and pressed by the user; and
      a right point of load located between the right fulcrum and the right point of effort and configured to apply a pressing force to the right button of the game controller at least partly received within the compartment by the right point of effort being pressed;
   the left lever includes:
      a left fulcrum;
      a left point of effort located to the left of the left fulcrum and configured to be contacted by the other hand of the user holding the accessory device and pressed by the user; and
      a left point of load located between the left fulcrum and the left point of effort and configured to apply a pressing force to the left button of the game controller at least partly received within the compartment by the left point of effort being pressed.

2. The accessory device according to claim 1, wherein the right fulcrum and the left fulcrum are located between the right point of load and the left point of load in a left-right direction of the accessory device.

3. The accessory device according to claim 1, wherein in a direction from a front surface to a back surface of the accessory device, the right point of effort is located further on the back surface side than the right point of load, and
the left point of effort is located further on the back surface side than the left point of load.

4. The accessory device according to claim 1, further comprising:
   a right grip portion located to the right of the right point of effort so that the user can hold the accessory device with one hand; and
   a left grip portion located to the left of the left point of effort so that the user can hold the accessory device with the other hand.

5. The accessory device according to claim 1, wherein
the accessory device has a steering wheel shape,
the accessory device further comprises a bridge portion that connects portions opposed to each other in a ring-shaped portion in the steering wheel shape, and
the compartment, the right lever, and the left lever are provided in the bridge portion.

6. The accessory device according to claim 1, wherein
a direction in which the right point of load moves by the right point of effort being pressed is the same as a direction in which the right point of effort moves by being pressed by the user based on the right fulcrum, and
a direction in which the left point of load moves by the left point of effort being pressed is the same as a direction in which the left point of effort moves by being pressed by the user based on the left fulcrum.

7. The accessory device according to claim 1, wherein
a distance by which the right point of load moves by the right point of effort being pressed is shorter than a distance by which the right point of effort moves by being pressed by the user based on the right fulcrum, and
a distance by which the left point of load moves by the left point of effort being pressed is shorter than a distance by which the left point of effort moves by the being pressed by the user based on the left fulcrum.

8. The accessory device according to claim 1, further comprising:
a right biasing portion configured to bias the right lever in a direction opposite to a direction in which the right lever moves by being pressed by the user; and
a left biasing portion configured to bias the left lever in a direction opposite to a direction in which the left lever moves by being pressed by the user.

* * * * *